US012569850B2

(12) United States Patent
Hashimoto et al.

(10) Patent No.: US 12,569,850 B2
(45) Date of Patent: Mar. 10, 2026

(54) REACTION VESSEL AND AUTOMATIC ANALYZING DEVICE

(71) Applicant: CANON MEDICAL SYSTEMS CORPORATION, Tochigi (JP)

(72) Inventors: Shozo Hashimoto, Nasushiobara (JP);
Masahiro Masubuchi, Yaita (JP);
Takashi Goto, Nasushiobara (JP);
Tomohiro Sugimura, Otawara (JP);
Yasuo Akizawa, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 1108 days.

(21) Appl. No.: 17/646,045

(22) Filed: Dec. 27, 2021

(65) Prior Publication Data

US 2022/0203352 A1 Jun. 30, 2022

(30) Foreign Application Priority Data

Dec. 28, 2020 (JP) ................................. 2020-218650
Mar. 2, 2021 (JP) ................................. 2021-032249

(51) Int. Cl.
*B01L 3/00* (2006.01)
*G01N 35/00* (2006.01)

(52) U.S. Cl.
CPC ........ *B01L 3/508* (2013.01); *G01N 35/00663*
(2013.01); *G01N 2035/00673* (2013.01)

(58) Field of Classification Search
CPC ............. B01L 3/508; B01L 2300/0851; B01L 2400/0605; B01L 2400/0611; B01L 2400/0633; B01L 3/502; B01L 3/50825;

G01N 35/00663; G01N 2035/00673;
G01N 35/00; G01N 2035/00277; G01N
2035/00544; B01F 33/406
See application file for complete search history.

(56) References Cited

U.S. PATENT DOCUMENTS

2006/0285430 A1 12/2006 Seto
2013/0095508 A1 4/2013 Campitelli et al.

FOREIGN PATENT DOCUMENTS

| JP | 55-16270 A | 2/1980 |
| JP | 56-13034 A | 12/1981 |
| JP | 62-228952 A | 10/1987 |
| JP | 6-265455 A | 9/1994 |
| JP | 2006-349638 A | 12/2006 |
| JP | 2007-209910 A | 8/2007 |
| JP | 2008-39546 A | 2/2008 |

(Continued)

OTHER PUBLICATIONS

Japanese Office Action issued Aug. 14, 2024 in Japanese Application 2020-218650, 7 pages.

(Continued)

*Primary Examiner* — Samuel P Siefke
(74) *Attorney, Agent, or Firm* — Oblon, McClelland, Maier & Neustadt, L.L.P.

(57) ABSTRACT

A reaction cuvette according to an embodiment is used for measurement performed by an automatic analyzing device, and is a reaction cuvette that houses a mixed liquid of a reagent and a sample to be measured. The reaction cuvette includes a cuvette main body and an aspiration port. The aspiration port is disposed on the cuvette main body, and allows a fluid to flow into an inner part of the cuvette main body from a bottom surface side of the cuvette main body.

3 Claims, 46 Drawing Sheets

(56)     References Cited

FOREIGN PATENT DOCUMENTS

| | | | |
|---|---|---|---|
| JP | 2009-288503 | A | 12/2009 |
| JP | 2011-21953 | A | 2/2011 |
| JP | 5171025 | B2 | 3/2013 |
| JP | 5287579 | B2 | 9/2013 |
| JP | 5331551 | B2 | 10/2013 |
| JP | 5345968 | B2 | 11/2013 |
| JP | 6058277 | B2 | 1/2017 |
| JP | 2020-165821 | A | 10/2020 |

OTHER PUBLICATIONS

Japanese Office Action issued Sep. 4, 2024 in Japanese Application 2021-032249, 5 pages.

FIG.18

REACTION VESSEL AND AUTOMATIC ANALYZING DEVICE

CROSS-REFERENCE TO RELATED APPLICATIONS

This application is based upon and claims the benefit of priority from Japanese Patent Application No. 2020-218650, filed on Dec. 28, 2020; and Japanese Patent Application No. 2021-032249, filed on Mar. 2, 2021, the entire contents of all of which are incorporated herein by reference.

FIELD

Embodiments described herein relate generally to a reaction cuvette and an automatic analyzing device.

BACKGROUND

For example, an automatic analyzing device allows a sample dispensing probe to aspirate a sample in a sample container, and to dispense the sample to a reaction cuvette. The automatic analyzing device then dispenses a reagent to the reaction cuvette to which the sample is dispensed, and measures a mixed liquid of the sample and the reagent. The automatic analyzing device cleans the sample dispensing probe in a cleaning tank every time dispensing of the sample ends.

However, with a scheme in which the sample dispensing probe aspirates the sample and dispenses the sample to the reaction cuvette, there may be a case in which the sample is not sufficiently removed from the sample dispensing probe by cleaning, carry-over is generated, and a correct measurement result cannot be obtained.

BRIEF DESCRIPTION OF THE DRAWINGS

FIG. 18 is a diagram illustrating an example of a configuration of an analyzing device of an automatic analyzing device according to a third embodiment;

DETAILED DESCRIPTION

A reaction cuvette according to an embodiment is used for measurement by an automatic analyzing device. The reaction cuvette is configured to house a mixed liquid of a reagent and a sample to be measured, and includes a cuvette main body and an aspiration port. The aspiration port is disposed on the cuvette main body, and allows a fluid to flow into an inner part of the cuvette main body from a bottom surface side of the cuvette main body.

The following describes embodiments of the reaction cuvette and the automatic analyzing device in detail with reference to the drawings. The embodiments are not limited to the embodiments described below. Content described in one of the embodiments is basically applied to the other embodiments.

First Embodiment

Figure 1:
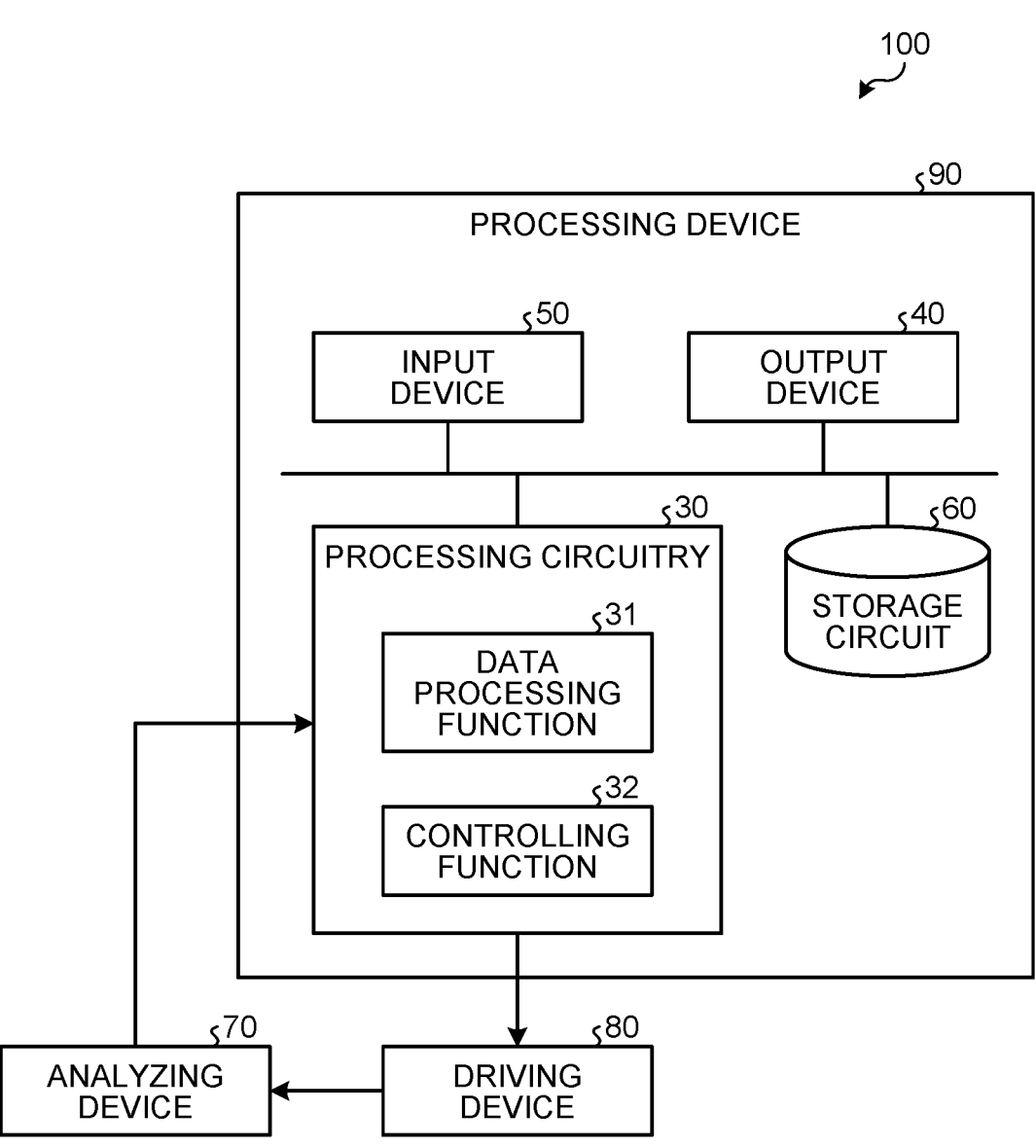
FIG. 1 is a block diagram illustrating an example of a configuration of an automatic analyzing device to which a reaction cuvette according to a first embodiment is applied.

FIG. 1 is a block diagram illustrating an example of a configuration of an automatic analyzing device 100 to which a reaction cuvette according to a first embodiment is applied. The automatic analyzing device 100 illustrated in FIG. 1 includes an analyzing device 70, a driving device 80, and a processing device 90.

The analyzing device 70 measures a mixed liquid of a reagent used for analysis of each examination item and a standard sample of each examination item or a test sample taken from a subject (biological sample such as blood and urine), and generates standard data or test data. The analyzing device 70 includes a plurality of units that perform dispensing of a sample, dispensing of a reagent, and the like. The driving device 80 drives the respective units of the analyzing device 70. The processing device 90 controls the driving device 80 to allow the respective units of the analyzing device 70 to operate.

The processing device 90 includes an input device 50, an output device 40, a processing circuitry 30, and a storage circuit 60.

The input device 50 includes inputting devices such as a keyboard, a mouse, a button, and a touch key panel, and performs input for setting an analysis parameter for each examination item, input for setting test identification information of a test sample and an examination item, and the like.

The output device 40 includes a printer and a display. The printer performs printing of data generated by the processing circuitry 30. The display is a monitor such as a cathode ray tube (CRT) or a liquid crystal panel, and displays data generated by the processing circuitry 30.

The storage circuit 60 is, for example, a semiconductor memory element such as a random access memory (RAM) and a flash memory, or a storage device such as a hard disk and an optical disc.

The processing circuitry 30 controls the entire system. For example, as illustrated in FIG. 1, the processing circuitry 30 executes a data processing function 31 and a controlling function 32. The controlling function 32 controls the driving device 80 to allow the respective units of the analyzing device 70 to operate. The data processing function 31 processes standard data or test data generated by the analyzing device 70, and generates calibration data or analysis data of each examination item.

For example, the standard data generated by the analyzing device 70 represents data for determining an amount or density of a substance (a calibration curve or a standard curve), and the test data generated by the analyzing device 70 represents data as a result of measuring the test sample. The calibration data output from the processing circuitry 30 represents data representing a measurement result such as an amount or density of a substance derived from the test data and the standard data, and the analysis data output from the processing circuitry 30 represents data representing a positive or negative determination result. That is, the calibration data is data for deriving analysis data representing a positive or negative determination result.

For example, each of processing functions executed by a constituent element of the processing circuitry 30 is recorded in the storage circuit 60 as a computer-executable program. The processing circuitry 30 is a processor that reads out, from the storage circuit 60, and executes each computer program to implement a function corresponding to the computer program. In other words, the processing circuitry 30 that has read out each computer program is assumed to have each function illustrated in the processing circuitry 30 of FIG. 1.

In FIG. 1, each processing function described below is assumed to be implemented by the single processing circuitry 30. Alternatively, a processing circuitry may be configured by combining a plurality of independent processors, and each of the processors may execute a computer program to implement a function.

A word of "processor" used in the above description means, for example, a circuit such as a central processing unit (CPU), a graphics processing unit (GPU), an application specific integrated circuit (ASIC), and a programmable logic device (for example, a simple programmable logic device (SPLD), a complex programmable logic device (CPLD), and a field programmable gate array (FPGA)). In a case in which the processor is a CPU, for example, the processor implements a function by reading out and executing a computer program stored in the storage circuit 60. On the other hand, in a case in which the processor is an ASIC, for example, the computer program is directly incorporated in a circuit of the processor instead of storing the computer program in the storage circuit 60. Each of the processors according to the present embodiment is not necessarily configured as a single circuit, but a plurality of independent circuits may be combined and configured as one processor to implement a function thereof. Furthermore, a plurality of constituent elements in FIG. 1 may be integrated into one processor to implement a function thereof.

Figure 2:
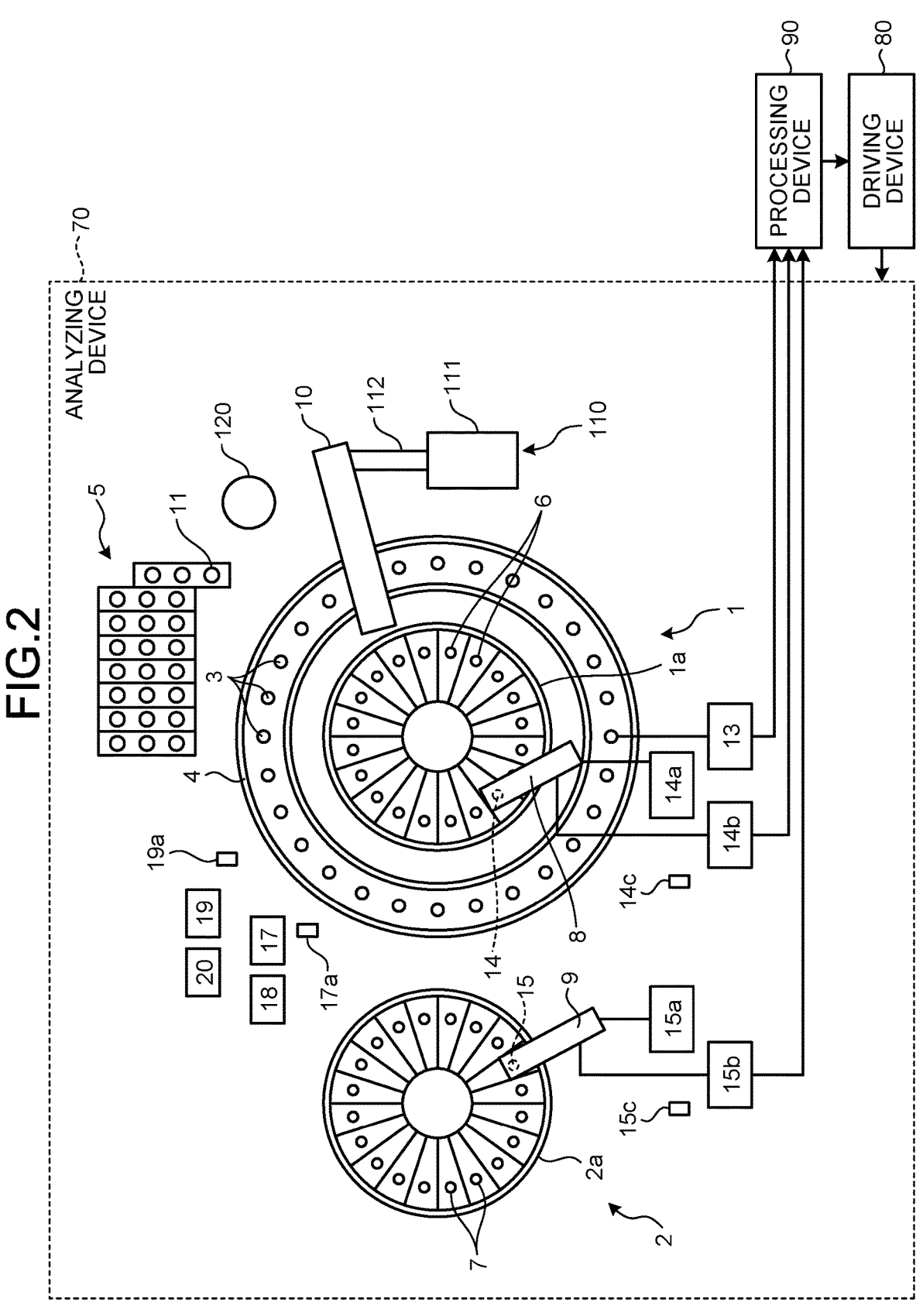
FIG. 2 is a diagram illustrating an example of a configuration of an analyzing device of the automatic analyzing device to which the reaction cuvette according to the first embodiment is applied.

FIG. 2 is a diagram illustrating an example of a configuration of the analyzing device 70 of the automatic analyzing device 100 to which a reaction cuvette 3 according to the first embodiment is applied.

The analyzing device 70 includes a sample rack 5 that holds a plurality of sample containers 11. Each of the sample containers 11 houses a sample such as a test sample or a standard sample of each examination item. In the example illustrated in FIG. 2, a plurality of sample racks 5 each housing three of the sample containers 11 are arranged. The number of the sample containers 11 housed in each of the sample racks 5 is not limited to three.

The analyzing device 70 further includes a plurality of the reaction cuvettes 3 disposed on a circumference, and a reaction disk 4 that holds each of the reaction cuvettes 3 in a rotatable manner. The reaction cuvette 3 is a single-use reaction cuvette, and is discarded after a mixed liquid in the reaction cuvette 3 is measured, for example.

The analyzing device 70 further includes a conveying device 110. The conveying device 110 includes a supplying part 111 and a transferring part 112. The supplying part 111 includes an accumulation unit that accumulates the reaction cuvettes 3 put into the accumulation unit, and a driving part that supplies the reaction cuvette 3 in the accumulation unit to the transferring part 112. The conveying device 110 moves the reaction cuvette 3 supplied from the supplying part 111 by the transferring part 112. The transferring part 112 moves the reaction cuvette 3 to a position at which a sample arm 10 (described later) can access the reaction cuvette 3. For example, the transferring part 112 includes two rails. The two rails are inclined downward from a starting end on the accumulation unit side toward a terminal end. The reaction cuvette 3 moves toward the terminal end along the rails by self-weight.

The analyzing device 70 further includes the sample arm 10. The sample arm 10 moves the reaction cuvette 3, which has been moved by the transferring part 112, to the sample rack 5. For example, the sample arm 10 accesses the reaction cuvette 3 that has moved to the terminal end of the rail, and moves the reaction cuvette 3 to the sample rack 5. Thereafter, the sample in the sample container 11 held by the sample rack 5 is aspirated into the reaction cuvette 3. For example, of the samples in the sample containers 11 held by the sample racks 5, the sample of an amount set as an analysis parameter for an examination item is aspirated into the reaction cuvette 3 by an aspirating device (described later). The sample arm 10 moves the reaction cuvette 3 containing the sample to the reaction disk 4.

The analyzing device 70 further includes a plurality of reagent containers 6, a reagent storage 1 that stores each of the reagent containers 6, a plurality of reagent containers 7, and a reagent storage 2 that stores each of the reagent containers 7. Each of the reagent containers 6 and 7 houses a reagent containing a component that reacts with a component of each examination item contained in the sample. For example, the reagent container 6 houses a reagent of one reagent system or a first reagent of a two reagent system, and the reagent container 7 houses a second reagent that is different from the reagent of the two reagent system in the reagent container 6 of each examination item. The reagent storage 1 includes a reagent rack 1a serving as a turntable that holds the reagent container 6 of each examination item in a rotatable manner. The reagent storage 2 includes a reagent rack 2a serving as a turntable that holds the reagent container 7 of each examination item in a rotatable manner.

The analyzing device 70 further includes a reagent dispensing probe 14, a reagent dispensing arm 8, a reagent dispensing pump 14a, a reagent detector 14b, a cleaning tank 14c, a mixer 17, a mixing arm 18, and a cleaning tank 17a. The reagent dispensing probe 14 dispenses the reagent in the reagent container 6. Specifically, the reagent dispensing probe 14 aspirates the reagent in the reagent container 6 of each examination item held by the reagent rack 1a, and dispenses the reagent of an amount set as an analysis parameter for the examination item into the reaction cuvette 3 containing the sample. The reagent dispensing arm 8 supports the reagent dispensing probe 14 to be capable of rotating and moving upward or downward. The reagent dispensing pump 14a allows the reagent dispensing probe 14 to aspirate and dispense the reagent. As a liquid surface detection function, the reagent detector 14b determines that the reagent in the reagent container 6 is detected when a distal end part of the reagent dispensing probe 14 descending from an upper side of a liquid surface becomes close to or is brought into contact with the liquid surface of the reagent in the reagent container 6 held by the reagent rack 1a. Specifically, the reagent detector 14b is electrically connected to the reagent dispensing probe 14, and detects the liquid surface of the reagent in the reagent container 6 due to a change in capacitance that is allowed when the distal end part of the reagent dispensing probe 14 becomes close to or is brought into contact with the reagent in the reagent container 6. When the liquid surface of the reagent in the reagent container 6 is detected, the reagent dispensing pump 14a allows the reagent dispensing probe 14 to aspirate and dispense the reagent. The cleaning tank 14c cleans the reagent dispensing probe 14 every time the reagent is dispensed. The mixer 17 stirs a mixed liquid of the sample and the reagent in the reaction cuvette 3. The mixing arm 18 supports the mixer 17 to be capable of rotating and moving upward or downward. The cleaning tank 17a cleans the mixer 17 every time the mixed liquid is stirred.

The analyzing device 70 further includes a reagent dispensing probe 15, a reagent dispensing arm 9, a reagent dispensing pump 15a, a reagent detector 15b, a cleaning tank 15c, a mixer 19, a mixing arm 20, and a cleaning tank 19a. The reagent dispensing probe 15 dispenses the reagent in the reagent container 7. Respective functions of the reagent dispensing probe 15, the reagent dispensing arm 9, the reagent dispensing pump 15a, the reagent detector 15b, the cleaning tank 15c, the mixer 19, the mixing arm 20, and the cleaning tank 19a are the same as those of the reagent dispensing probe 14, the reagent dispensing arm 8, the reagent dispensing pump 14a, the reagent detector 14b, the cleaning tank 14c, the mixer 17, the mixing arm 18, and the cleaning tank 17a, so that description thereof will not be repeated.

The analyzing device 70 further includes a measuring part 13 and a discarding part 120. The measuring part 13 measures the mixed liquid by applying light to the reaction cuvette 3 housing the mixed liquid that has been stirred. Specifically, the measuring part 13 applies light to the reaction cuvette 3 that is rotating at a measurement position, and detects light transmitted through the mixed liquid of the sample and the reagent in the reaction cuvette 3 due to the application of light. The measuring part 13 then processes a detected signal to generate standard data or test data represented by a digital signal, and outputs the standard data or the test data to the processing circuitry 30 of the processing device 90. The reaction cuvette 3 is a single-use reaction cuvette, and discarded after the mixed liquid in the reaction cuvette 3 is measured. The discarding part 120 is a vessel for discarding the reaction cuvette 3 that has been completely measured by the measuring part 13. For example, the sample arm 10 moves the reaction cuvette 3 that has been completely measured to the discarding part 120 to discard the reaction cuvette 3.

The driving device 80 drives the respective units of the analyzing device 70.

The driving device 80 includes a mechanism for driving the sample rack 5 of the analyzing device 70, and moves each of the sample containers 11. The driving device 80 also includes a mechanism for driving the reagent rack 1a of the reagent storage 1, and rotates each of the reagent containers 6. The driving device 80 also includes a mechanism for driving the reagent rack 2a of the reagent storage 2, and rotates each of the reagent containers 7. The driving device 80 also includes a mechanism for driving the reaction disk 4, and rotates each of the reaction cuvettes 3.

The driving device 80 also includes a mechanism for allowing the sample arm 10 to rotate and move upward or downward, and moves the reaction cuvette 3 from the transferring part 112 to the sample rack 5 holding the sample container 11 by driving the sample arm 10. The driving device 80 also moves the reaction cuvette 3 containing the sample from the sample rack 5 to the reaction disk 4 by driving the sample arm 10. The driving device 80 also moves the reaction cuvette 3 that has been completely measured from the reaction disk 4 to the discarding part 120 by driving the sample arm 10.

The driving device 80 also includes a mechanism for allowing the reagent dispensing arms 8 and 9 to rotate and move upward or downward, and allows the reagent dispensing probes 14 and 15 to move between the reaction cuvette 3 and the respective reagent containers 6 and 7. The driving device 80 also includes a mechanism for driving the reagent dispensing pumps 14a and 15a, and allows each of the reagent dispensing probes 14 and 15 to dispense the reagent. That is, the driving device 80 allows the reagent dispensing probes 14 and 15 to aspirate reagents in the respective reagent containers 6 and 7, and to dispense the reagents to the reaction cuvette 3. The driving device 80 also includes a mechanism for driving the mixing arms 18 and 20, and moves the mixers 17 and 19 into the reaction cuvette 3. The driving device 80 also includes a mechanism for driving the mixers 17 and 19, and allows the mixers 17 and 19 to stir the sample and the reagent in the reaction cuvette 3.

The controlling function 32 of the processing device 90 controls the driving device 80 to allow the respective units of the analyzing device 70 to operate.

In the automatic analyzing device, typically, the sample dispensing probe aspirates the sample and dispenses the sample to the reaction cuvette, and the sample dispensing probe is cleaned every time dispensing of the sample ends. However, with a scheme in which the sample dispensing probe aspirates the sample and dispenses the sample to the reaction cuvette, there may be a case in which the sample is not sufficiently removed by cleaning, and carry-over is generated when the sample dispensing probe that has dispensed the sample is cleaned. Due to generation of carry-over, for example, a phenomenon occurs such that a measurement result of the next measurement becomes an unusually high value.

Thus, the reaction cuvette 3 used in the automatic analyzing device 100 according to the present embodiment is configured as follows so as to improve measurement efficiency. The reaction cuvette 3 according to the present embodiment is used for measurement by the automatic analyzing device 100, and is a reaction cuvette housing the mixed liquid of the reagent and the sample to be measured. The reaction cuvette 3 includes a cuvette main body and an aspiration port. The aspiration port is disposed on the cuvette main body, and allows a fluid to flow into an inner part of the cuvette main body from a bottom surface side of the cuvette main body.

The following describes a configuration example of the reaction cuvette 3 according to the first embodiment with reference to FIG. 3 to FIG. 5.

FIG. 3A to FIG. 3F are cross-sectional views each illustrating a first configuration example of the reaction cuvette 3 and an aspirating device 330 according to the first embodiment.

Figure 3A:
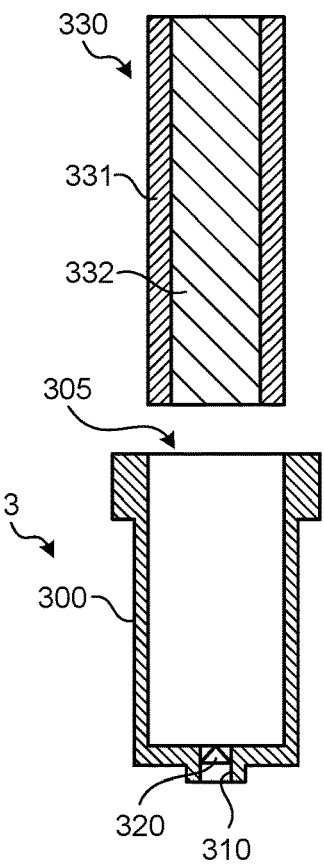
FIG. 3A to FIG. 3F are cross-sectional views illustrating a first configuration example of the reaction cuvette and an aspirating device according to the first embodiment for explaining a suction operation.

As illustrated in FIG. 3A, the reaction cuvette 3 includes a cuvette main body 300 having an upper surface on which an opening 305 is formed, and a flange disposed on the opening 305 side of the cuvette main body 300. An outer diameter of the flange is larger than an outer diameter of the cuvette main body 300. For example, to properly align the reaction cuvettes 3 supplied from the supplying part 111 in FIG. 2 by the rails included in the transferring part 112, a distance between the rails is longer than the outer diameter of the cuvette main body 300, and shorter than the outer diameter of the flange.

On the cuvette main body 300, an aspiration port 310 is disposed for allowing an aspirated sample 130 to flow into the inner part of the cuvette main body 300. For example, the aspiration port 310 is disposed on a bottom surface part of the cuvette main body 300. On the aspiration port 310, a backflow prevention part 320 is disposed for preventing backflow from the inner part of the cuvette main body 300 toward the outside. A specific example of the backflow prevention part 320 will be described later. The sample 130 is an example of a fluid.

As illustrated in FIG. 3A, the sample 130 housed in the sample container 11 is aspirated by the aspirating device 330 detachable from the cuvette main body 300. In other words, the cuvette main body 300 is detachable from the aspirating device 330. That is, the sample 130 is allowed to flow into the inner part of the cuvette main body 300 through the aspiration port 310 disposed on the bottom surface part of the cuvette main body 300 by being aspirated by the aspirating device 330. In this case, the reagent that reacts with the sample 130 is dispensed through the opening 305 of the cuvette main body 300. The opening 305 of the cuvette main body 300 is formed at an end part on the opposite side of the bottom surface part of the cuvette main body 300.

The aspirating device 330 includes a connection part 331 that is formed to be detachable from the reaction cuvette 3, and a suction pump part 332 for aspirating the sample 130 into the cuvette main body 300 through the aspiration port 310. An outer diameter of the connection part 331 is substantially the same as an inner diameter of the cuvette main body 300. The connection part 331 is connected to the reaction cuvette 3 when a front end side of the connection part 331 is inserted into the inner part of the cuvette main body 300 through the opening 305 of the cuvette main body 300. The aspirating device 330 is, for example, a mechanism held by the automatic analyzing device 100, and is attached to a distal end of the sample arm 10. The suction pump part 332 is, for example, a cylinder made of metal, and is connected to a mechanism for allowing the cylinder to operate upward or downward (not illustrated) at the distal end of the sample arm 10. The cylinder made of metal is exemplified as a part of allowing the suction pump part 332 to operate upward or downward, but the suction pump part 332 may be allowed to operate upward or downward by using a medium such as water, for example.

Next, the following describes a suction operation in a first configuration example of the reaction cuvette 3 and the aspirating device 330 according to the first embodiment with reference to FIG. 3A to FIG. 3F. The suction operation is performed when the driving device 80 drives the sample arm 10, the suction pump part 332 of the aspirating device 330, and the like in accordance with a control signal output from the controlling function 32 of the processing device 90. Details about processing including the suction operation performed by the automatic analyzing device 100 will be described later.

Figure 3B:
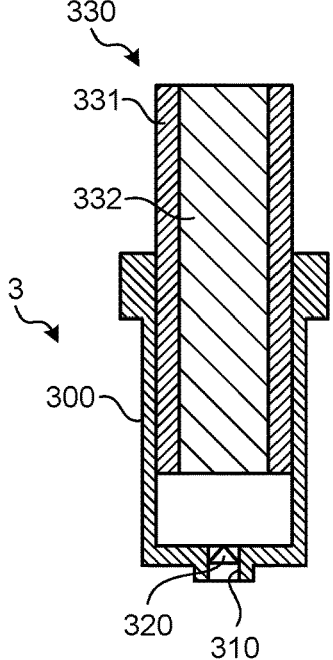
Figure 3C:
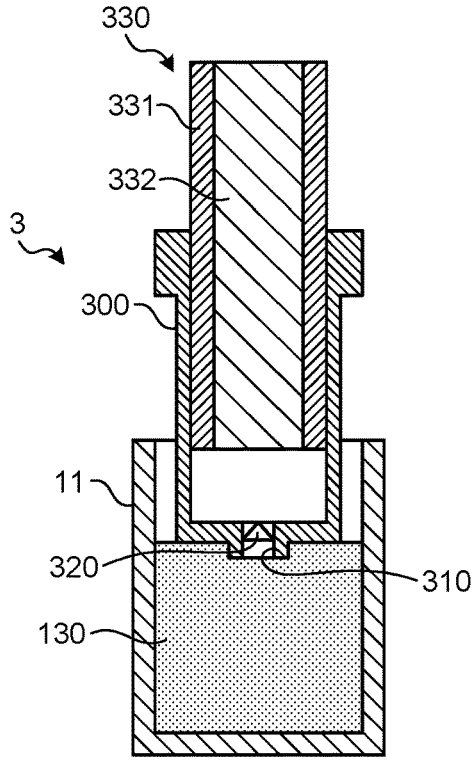
Figure 3D:
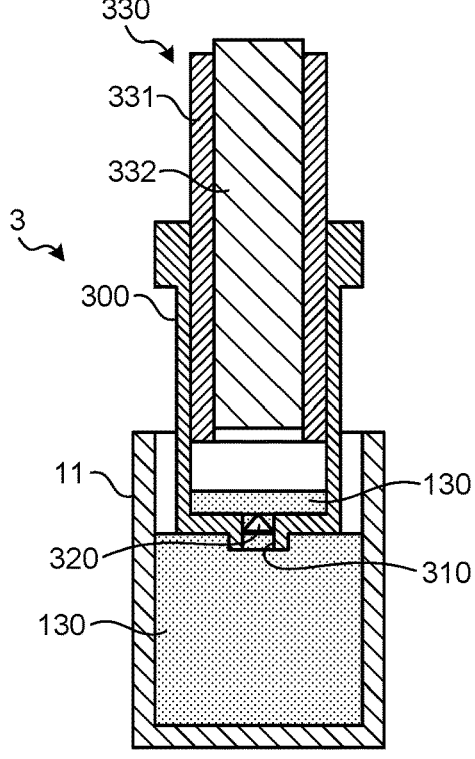
Figure 3E:
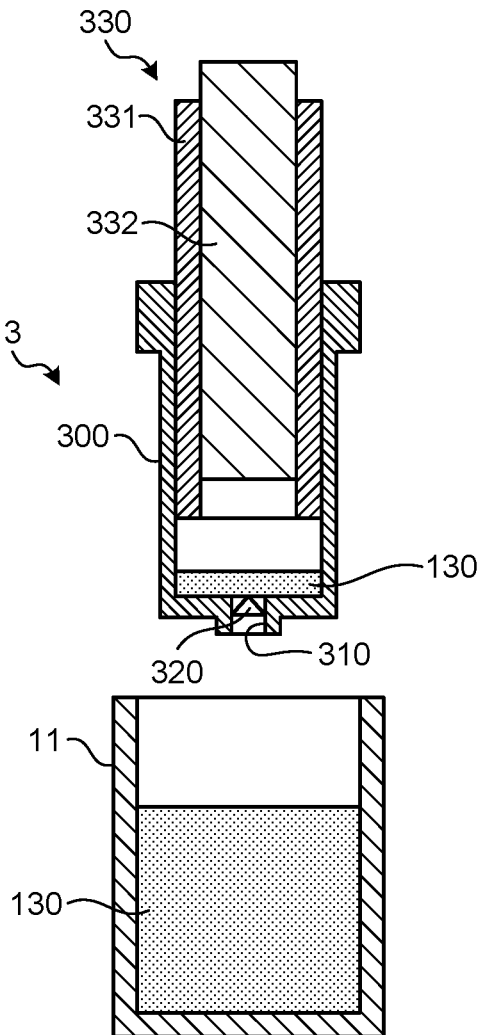
Figure 3F:
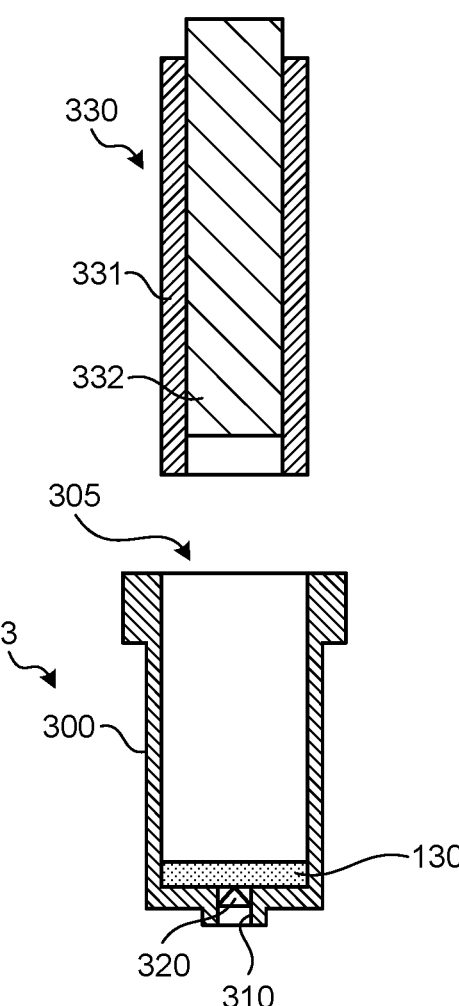

First, in FIG. 3A and FIG. 3B, the driving device 80 connects the connection part 331 of the aspirating device 330 attached to the distal end of the sample arm 10 to the opening 305 of the cuvette main body 300 of the reaction cuvette 3 that has moved to the terminal end of the rail of the transferring part 112. Next, in FIG. 3C, the driving device 80 allows the aspirating device 330 at the distal end of the sample arm 10 to descend, and brings the aspiration port 310 of the reaction cuvette 3 connected to the aspirating device 330 into contact with the sample 130 in the sample container 11 held by the sample rack 5. Next, in FIG. 3D, the driving device 80 moves the suction pump part 332 of the aspirating device 330 upward to allow the sample 130 in the sample container 11 held by the sample rack 5 to flow into the inner part of the cuvette main body 300 of the reaction cuvette 3 by suction performed by the suction pump part 332. Next, in FIG. 3E, the driving device 80 allows the reaction cuvette 3 connected to the aspirating device 330 at the distal end of the sample arm 10 to ascend. Thereafter, as illustrated in FIG. 3F, the driving device 80 allows the connection part 331 of the aspirating device 330 to be disengaged from the cuvette main body 300 of the reaction cuvette 3. Specifically, after moving the reaction cuvette 3 to the reaction disk 4, the driving device 80 allows the connection part 331 of the aspirating device 330 to be disengaged from the cuvette main body 300 of the reaction cuvette 3.

In this way, the aspirating device 330 is connected to the opening 305 of the cuvette main body 300 at the time of aspirating the sample 130, aspirates the sample 130 after being connected to the cuvette main body 300, allows the sample 130 to flow into the inner part of the cuvette main body 300 through the aspiration port 310, and is disengaged from the cuvette main body 300 after aspirating the sample 130.

Figure 4A:
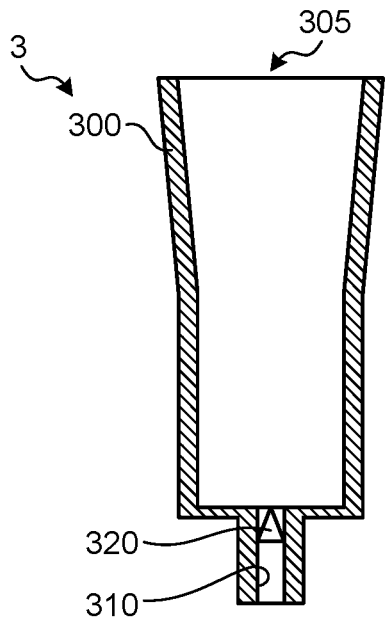
FIG. 4A is a cross-sectional view illustrating a second configuration example of the reaction cuvette according to the first embodiment.
Figure 4B:
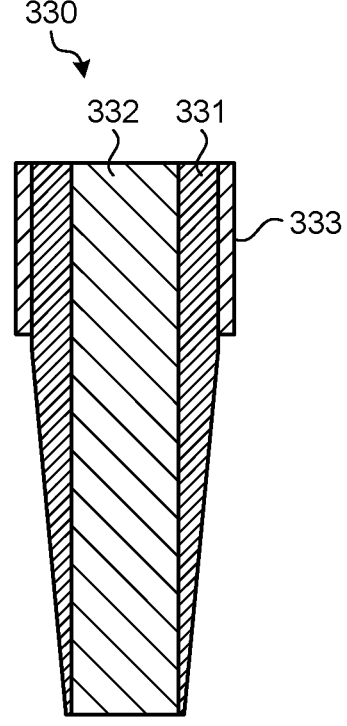
FIG. 4B is a cross-sectional view illustrating a second configuration example of the aspirating device according to the first embodiment.

FIG. 4A and FIG. 4B are cross-sectional views illustrating a second configuration example of the reaction cuvette 3 and the aspirating device 330 according to the first embodiment. Regarding the second configuration example, changes from the first configuration example will be described.

As illustrated in FIG. 4A, in the second configuration example, the reaction cuvette 3 does not include the flange in the first configuration example. For example, the cuvette main body 300 has a tapered structure tapering from the opening 305 of the cuvette main body 300 toward a center portion. That is, the outer diameter of the cuvette main body 300 is gradually increased from the center portion of the cuvette main body 300 toward the opening 305. For example, to properly align the reaction cuvettes 3 supplied from the supplying part 111 by the two rails of the transferring part 112, the distance between the rails is longer than an outer diameter of the center portion of the cuvette main body 300 of the reaction cuvette 3, and is shorter than an outer diameter of the opening 305 of the cuvette main body 300. Due to this, the cuvette main body 300 is easily connected to the aspirating device 330 due to the tapered structure, and can be connected thereto more firmly. On the bottom surface part of the cuvette main body 300, the aspiration port 310 is disposed for allowing the aspirated sample 130 to flow into the inner part of the cuvette main body 300.

As illustrated in FIG. 4B, in the aspirating device 330, the connection part 331 is formed so that a front end side of the connection part 331 has a tapered structure. The aspirating device 330 further includes a disengagement part 333 for being disengaged from the cuvette main body 300 after aspirating the sample 130. For example, the disengagement part 333 is disposed on the other end side of the connection part 331 opposite to the front end side connected to the cuvette main body 300. The disengagement part 333 is a mechanism for allowing the connection part 331 of the aspirating device 330 to be disengaged from the cuvette main body 300 of the reaction cuvette 3. An operation of the disengagement part 333 will be described later.

Figure 4C:
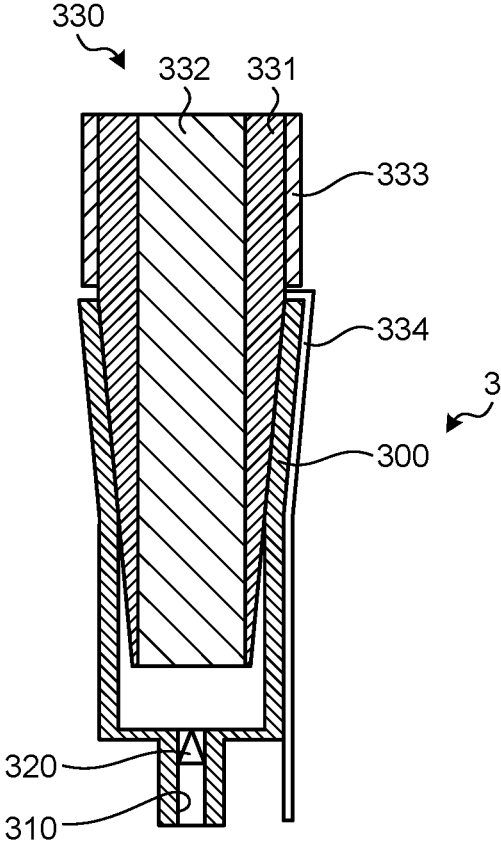
FIG. 4C is a connection diagram of the second configuration example of the reaction cuvette and the aspirating device according to the first embodiment.

FIG. 4C is a connection diagram of the second configuration example of the reaction cuvette 3 and the aspirating device 330 according to the first embodiment. In a case in which the connection part 331 of the aspirating device 330 is connected to the opening 305 of the cuvette main body 300 of the reaction cuvette 3, an end part on the opening 305 side of the disengagement part 333 of the aspirating device 330 is opposed to an end part forming the opening 305 of the cuvette main body 300.

As illustrated in FIG. 4C, the aspirating device 330 further includes a detection part 334 that detects contact of the sample 130 in the sample container 11 held by the sample rack 5. For example, the detection part 334 is a capacitive contact sensor formed to be brought into contact with the sample 130 in the sample container 11 earlier than the aspiration port 310, and the detection part 334 determines that the sample in the sample container 11 is detected when a distal end part of the detection part 334 is brought into contact with a liquid surface of the sample in the sample container 11 held by the sample rack 5. Specifically, the detection part 334 detects the liquid surface of the sample in the sample container 11 due to change in capacitance at the time when the distal end part of the detection part 334 is brought into contact with the sample in the sample container 11. When the liquid surface of the sample in the sample container 11 is detected, the sample 130 in the sample container 11 is allowed to flow into the inner part of the cuvette main body 300 of the reaction cuvette 3 by being aspirated by the suction pump part 332. Various sensors that can detect contact with a liquid sample, such as a contact sensor using a conductivity switch, can be used as the detection part 334 instead of the capacitive contact sensor described above.

In this way, the aspirating device 330 detects contact between the sample 130 and the aspiration port 310 by the detection part 334, and starts to aspirate the sample 130 when the detection part 334 detects the contact therebetween.

Next, the following describes the suction operation in the second configuration example of the reaction cuvette 3 and the aspirating device 330 according to the first embodiment with reference to FIG. 5A to FIG. 5G.

Figure 5A:
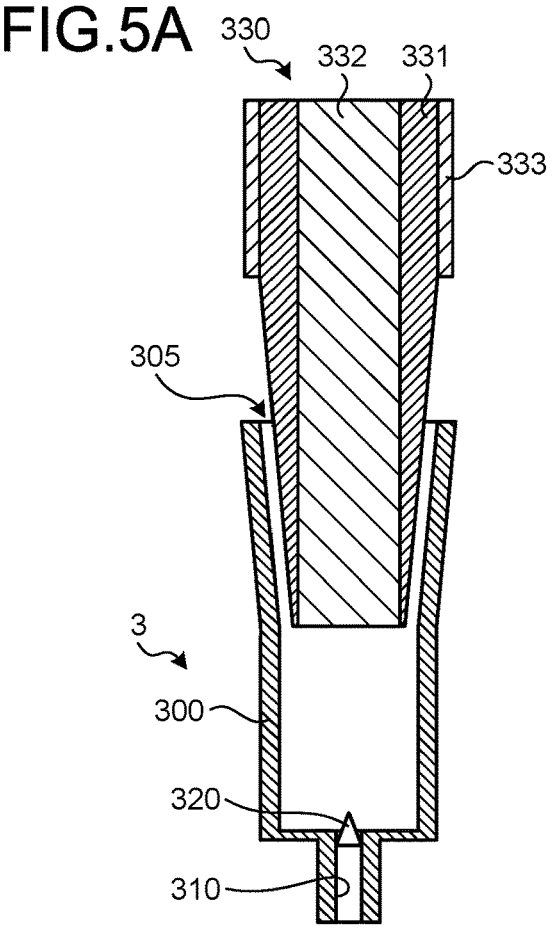
FIG. 5A to FIG. 5G are diagrams for explaining a suction operation in the second configuration example of the reaction cuvette and the aspirating device according to the first embodiment.
Figure 5B:
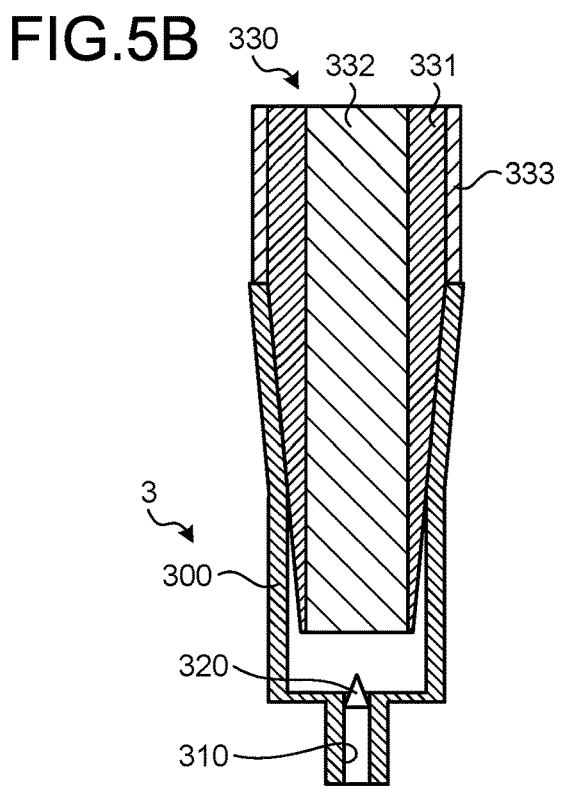
Figure 5C:
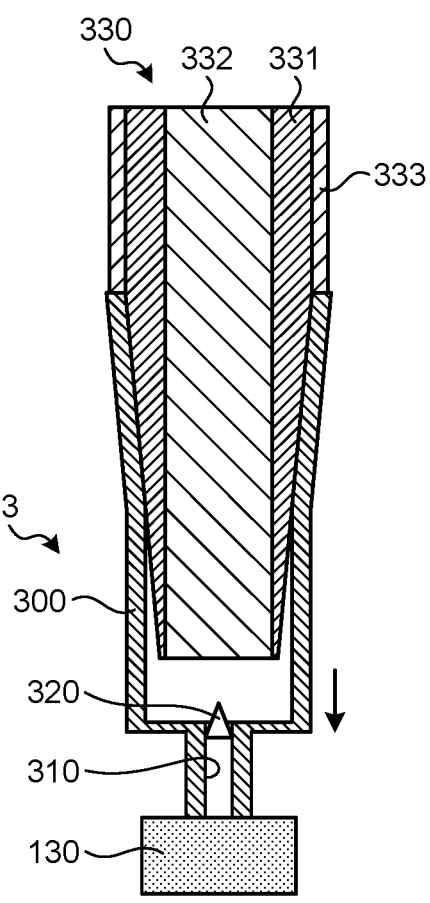
Figure 5D:
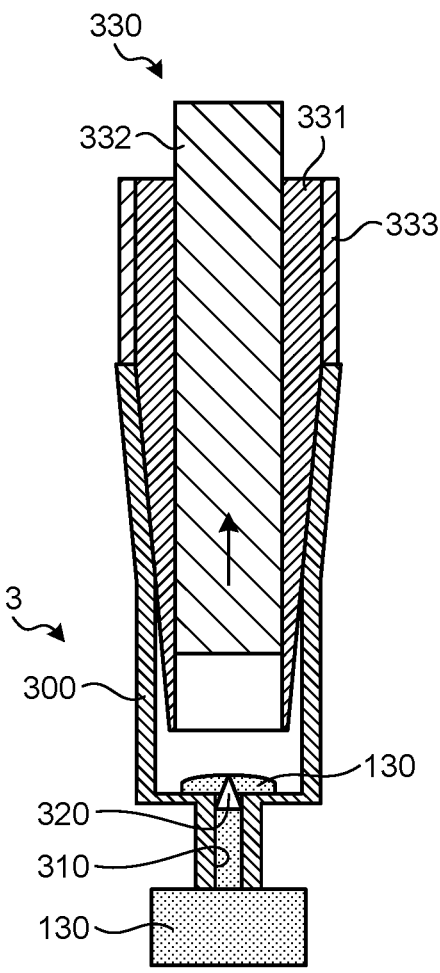

First, in FIG. 5A, the driving device 80 allows the connection part 331 of the aspirating device 330 at the distal end of the sample arm 10 to be connected to the opening 305 of the cuvette main body 300 of the reaction cuvette 3 that has moved to the terminal end of the rail of the transferring part 112. At this point, in FIG. 5B, the disengagement part 333 of the aspirating device 330 is positioned at an end part forming the opening 305 of the cuvette main body 300. Next, in FIG. 5C, the driving device 80 allows the aspirating device 330 at the distal end of the sample arm 10 to descend, and brings the aspiration port 310 of the reaction cuvette 3 connected to the aspirating device 330 into contact with the sample 130 in the sample container 11 held by the sample rack 5. Next, in FIG. 5D, by moving the suction pump part 332 of the aspirating device 330 upward, the driving device 80 allows the sample 130 in the sample container 11 held by the sample rack 5 to flow into the inner part of the cuvette main body 300 of the reaction cuvette 3 by suction performed by the suction pump part 332.

Figure 5E:
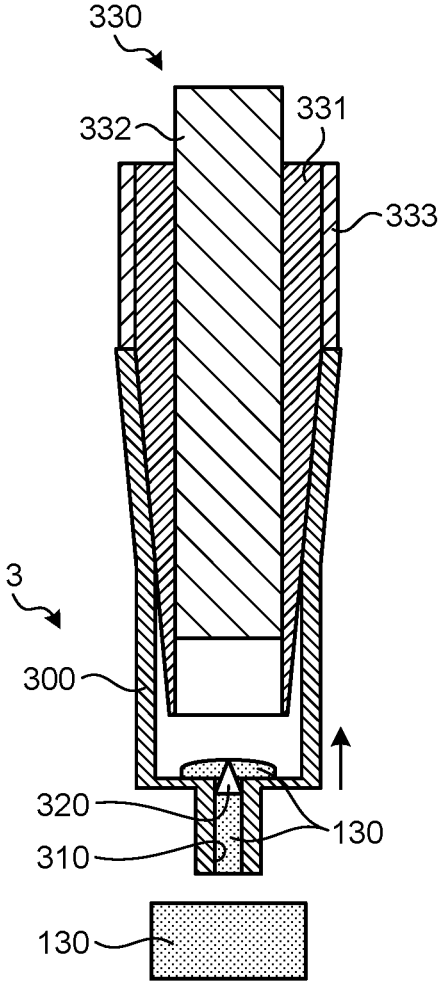
Figure 5F:
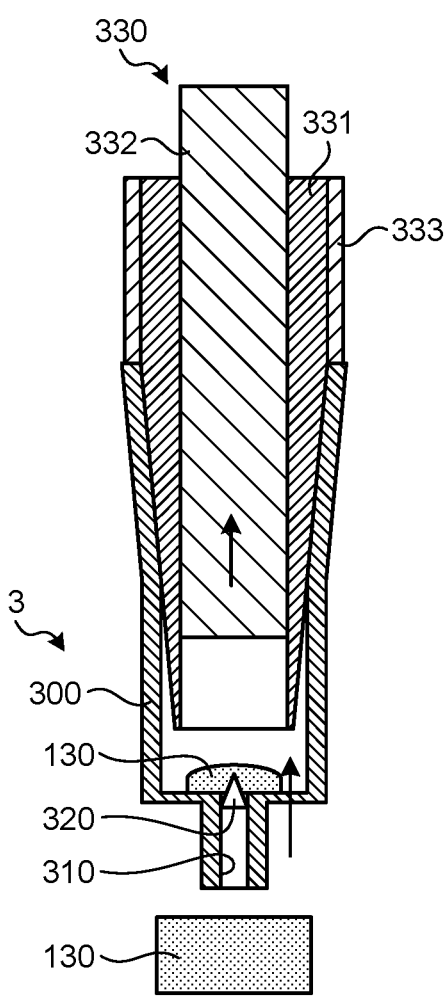
Figure 5G:
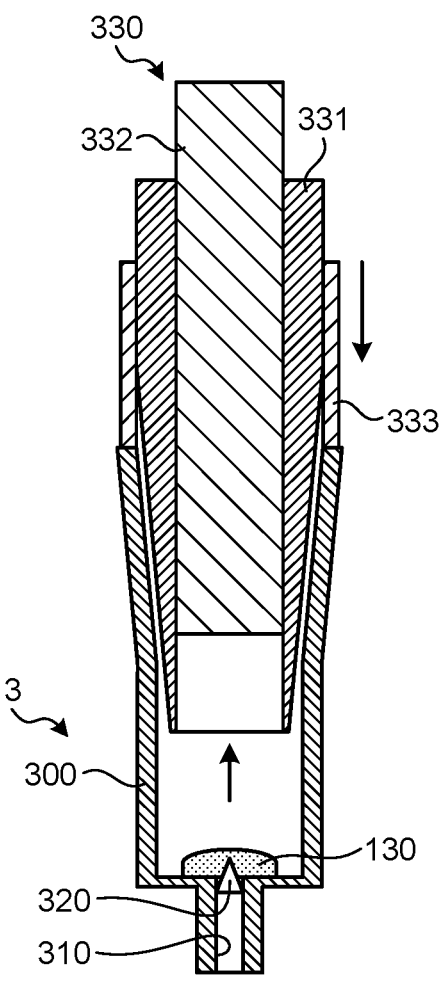

Next, in FIG. 5E, the driving device 80 allows the reaction cuvette 3 connected to the aspirating device 330 at the distal end of the sample arm 10 to ascend. At this point, in FIG. 5F, by further moving the suction pump part 332 of the aspirating device 330 upward, the driving device 80 allows the sample 130 remaining at the aspiration port 310 of the reaction cuvette 3 to flow into the inner part of the cuvette main body 300 of the reaction cuvette 3 by suction performed by the suction pump part 332. Thereafter, in FIG. 5G, the driving device 80 moves the disengagement part 333 of the aspirating device 330 downward, and allows the connection part 331 of the aspirating device 330 to ascend in a state in which the disengagement part 333 presses down the end part forming the opening 305 of the cuvette main body 300 of the reaction cuvette 3 to allow the connection part 331 of the aspirating device 330 to be disengaged from the cuvette main body 300 of the reaction cuvette 3. Specifically, after moving the reaction cuvette 3 to the reaction disk 4, the driving device 80 allows the connection part 331 of the aspirating device 330 to be disengaged from the cuvette main body 300 of the reaction cuvette 3.

In the first and the second configuration examples of the reaction cuvette 3 and the aspirating device 330 according to the first embodiment, in a case in which air pressure inside the cuvette main body 300 becomes high when the connection part 331 of the aspirating device 330 is connected to the opening 305 of the cuvette main body 300 of the reaction cuvette 3, suction may be performed by the suction pump part 332 of the aspirating device 330. The aspirating device 330 includes the detection part 334 that detects contact with the sample 130 in the sample container 11 in the second configuration example, but the embodiment is not limited thereto. The aspirating device 330 may include the detection part 334 also in the first configuration example. The aspirating device 330 does not necessarily include the detection part 334, and may measure the liquid surface of the sample 130 in advance to allow the aspirating device 330 at the distal end of the sample arm 10 to descend by a distance corresponding to a distance to the measured liquid surface of the sample 130 and an amount (predetermined amount) of the sample to be aspirated.

The following describes a specific example of the backflow prevention part 320 of the reaction cuvette 3 according to the first embodiment with reference to FIG. 6 to FIG. 10.

Figure 6:
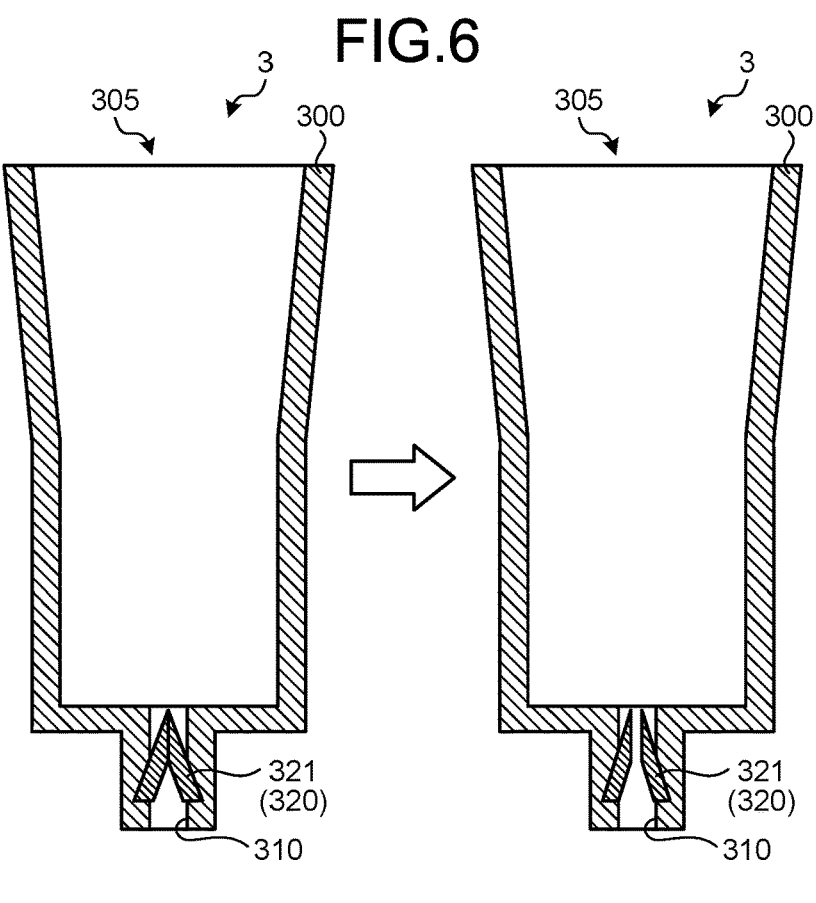
FIG. 6 is a diagram illustrating a specific example of a backflow prevention part of the reaction cuvette according to the first embodiment.

For example, as illustrated in FIG. 6, the backflow prevention part 320 is a check valve 321 that prevents backflow in a direction from the cuvette main body 300 to the aspiration port 310. As illustrated on the right side of FIG. 6, the check valve 321 is released when the air pressure inside the cuvette main body 300 is reduced, and the sample 130 can be aspirated into the inner part of the cuvette main body 300. As illustrated on the left side of FIG. 6, the check valve 321 is closed at the time when the air pressure inside the cuvette main body 300 becomes equal to the outside air pressure, and prevents backflow of the sample 130.

Figure 7:
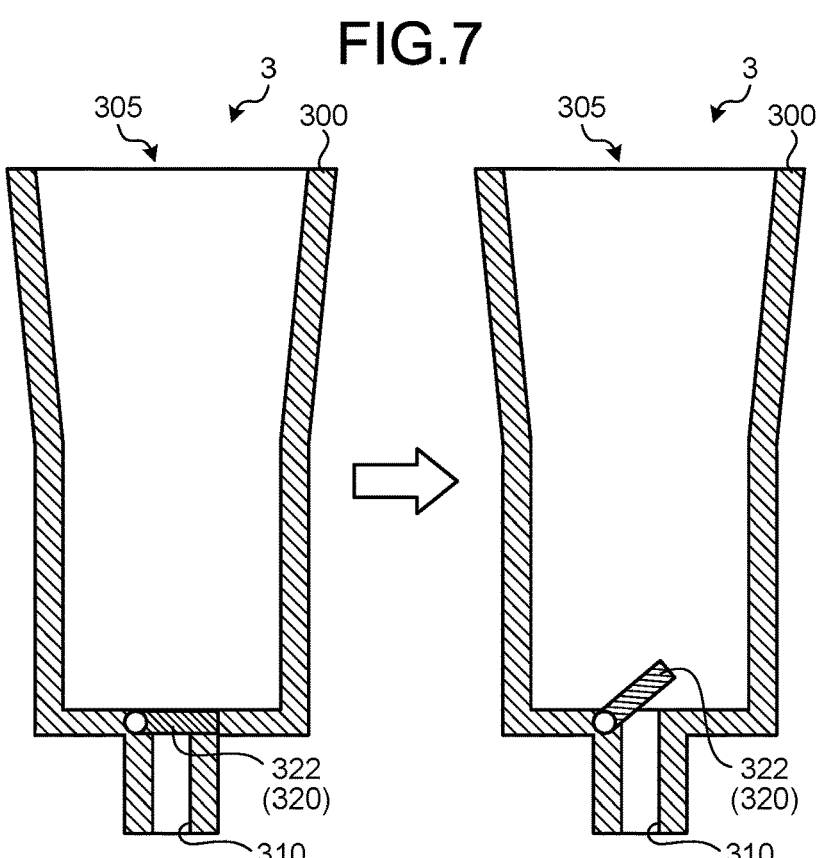
FIG. 7 is a diagram illustrating a specific example of the backflow prevention part of the reaction cuvette according to the first embodiment.

The check valve 321 is exemplified above as an example of preventing backflow of the sample 130, but the backflow prevention part 320 does not necessarily have a shape of the check valve 321 so long as the backflow prevention part 320 is a mechanism that prevents backflow of the sample 130 inside the cuvette main body 300. For example, the backflow prevention part 320 may be a valve 322 of a flap gate type as illustrated in FIG. 7. The valve 322 of a flap gate type closes the aspiration port 310 in a normal state as illustrated on the left side of FIG. 7. The valve 322 of a flap gate type releases the aspiration port 310 at the time of aspirating the sample 130 as illustrated on the right side of FIG. 7.

Figures 8, 9:
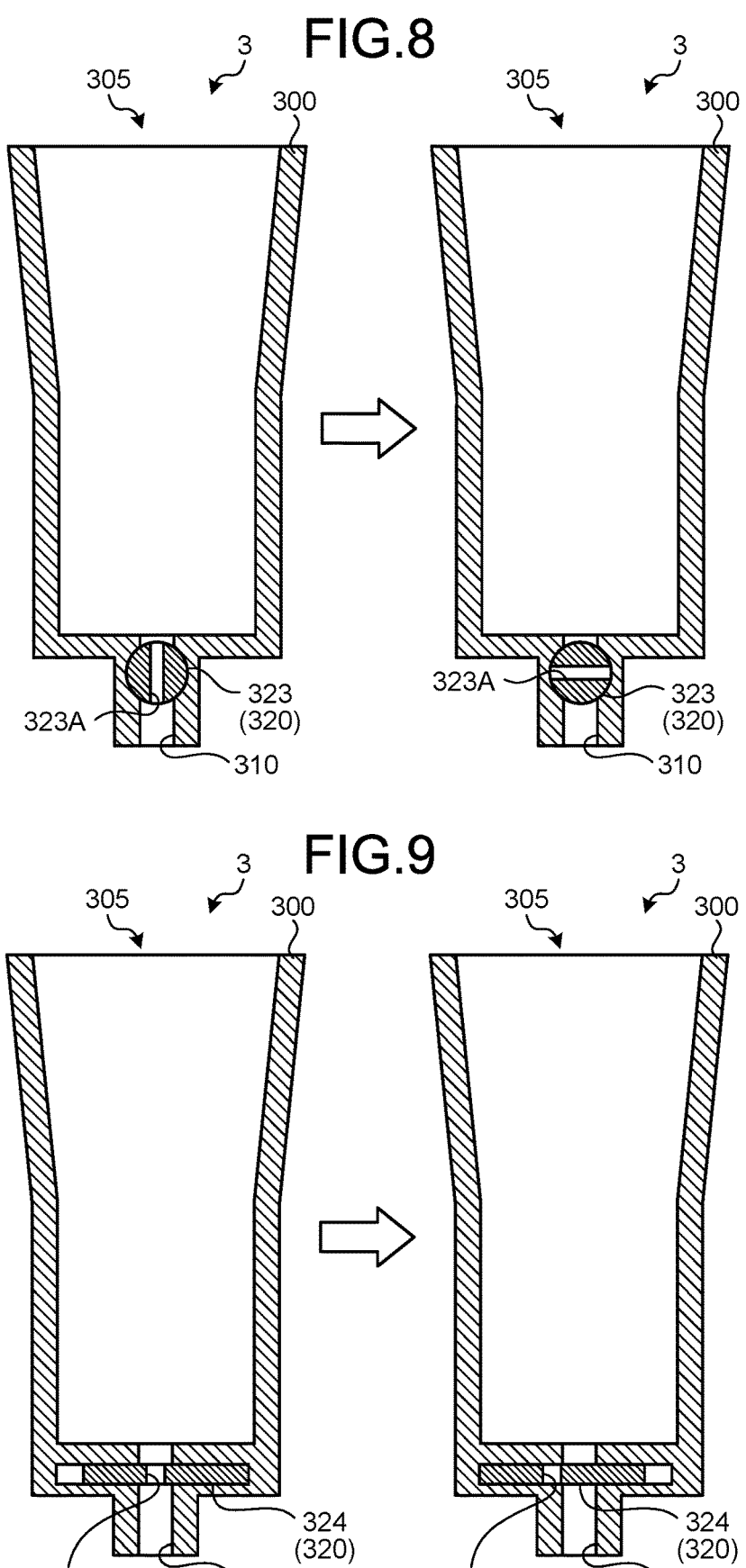
FIG. 8 is a diagram illustrating a specific example of the backflow prevention part of the reaction cuvette according to the first embodiment.
FIG. 9 is a diagram illustrating a specific example of the backflow prevention part of the reaction cuvette according to the first embodiment.
Figure 10:
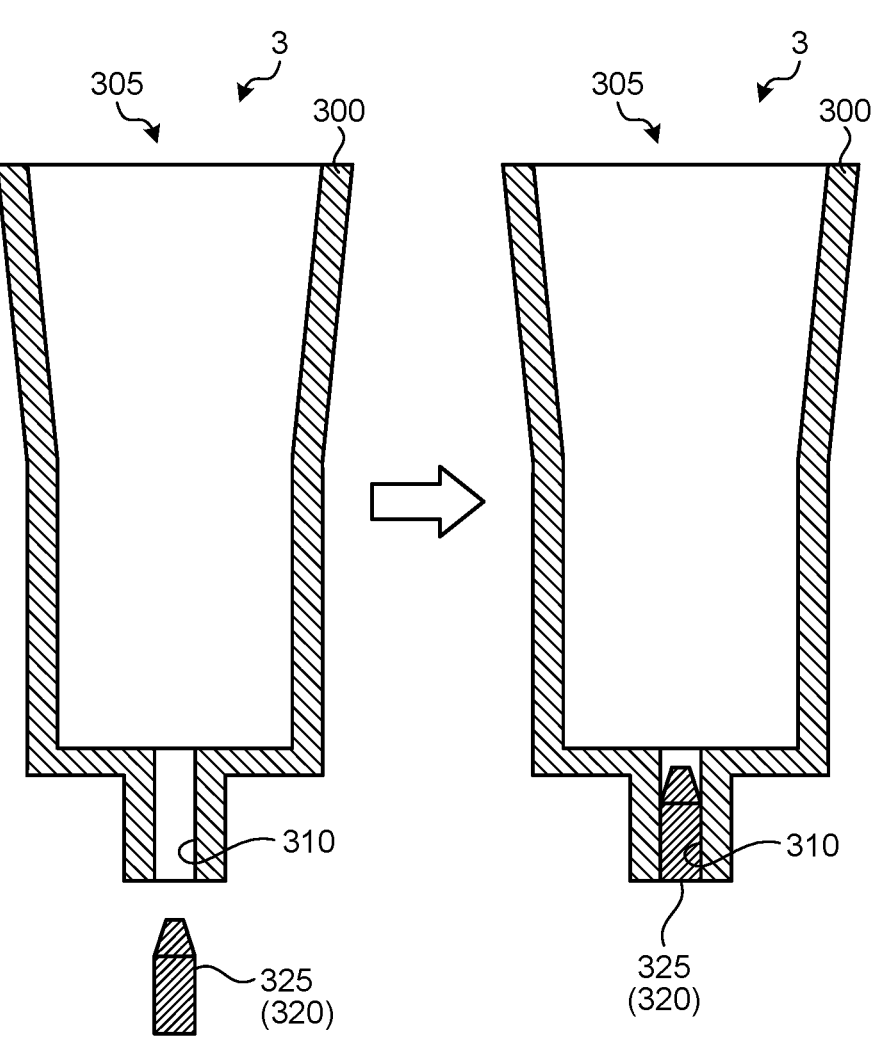
FIG. 10 is a diagram illustrating a specific example of the backflow prevention part of the reaction cuvette according to the first embodiment.

Alternatively, as illustrated in FIG. 8, the backflow prevention part 320 is a flow channel closing part 323 that prevents backflow in a direction from the aspiration port 310 to the cuvette main body 300. For example, the flow channel closing part 323 is a rotating body disposed at the aspiration port 310 on the bottom surface part of the cuvette main body 300, and a through hole 323A is formed in the flow channel closing part 323. As illustrated on the left side of FIG. 8, the flow channel closing part 323 forms a flow channel from the aspiration port 310 to the cuvette main body 300 via the through hole 323A in a normal state, and closes the flow channel after the sample 130 is aspirated as illustrated on the right side of FIG. 8. For example, in FIG. 8, the driving device 80 rotates the flow channel closing part 323 a half-turn by a mechanical operation or magnetism to close the flow channel after the sample 130 is aspirated.

The flow channel closing part 323 is exemplified above as an example of preventing backflow of the sample 130, but the backflow prevention part 320 does not necessarily have a shape of the flow channel closing part 323 so long as the backflow prevention part 320 is a mechanism that prevents backflow of the sample 130 inside the cuvette main body 300. For example, the backflow prevention part 320 may be a flow channel closing part 324 as illustrated in FIG. 9. For example, the flow channel closing part 324 is a member disposed to be slidable in a horizontal direction within the bottom surface part of the cuvette main body 300, and a through hole 324A is formed in the flow channel closing part 324. As illustrated on the left side of FIG. 9, the flow channel closing part 324 forms a flow channel from the aspiration port 310 to the cuvette main body 300 via the through hole 324A in a normal state, and closes the flow channel after the sample 130 is aspirated as illustrated on the right side of FIG. 9. For example, in FIG. 9, the driving device 80 allows the flow channel closing part 324 to slide in the left direction by a set amount after the sample 130 is aspirated to close the flow channel.

The valve and the mechanism for closing the flow channel are exemplified above as an example of preventing backflow of the sample 130, but the backflow prevention part 320 may be a plug 325 so long as the backflow prevention part 320 is a mechanism that prevents backflow of the sample 130 inside the cuvette main body 300. A manner of closing the flow channel by deforming the aspiration port 310 by heat or pressure may be used instead of a manner of preventing backflow of the sample 130 with the plug 325.

FIG. 11A to FIG. 11F are diagrams illustrating a processing procedure of the automatic analyzing device 100 to which the reaction cuvette 3 according to the first embodiment is applied.

Figure 11A:
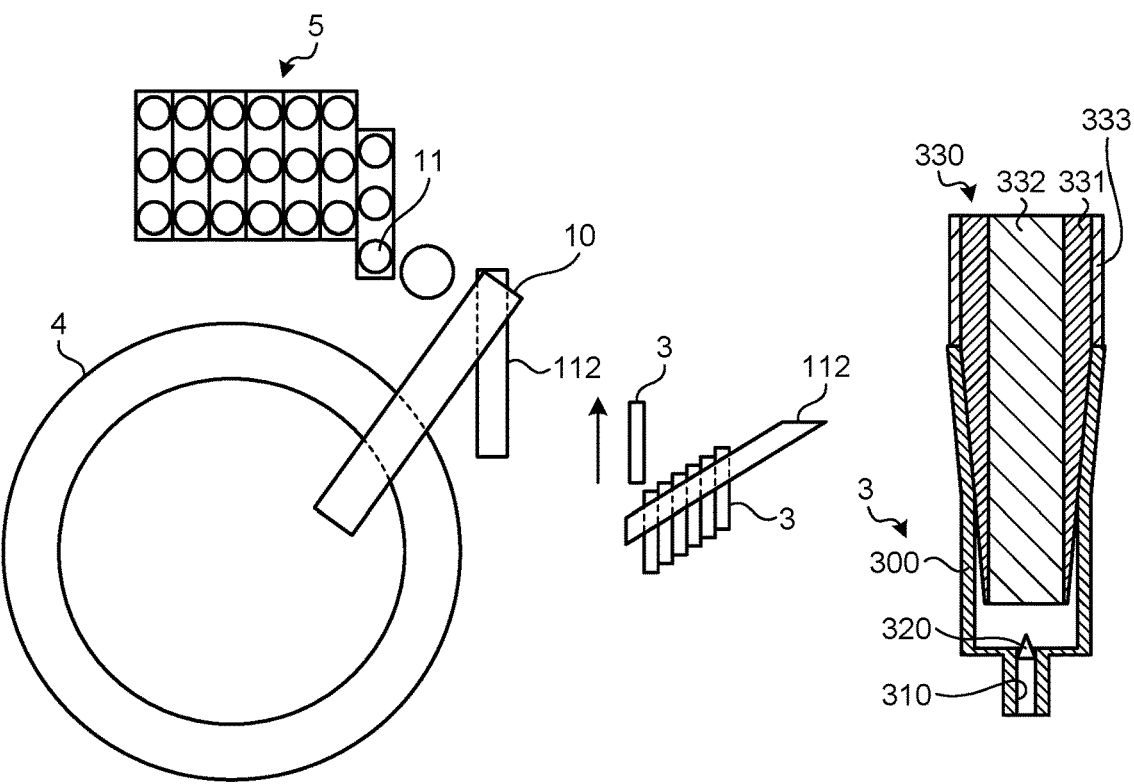
FIG. 11A to FIG. 11F are diagrams illustrating a processing procedure of the automatic analyzing device to which the reaction cuvette according to the first embodiment is applied.

First, in FIG. 11A, the controlling function 32 of the processing device 90 outputs, to the driving device 80, a first control signal for extracting the reaction cuvette 3 from the transferring part 112. In this case, by driving the sample arm 10 in accordance with the first control signal, the driving device 80 moves the distal end of the sample arm 10 to the terminal end of the rail of the transferring part 112. The driving device 80 then allows the aspirating device 330 at the distal end of the sample arm 10 to descend, and allows the connection part 331 of the aspirating device 330 to be connected to the opening 305 of the cuvette main body 300 of the reaction cuvette 3 that has moved to the terminal end of the rail of the transferring part 112.

Figure 11B:
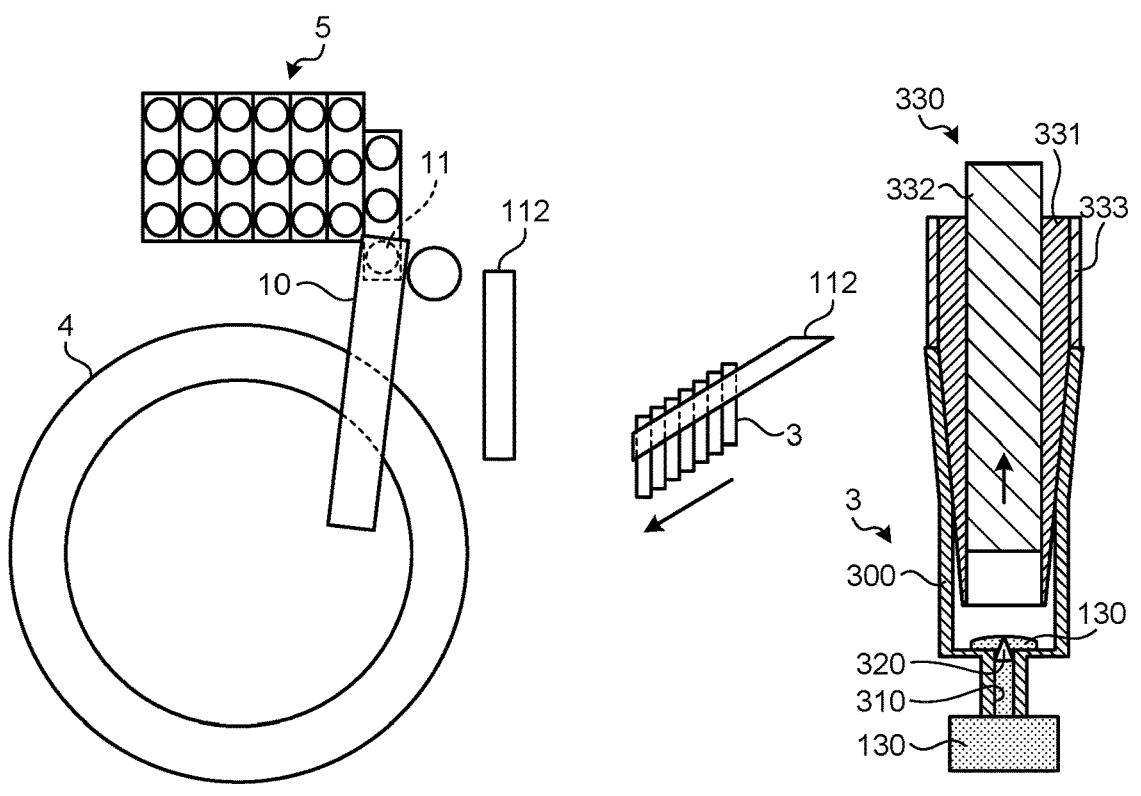

Next, in FIG. 11B, the controlling function 32 of the processing device 90 outputs, to the driving device 80, a second control signal for moving the reaction cuvette 3 to the sample rack 5. In this case, by driving the sample arm 10 in accordance with the second control signal, the driving device 80 allows the aspirating device 330 at the distal end of the sample arm 10 to ascend, and moves the reaction cuvette 3 connected to the aspirating device 330 from the transferring part 112 to the sample rack 5. At this point, the reaction cuvette 3 is extracted from the terminal end of the rail of the transferring part 112, so that the reaction cuvettes 3 properly aligned on the rail of the transferring part 112 are slid by self-weight of the reaction cuvettes 3.

Thereafter, the controlling function 32 of the processing device 90 outputs, to the driving device 80, a third control signal for bringing the aspiration port 310 of the reaction cuvette 3 into contact with the sample 130 in the sample container 11. In this case, by driving the sample arm 10 in accordance with the third control signal, the driving device 80 allows the aspirating device 330 at the distal end of the sample arm 10 to descend, and brings the aspiration port 310 of the reaction cuvette 3 connected to the aspirating device 330 into contact with the sample 130 in the sample container 11 held by the sample rack 5.

The controlling function 32 of the processing device 90 outputs, to the driving device 80, a fourth control signal for aspirating the sample 130 in the sample container 11 into the inner part of the cuvette main body 300 of the reaction cuvette 3. In this case, by moving the suction pump part 332 of the aspirating device 330 at the distal end of the sample arm 10 upward in accordance with the fourth control signal, the driving device 80 allows the sample 130 in the sample container 11 held by the sample rack 5 to flow into the inner part of the cuvette main body 300 of the reaction cuvette 3 by suction performed by the suction pump part 332.

Figure 11C:
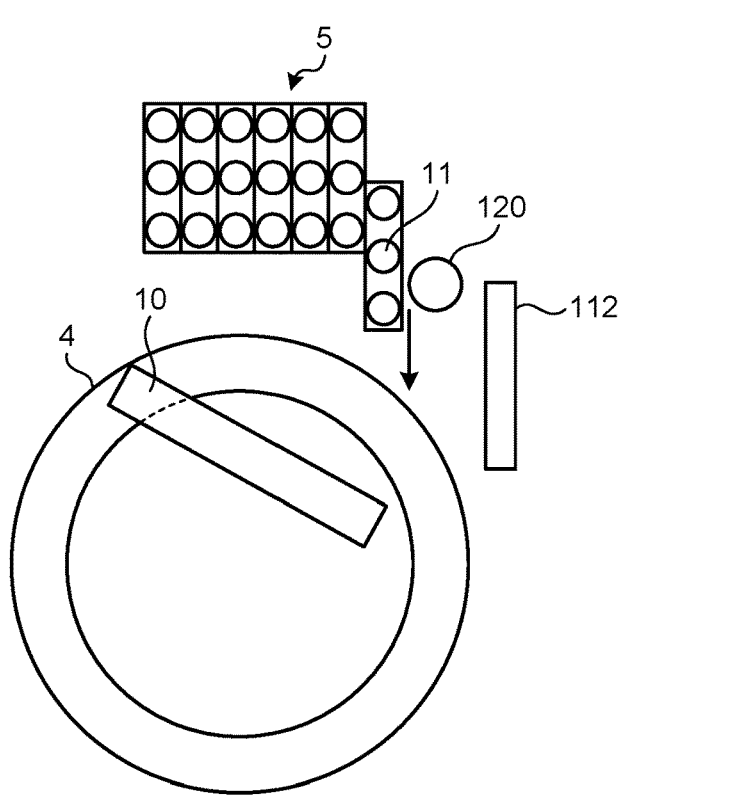
Figure 11C:
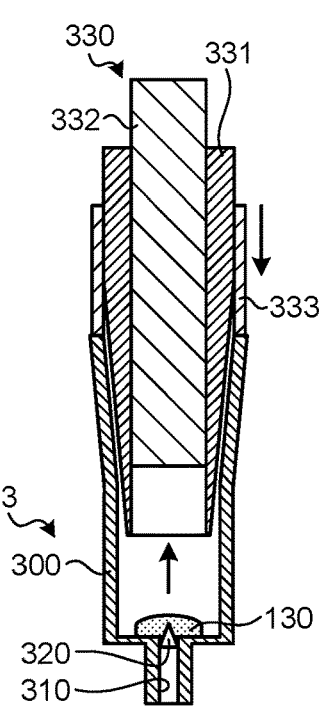

Next, in FIG. 11C, the controlling function 32 of the processing device 90 outputs, to the driving device 80, a fifth control signal for moving the reaction cuvette 3 containing the sample 130 to the reaction disk 4. In this case, by driving the sample arm 10 in accordance with the fifth control signal, the driving device 80 allows the reaction cuvette 3 connected to the aspirating device 330 at the distal end of the sample arm 10 to ascend, and moves the reaction cuvette 3 containing the sample 130 from the sample rack 5 to the reaction disk 4. The driving device 80 then allows the aspirating device 330 at the distal end of the sample arm 10 to descend, and allows the connection part 331 of the aspirating device 330 at the distal end of the sample arm 10 to be disengaged from the reaction cuvette 3 containing the sample 130.

Thereafter, the reagent in each of the reagent containers 6 and 7 is dispensed to the reaction cuvette 3 that has been moved to the reaction disk 4 from the opening 305 side of the cuvette main body 300 of the reaction cuvette 3. The measuring part 13 measures the mixed liquid of the reagent and the sample 130 in the reaction cuvette 3 by applying light to the reaction cuvette 3 at the measurement position. Alternatively, the measuring part 13 measures the mixed liquid by measuring electric potential of the mixed liquid in the reaction cuvette 3.

Figure 11D:
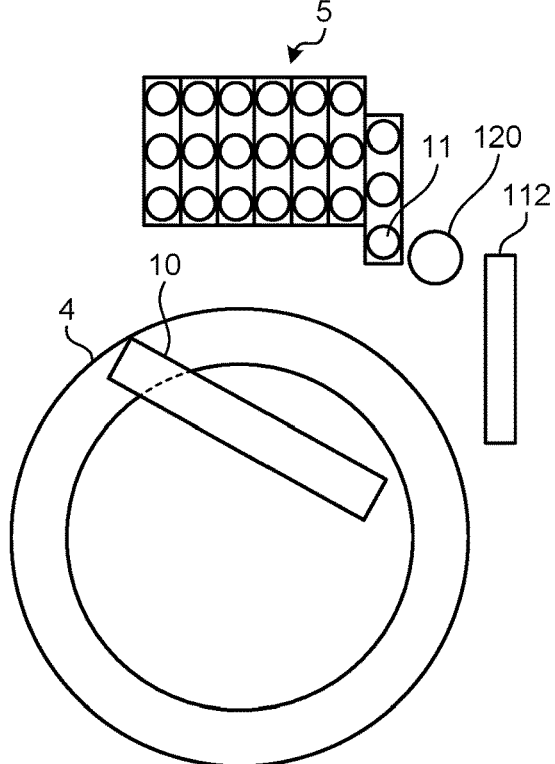

Next, in FIG. 11D, the controlling function 32 of the processing device 90 outputs, to the driving device 80, a sixth control signal for extracting the reaction cuvette 3 that has been completely measured from the reaction disk 4. In this case, by driving the sample arm 10 in accordance with the sixth control signal, the driving device 80 moves the distal end of the sample arm 10 to the reaction cuvette 3 that has been completely measured on the reaction disk 4. The driving device 80 then allows the aspirating device 330 at the distal end of the sample arm 10 to descend, and allows the connection part 331 of the aspirating device 330 to be connected to the opening 305 of the cuvette main body 300 of the reaction cuvette 3 that has been completely measured.

Figure 11E:
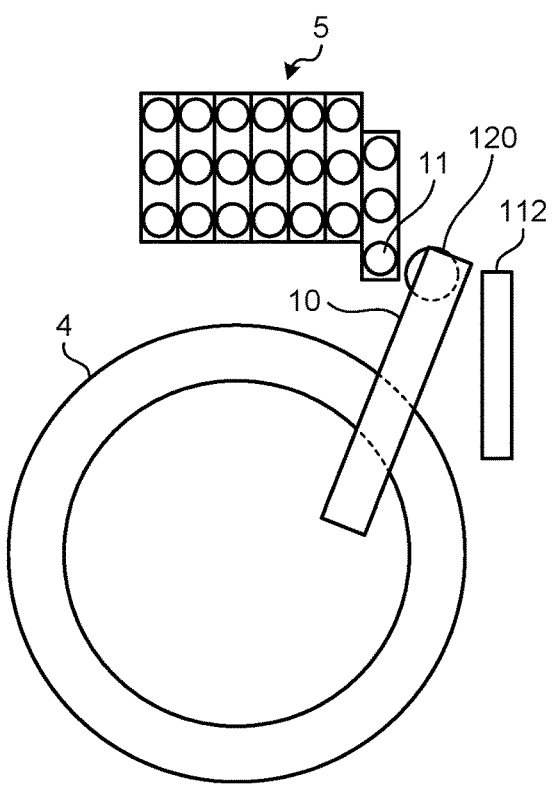

Next, in FIG. 11E, the controlling function 32 of the processing device 90 outputs, to the driving device 80, a seventh control signal for discarding the reaction cuvette 3 that has been completely measured. In this case, by driving the sample arm 10 in accordance with the seventh control signal, the driving device 80 moves the reaction cuvette 3 that has been completely measured from the reaction disk 4 to the discarding part 120, and allows the connection part 331 of the aspirating device 330 attached to the sample arm 10 to be disengaged from the reaction cuvette 3 that has been completely measured. That is, the discarding part 120 is a vessel for discarding the reaction cuvette 3 after the measurement, so that the reaction cuvette 3 after the measurement is discarded when the reaction cuvette 3 after the measurement is housed in the discarding part 120.

Figure 11F:
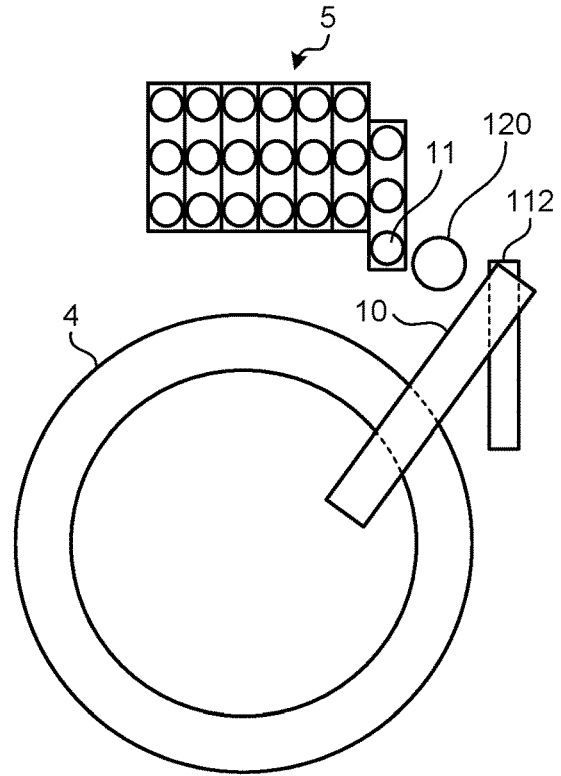

Thereafter, in FIG. 11F, the controlling function 32 of the processing device 90 outputs the first control signal to the driving device 80 again. In this case, similarly to the above description, by driving the sample arm 10 in accordance with the first control signal, the driving device 80 extracts the reaction cuvette 3 that has moved to the terminal end of the rail of the transferring part 112.

As described above, the reaction cuvette 3 according to the first embodiment includes the cuvette main body 300 and the aspiration port 310, and the aspiration port 310 is disposed on the cuvette main body 300 to allow the aspirated sample 130 to flow into the inner part of the cuvette main body 300. Due to this, the first embodiment does not require the sample dispensing probe, the sample dispensing pump for allowing the sample dispensing probe to aspirate and dispense the sample, and the cleaning tank for cleaning the sample dispensing probe every time dispensing of the sample ends. For example, with a scheme in which the sample dispensing probe aspirates the sample and dispenses the sample to the reaction cuvette, in a case in which the sample is not sufficiently removed by cleaning when the sample dispensing probe that has dispensed the sample is cleaned, carry-over may be generated due to influence of the sample. On the other hand, the first embodiment uses a scheme of allowing the aspirated sample 130 to flow into the inner part of the cuvette main body 300, so that the sample dispensing probe, the sample dispensing pump, and the cleaning tank are not required, and as a result, carry-over is not generated. Carry-over is not generated in the automatic analyzing device 100, so that measurement efficiency can be improved.

Second Embodiment

Regarding the reaction cuvette 3 according to the first embodiment, described is a case in which the aspirating device 330 for aspirating the sample 130 is connected to the cuvette main body 300. In the reaction cuvette 3 according to a second embodiment, the aspirating device for aspirating the sample 130 is disposed in the cuvette main body 300. Additionally, in the reaction cuvette 3 according to the second embodiment, the reagent is housed in the cuvette main body 300, so that the reagent container for storing the reagent is not required. The following describes a configuration example of the reaction cuvette 3 according to the second embodiment with reference to FIG. 12 to FIG. 15. In the second embodiment, the same description as that in the first embodiment will not be repeated.

Figure 12A:
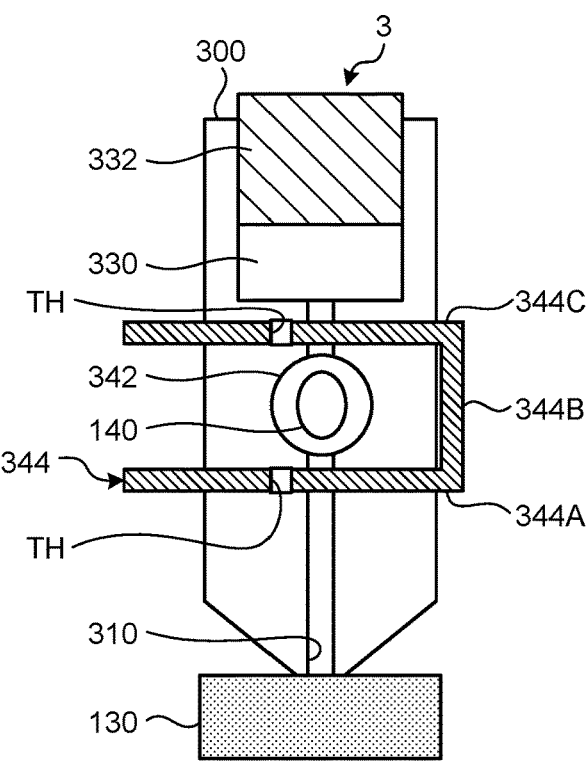
FIG. 12A to FIG. 12C are cross-sectional views illustrating a first configuration example of a reaction cuvette according to a second embodiment for explaining a suction operation.
Figure 12B:
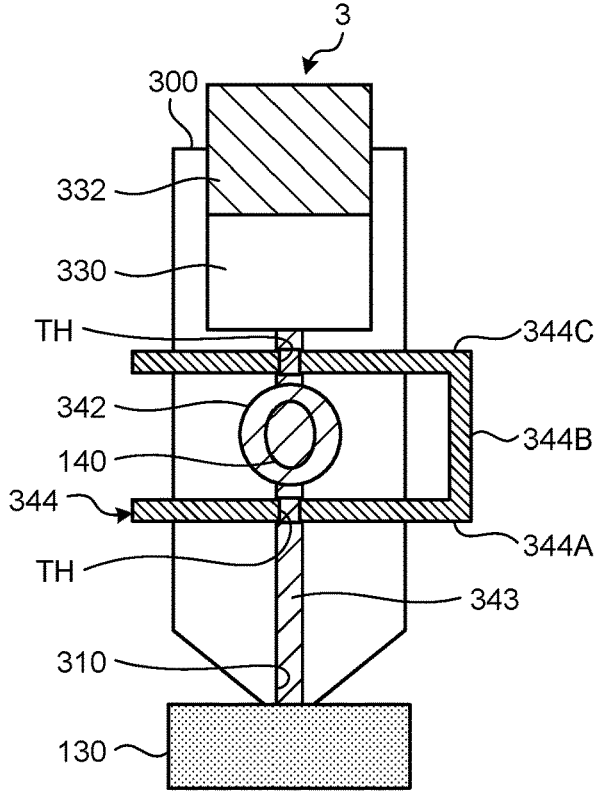
Figure 12C:
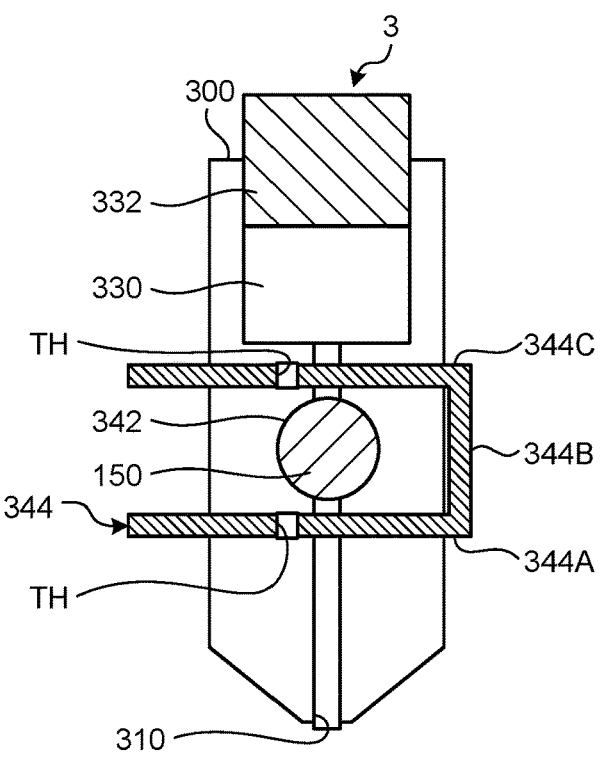

FIG. 12A to FIG. 12C are cross-sectional views illustrating a first configuration example of the reaction cuvette 3 according to the second embodiment.

The reaction cuvette 3 includes the cuvette main body 300, the aspirating device 330, a reaction chamber 342, and a flow channel control part 344. The aspirating device 330 is disposed on the cuvette main body 300, and aspirates the sample 130 similarly to the first embodiment. The reaction chamber 342 is disposed inside the cuvette main body 300, and houses a reagent 140 that reacts with the sample 130. The reagent 140 is, for example, a reagent of one reagent system.

The flow channel control part 344 includes members 344A and 344B that are disposed to be slidable in the horizontal direction within the cuvette main body 300, and a member 344C that supports the members 344A and 344B on the outside of the cuvette main body 300. The member 344B is disposed on an upper row of the member 344A, and a through hole TH is formed on the members 344A and 344B.

Next, the following describes a suction operation in the first configuration example of the reaction cuvette 3 according to the second embodiment with reference to FIG. 12A to FIG. 12C.

First, in FIG. 12A, the driving device 80 allows the distal end of the sample arm 10 to be connected to the aspirating device 330 of the reaction cuvette 3 on the transferring part 112. Next, the driving device 80 allows the reaction cuvette 3 connected to the distal end of the sample arm 10 to descend, and brings the aspiration port 310 of the reaction cuvette 3 into contact with the sample 130 in the sample container 11 held by the sample rack 5. Next, in FIG. 12B, by allowing the member 344C of the flow channel control part 344 of the reaction cuvette 3 to slide in the right direction by a set amount at the time of aspirating the sample 130, the driving device 80 allows the members 344A and 344B of the flow channel control part 344 to slide at the same time, and allows a flow channel 343 to be formed in the flow channel control part 344. For example, as illustrated by oblique lines in FIG. 12B, the flow channel 343 is a flow channel from the aspiration port 310 to the aspirating device 330 via the through hole TH of the member 344A, the reaction chamber 342, and the through hole TH of the member 344B. At this point, when the driving device 80 drives the suction pump part 332 of the aspirating device 330, the sample 130 in the sample container 11 held by the sample rack 5 flows into the reaction chamber 342 of the reaction cuvette 3 by suction performed by the suction pump part 332. Next, in FIG. 12C, the driving device 80 allows the member 344C of the flow channel control part 344 to slide in the left direction by a set amount to close a flow channel 343 after the sample 130 is aspirated. Due to this, a mixed liquid 150 of the sample 130 and the reagent 140 is housed in the reaction chamber 342 of the reaction cuvette 3.

Figure 13A:
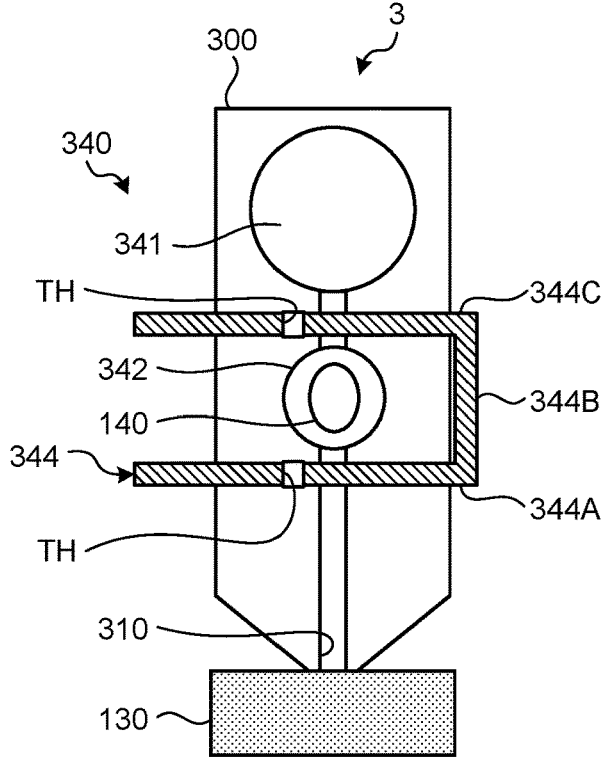
FIG. 13A to FIG. 13C are cross-sectional views illustrating a second configuration example of the reaction cuvette according to the second embodiment for explaining the suction operation.
Figure 13B:
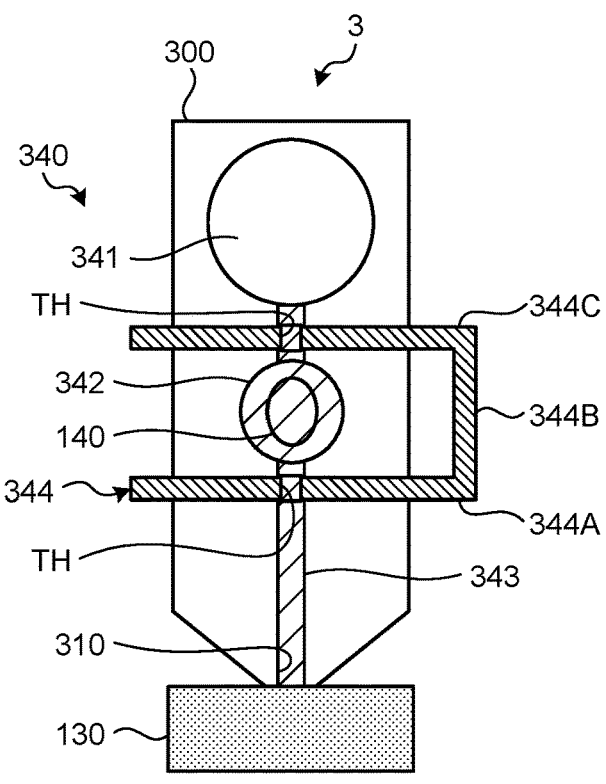
Figure 13C:
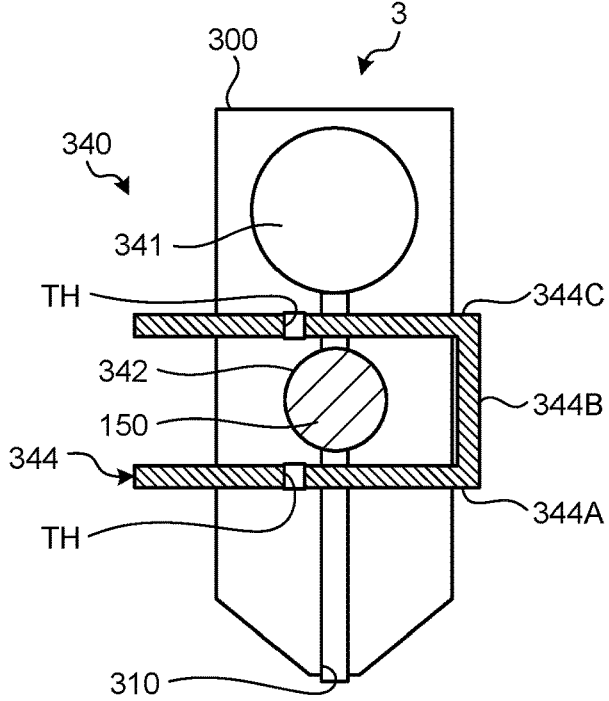

FIG. 13A to FIG. 13C are cross-sectional views illustrating a second configuration example of the reaction cuvette 3 according to the second embodiment. Regarding the second configuration example, changes from the first configuration example will be described.

In the second configuration example, the reaction cuvette 3 includes a aspirating device 340 disposed inside the cuvette main body 300 in place of the aspirating device 330 in the first configuration example. The aspirating device 340 is a decompression chamber 341 having an air pressure lower than the atmospheric pressure.

Next, with reference to FIG. 13A to FIG. 13C, the following describes the suction operation in the second configuration example of the reaction cuvette 3 according to the second embodiment.

First, in FIG. 13A, the driving device 80 allows the distal end of the sample arm 10 to be connected to the reaction cuvette 3 on the transferring part 112. Next, the driving device 80 allows the reaction cuvette 3 connected to the distal end of the sample arm 10 to descend, and brings the aspiration port 310 of the reaction cuvette 3 into contact with the sample 130 in the sample container 11 held by the sample rack 5. Next, in FIG. 13B, by allowing the member 344C of the flow channel control part 344 of the reaction cuvette 3 to slide in the right direction by a set amount at the time of aspirating the sample 130, the driving device 80 allows the members 344A and 344B of the flow channel control part 344 to slide at the same time, and allows the flow channel 343 to be formed in the flow channel control part 344. For example, as illustrated by oblique lines in FIG. 13B, the flow channel 343 is a flow channel from the aspiration port 310 to the decompression chamber 341 via the through hole TH of the member 344A, the reaction chamber 342, and the through hole TH of the member 344B. At this point, due to decompression by the decompression chamber 341, the sample 130 in the sample container 11 held by the sample rack 5 flows into the reaction chamber 342 of the reaction cuvette 3. Next, in FIG. 13C, the driving device 80 allows the member 344C of the flow channel control part 344 to slide in the left direction by a set amount to close the flow channel 343 after the sample 130 is aspirated. Due to this, the mixed liquid 150 of the sample 130 and the reagent 140 is housed in the reaction chamber 342 of the reaction cuvette 3.

FIG. 14A to FIG. 14E are cross-sectional views illustrating a third configuration example of the reaction cuvette 3 according to the second embodiment. Regarding the third configuration example, changes from the second configuration example will be described.

In the third configuration example, the reaction cuvette 3 includes decompression chambers 341A and 341B as the decompression chamber 341 in the second configuration example, and reaction chambers 342A and 342B as the reaction chamber 342 in the second configuration example. The reaction chambers 342A and 342B are disposed inside the cuvette main body 300, and respectively house reagents 141 and 142 that react with the sample 130. For example, the reagents 141 and 142 are reagents in the respective reagent containers 6 and 7. The reaction chambers 342A and 342B are examples of a first reaction chamber and a second reaction chamber, respectively, and the reagents 141 and 142 are examples of a first reagent of a two reagent system, and a second reagent different from the reagent of the two reagent system, respectively.

The flow channel control part 344 includes the members 344A to 344C that are disposed to be slidable in the horizontal direction inside the cuvette main body 300, and a member 344D that supports the members 344A to 344C on the outside of the cuvette main body 300. The member 344B is disposed on an upper row of the member 344A, and the member 344C is disposed on an upper row of the member 344B. Through holes TH1 and TH2 are formed in the members 344A to 344C.

Next, with reference to FIG. 14A to FIG. 14E, the following describes a suction operation in the third configuration example of the reaction cuvette 3 according to the second embodiment.

Figure 14A:
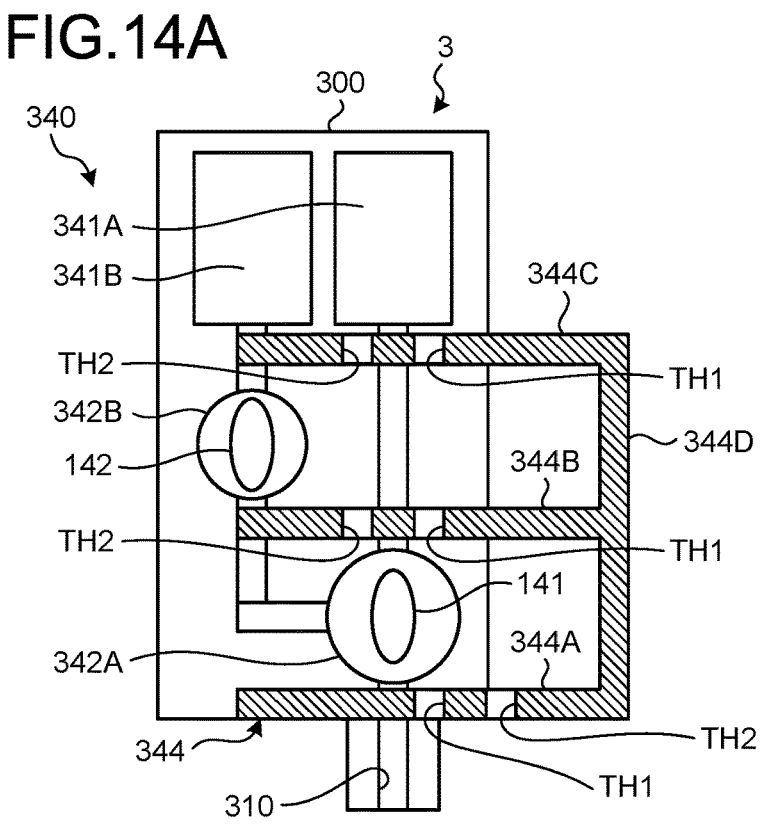
FIG. 14A to FIG. 14E are cross-sectional views illustrating a third configuration example of the reaction cuvette according to the second embodiment for explaining the suction operation.
Figure 14B:
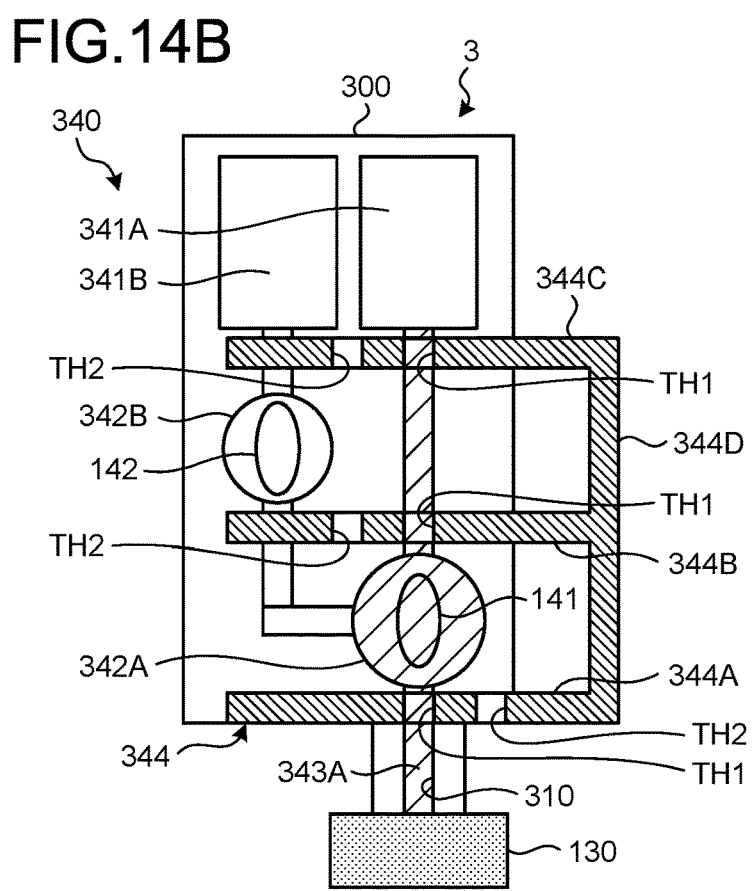
Figure 14C:
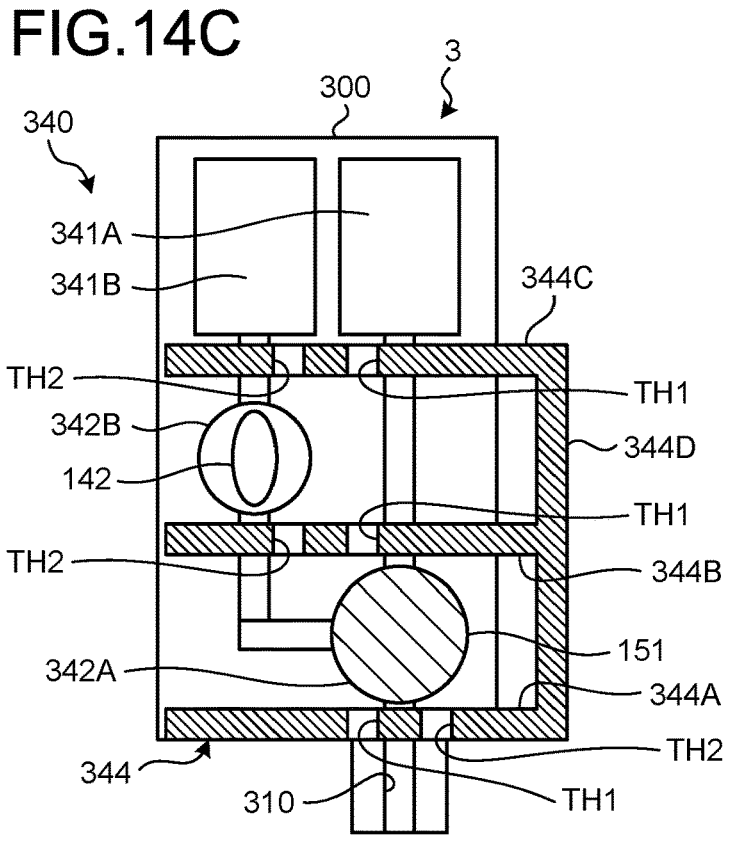

First, in FIG. 14A, the driving device 80 allows the distal end of the sample arm 10 to be connected to the reaction cuvette 3 on the transferring part 112. Next, in FIG. 14B, the driving device 80 allows the reaction cuvette 3 connected to the distal end of the sample arm 10 to descend, and brings the aspiration port 310 of the reaction cuvette 3 into contact with the sample 130 in the sample container 11 held by the sample rack 5. By allowing the member 344D of the flow channel control part 344 of the reaction cuvette 3 to slide in the left direction by a first set amount at the time of aspirating the sample 130, the driving device 80 allows the members 344A to 344C of the flow channel control part 344 to slide at the same time, and allows the flow channel 343A to be formed in the flow channel control part 344. For example, as illustrated by oblique lines in FIG. 14B, the flow channel 343A is a flow channel from the aspiration port 310 to the decompression chamber 341A via the through hole TH1 of the member 344A, the reaction chamber 342A, the through hole TH1 of the member 344B, and the through hole TH1 of the member 344C. At this point, due to decompression by the decompression chamber 341A, the sample 130 in the sample container 11 held by the sample rack 5 flows into the reaction chamber 342A of the reaction cuvette 3. Next, in FIG. 14C, the driving device 80 allows the member 344D of the flow channel control part 344 to slide in the left direction by a second set amount to close the flow channel 343A after the sample 130 is aspirated. Due to this, a mixed liquid 151 of the sample 130 and the reagent 141 is housed in the reaction chamber 342A. The flow channel 343A is an example of a first flow channel.

Figure 14D:
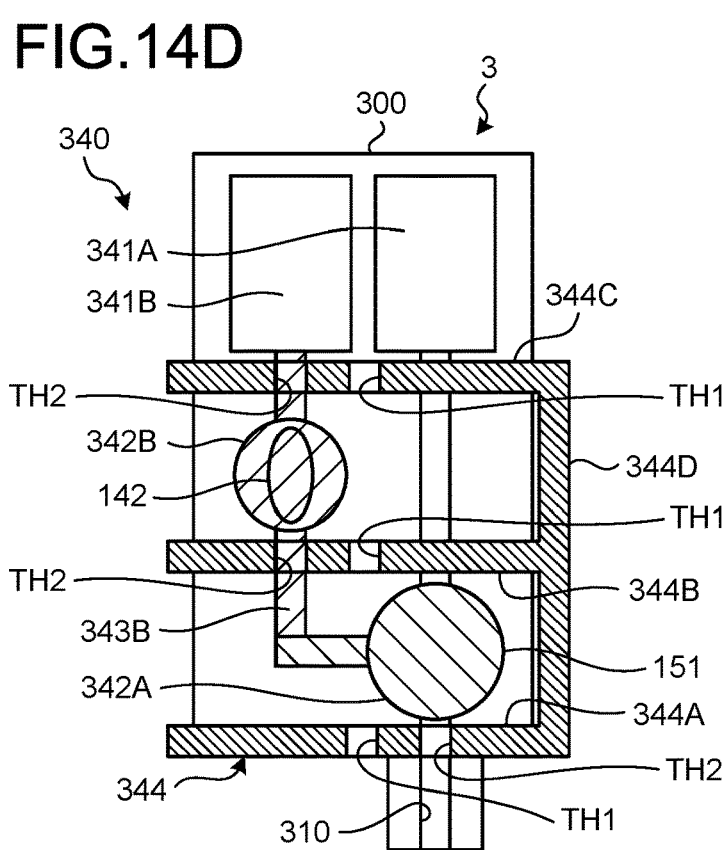
Figure 14E:
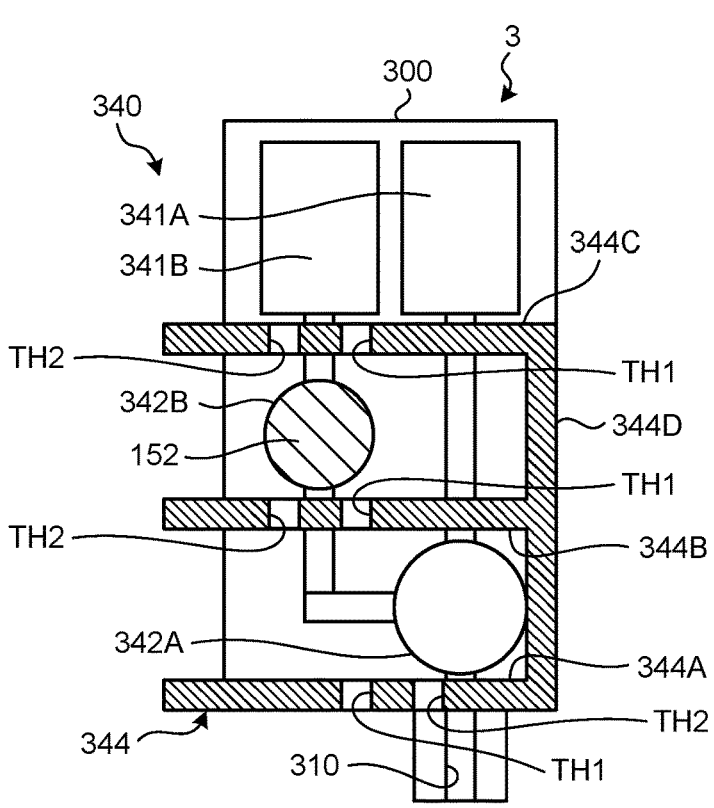

Next, in FIG. 14D, for example, by allowing the member 344D of the flow channel control part 344 of the reaction cuvette 3 to slide in the left direction by a third set amount, the driving device 80 allows the members 344A to 344C of the flow channel control part 344 to slide at the same time, and allows a flow channel 343B to be formed in the flow channel control part 344. For example, as illustrated by oblique lines in FIG. 14D, the flow channel 343B is a flow channel from the aspiration port 310 to the decompression chamber 341B via the through hole TH2 of the member 344A, the reaction chamber 342A, the through hole TH2 of the member 344B, the reaction chamber 342B, and the through hole TH2 of the member 344C. At this point, due to decompression by the decompression chamber 341B, the mixed liquid 151 in the reaction chamber 342A flows into the reaction chamber 342B. Next, in FIG. 14E, the driving device 80 allows the member 344D of the flow channel control part 344 to slide in the left direction by a fourth set amount to close the flow channel 343B. Due to this, a mixed liquid 152 of the mixed liquid 151 and the reagent 142 is housed in the reaction chamber 342B. The flow channel 343B is an example of a second flow channel.

FIG. 15A to FIG. 15E are cross-sectional views illustrating a fourth configuration example of the reaction cuvette 3 according to the second embodiment. Regarding the fourth configuration example, changes from the second configuration example will be described.

In the fourth configuration example, the reaction cuvette 3 includes a compression chamber 345 having an air pressure higher than the atmospheric pressure in addition to the second configuration example. In the fourth configuration example, the reaction cuvette 3 also includes the reaction chambers 342A and 342B as the reaction chamber 342 in the second configuration example. In the fourth configuration example, the reaction cuvette 3 further includes the backflow prevention part 320 disposed in the cuvette main body 300. For example, as the backflow prevention part 320, disposed are a check valve for preventing backflow in a direction from the reaction chamber 342A to the aspiration port 310, and a check valve for preventing backflow in a direction from the reaction chamber 342B to the reaction chamber 342A. On an upper surface part opposite to the bottom surface part of the cuvette main body 300, a through hole 350 is formed from the upper surface part to the reaction chamber 342B in the cuvette main body 300.

The flow channel control part 344 includes the members 344A and 344B that are disposed to be slidable in the horizontal direction inside the cuvette main body 300, and the member 344C that supports the members 344A and 344B on the outside of the cuvette main body 300. The member 344B is disposed on an upper row of the member 344A. The through holes TH1 and TH2 are formed on the member 344A, and the through hole TH is formed on the member 344B.

Next, with reference to FIG. 15A to FIG. 15E, the following describes a suction operation in the fourth configuration example of the reaction cuvette 3 according to the second embodiment.

Figure 15A:
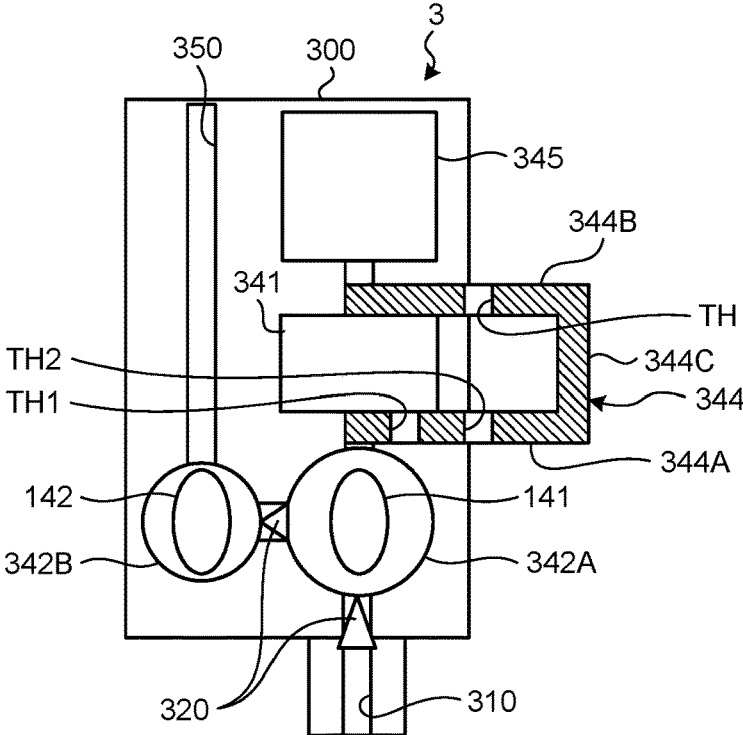
FIG. 15A to FIG. 15E are cross-sectional views illustrating a fourth configuration example of the reaction cuvette according to the second embodiment for explaining the suction operation.
Figure 15B:
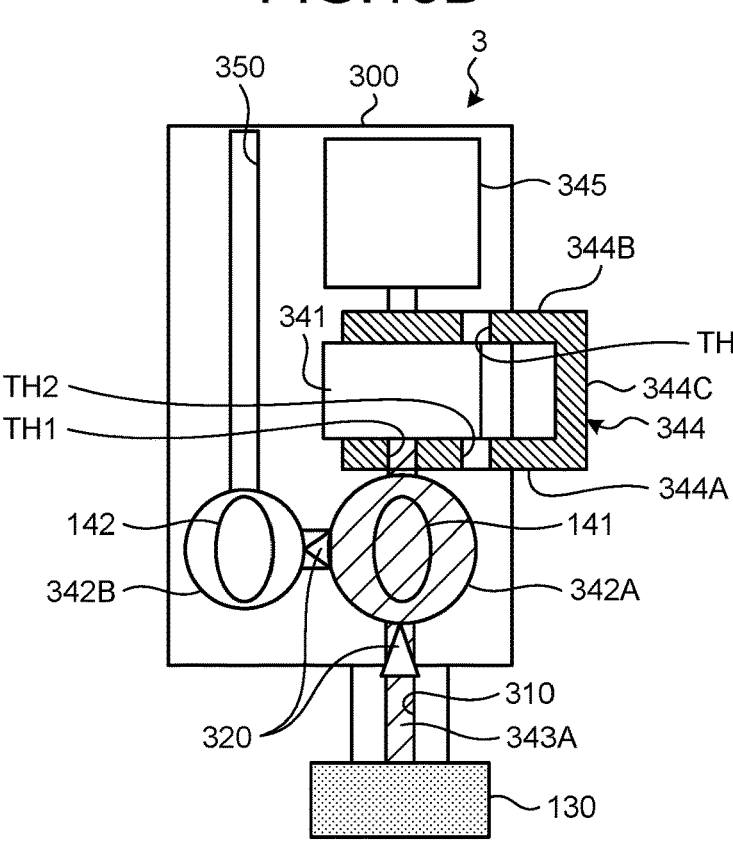
Figure 15C:
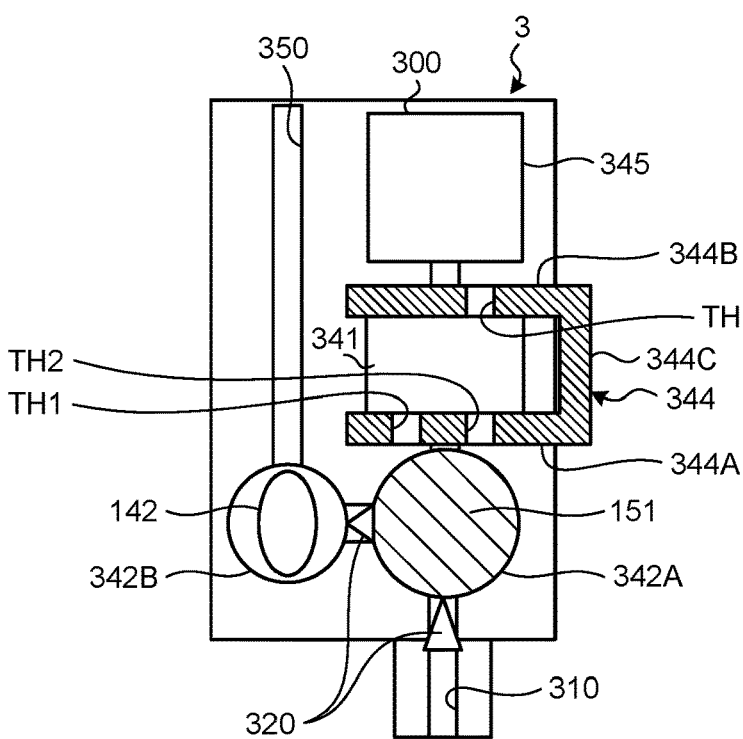

First, in FIG. 15A, the driving device 80 allows the distal end of the sample arm 10 to be connected to the reaction cuvette 3 on the transferring part 112. Next, in FIG. 15B, the driving device 80 allows the reaction cuvette 3 connected to the distal end of the sample arm 10 to descend, and brings the aspiration port 310 of the reaction cuvette 3 into contact with the sample 130 in the sample container 11 held by the sample rack 5. By allowing the member 344C of the flow channel control part 344 of the reaction cuvette 3 to slide in the left direction by the first set amount at the time of aspirating the sample 130, the driving device 80 allows the members 344A and 344B of the flow channel control part 344 to slide at the same time, and allows the flow channel 343A to be formed in the flow channel control part 344. For example, as illustrated by oblique lines in FIG. 15B, the flow channel 343A is a flow channel from the aspiration port 310 to the decompression chamber 341 via the reaction chamber 342A and the through hole TH1 of the member 344A. At this point, due to decompression by the decompression chamber 341, the sample 130 in the sample container 11 held by the sample rack 5 flows into the reaction chamber 342A of the reaction cuvette 3. Next, in FIG. 15C, the driving device 80 allows the member 344C of the flow channel control part 344 to slide in the left direction by the second set amount to close the flow channel 343A after the sample 130 is aspirated. Due to this, the mixed liquid 151 of the sample 130 and the reagent 141 is housed in the reaction chamber 342A. The flow channel 343A is an example of a first flow channel.

Figure 15D:
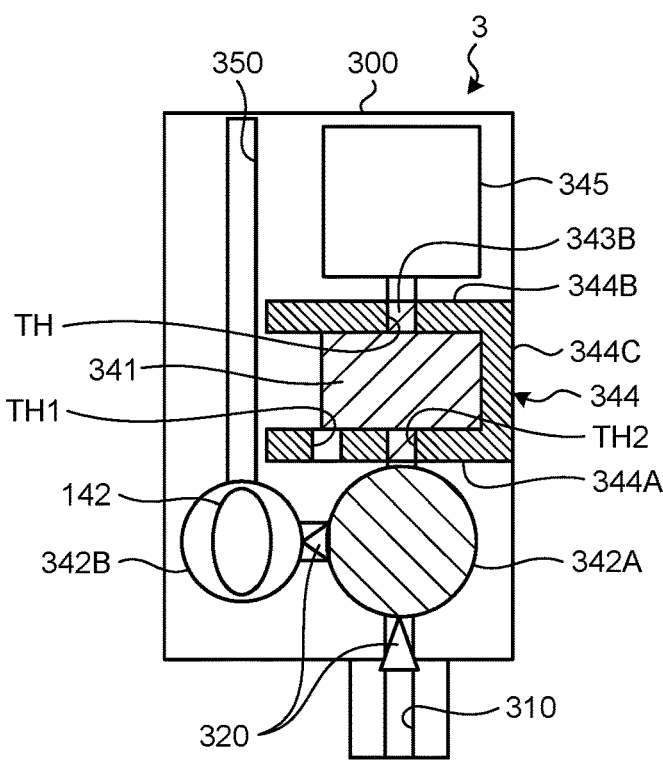
Figure 15E:
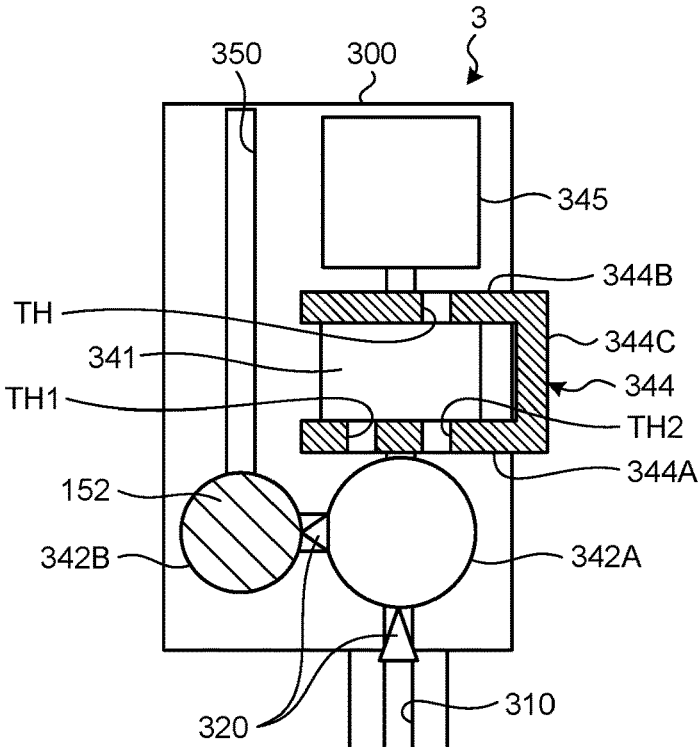

Next, in FIG. 15D, for example, by allowing the member 344C of the flow channel control part 344 of the reaction cuvette 3 to slide in the left direction by the third set amount, the driving device 80 allows the members 344A and 344B of the flow channel control part 344 to slide at the same time, and allows the flow channel 343B to be formed in the flow channel control part 344. For example, as illustrated by oblique lines in FIG. 15D, the flow channel 343B is a flow channel from the compression chamber 345 to the through hole 350 via the through hole TH of the member 344B, the decompression chamber 341 after use, the through hole TH2 of the member 344A, the reaction chamber 342A, and the reaction chamber 342B. At this point, due to compression by the compression chamber 345, the mixed liquid 151 in the reaction chamber 342A flows into the reaction chamber 342B. Next, in FIG. 15E, the driving device 80 allows the member 344C of the flow channel control part 344 to slide in the left direction by the fourth set amount to close the flow channel 343B. Due to this, the mixed liquid 152 of the mixed liquid 151 and the reagent 142 is housed in the reaction chamber 342B. The flow channel 343B is an example of a second flow channel.

For example, in the first to the fourth configuration examples of the reaction cuvette 3 according to the second embodiment, a mechanism of a mixer may be disposed in the reaction chamber to stir the sample and the reagent in the reaction chamber. Regarding the reaction cuvette 3 according to the second embodiment, for example, the first and the second configuration examples describe a case in which one reagent is housed in one reaction chamber, and the third and the fourth configuration examples describe a case in which two reagents are respectively housed in two reaction chambers. A case of using three or more reagents can be implemented by housing the three or more reagents in three or more reaction chambers, respectively, and sequentially forming flow channels.

Figure 16:
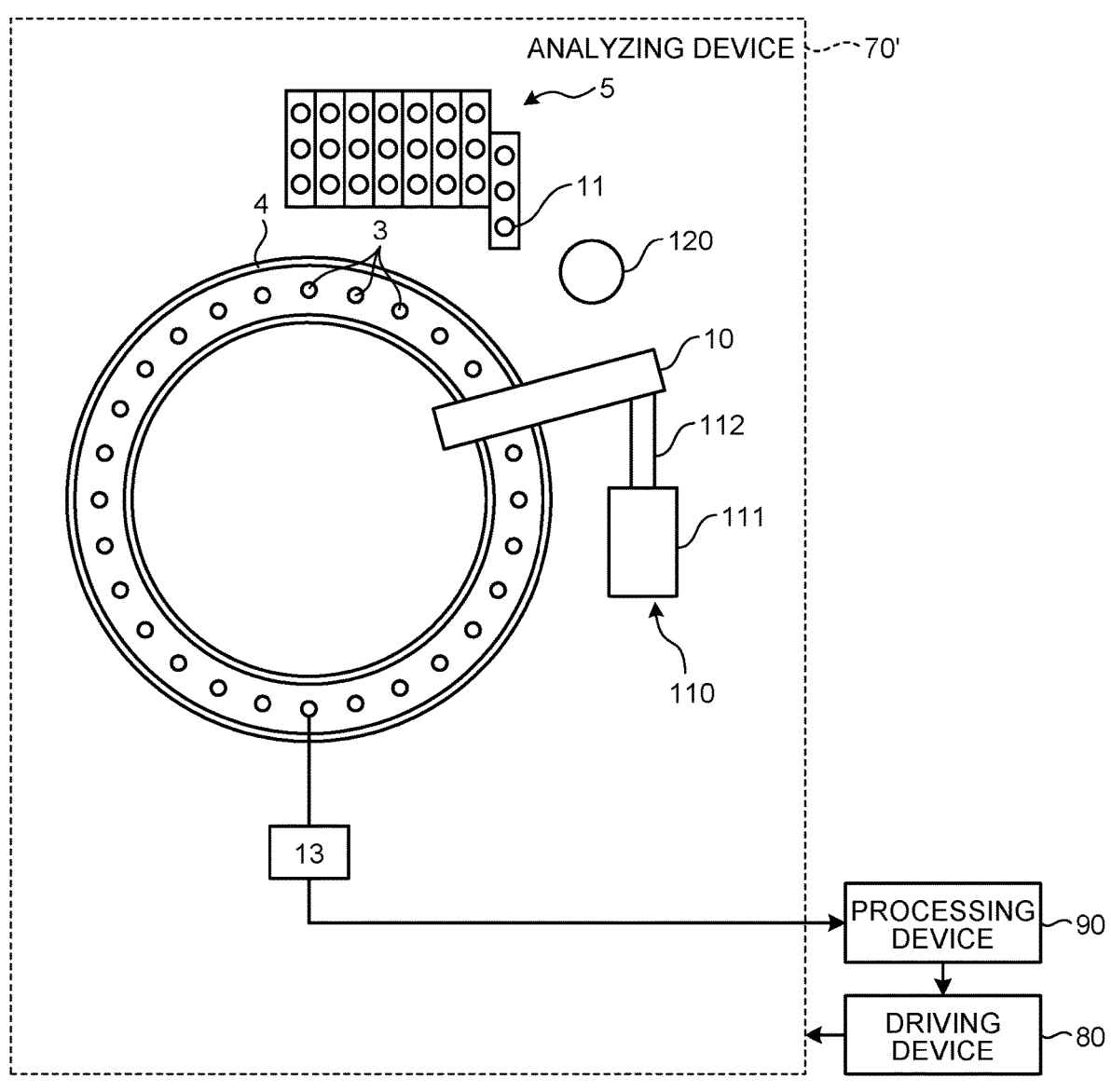
FIG. 16 is a diagram illustrating an example of a configuration of an analyzing device of an automatic analyzing device to which the reaction cuvette according to the second embodiment is applied.

FIG. 16 is a diagram illustrating an example of a configuration of an analyzing device 70' of the automatic analyzing device 100 to which the reaction cuvette 3 according to the second embodiment is applied. The reaction cuvette 3 according to the second embodiment can aspirate the sample, and the sample and the reagent can be mixed inside the cuvette main body 300, so that a device scale can be reduced in the second embodiment as compared with the first embodiment. For example, the analyzing device 70' in FIG. 16 does not require the reagent storage 1, the reagent rack 1a, the reagent storage 2, the reagent rack 2a, the reagent containers 6 and 7, the reagent dispensing arms 8 and 9, the reagent dispensing probes 14 and 15, the reagent dispensing pumps 14a and 15a, the reagent detectors 14b and 15b, the cleaning tanks 14c and 15c, the mixers 17 and 19, the cleaning tanks 17a and 19a, and the mixing arms 18 and 20 of the analyzing device 70 in FIG. 2.

FIG. 17A to FIG. 17F are diagrams illustrating a processing procedure of the automatic analyzing device 100 to which the reaction cuvette 3 according to the second embodiment is applied. In the second embodiment, the device scale can be reduced as compared with the first embodiment, so that the discarding part 120 is disposed at a position at which the reagent storage 1 is disposed in FIG. 2. In the examples illustrated in FIG. 17A to FIG. 17F, a plurality of the transferring parts 112 are arranged.

Figure 17A:
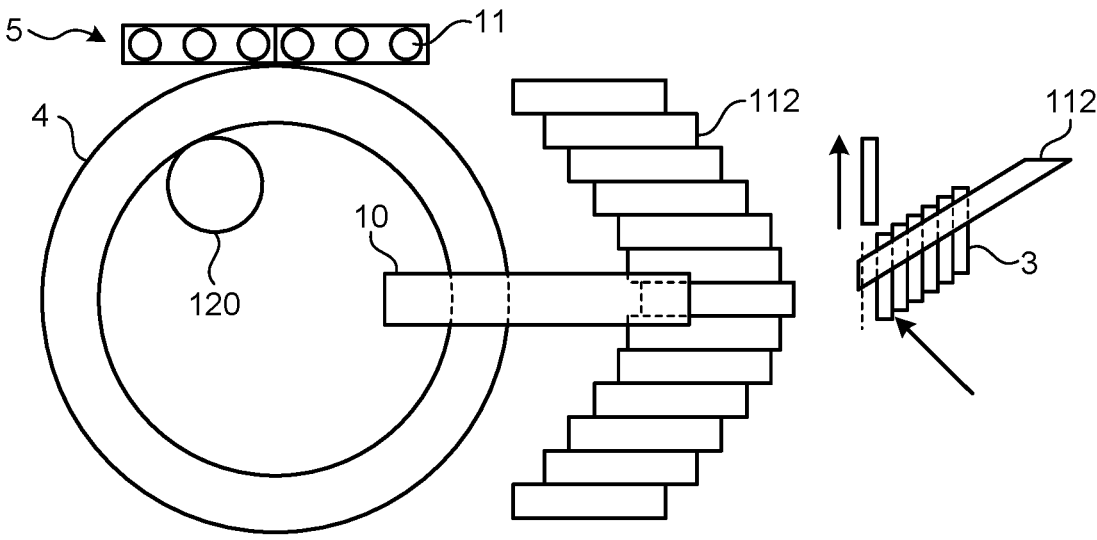
FIG. 17A to FIG. 17F are diagrams illustrating a processing procedure of the automatic analyzing device to which the reaction cuvette according to the second embodiment is applied.

First, in FIG. 17A, the controlling function 32 of the processing device 90 outputs, to the driving device 80, a first control signal for extracting the reaction cuvette 3 from the transferring part 112. In this case, by driving the sample arm 10 in accordance with the first control signal, the driving device 80 moves the distal end of the sample arm 10 to the terminal end of the rail of the transferring part 112 selected from among the transferring parts 112. The driving device 80 then allows the distal end of the sample arm 10 to descend, and extracts the reaction cuvette 3 that has moved to the terminal end of the rail of the transferring part 112.

Figure 17B:
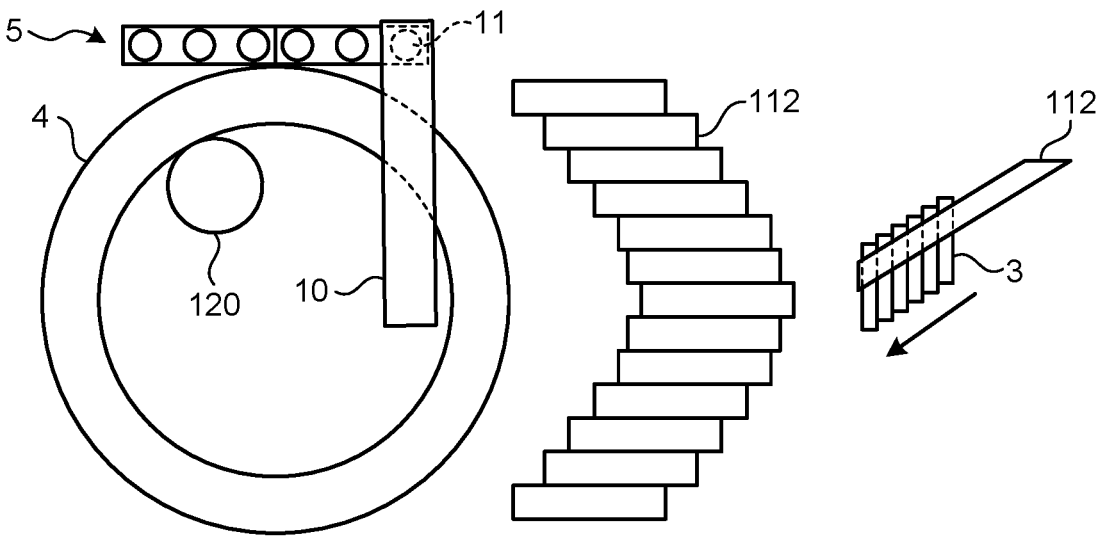

Next, in FIG. 17B, the controlling function 32 of the processing device 90 outputs, to the driving device 80, a second control signal for moving the reaction cuvette 3 to the sample rack 5. In this case, by driving the sample arm 10 in accordance with the second control signal, the driving device 80 allows the distal end of the sample arm 10 to ascend, and moves the reaction cuvette 3 from the transferring part 112 to the sample rack 5.

Thereafter, the controlling function 32 of the processing device 90 outputs, to the driving device 80, a third control signal for bringing the aspiration port 310 of the reaction cuvette 3 into contact with the sample 130 in the sample container 11. In this case, by driving the sample arm 10 in accordance with the third control signal, the driving device 80 allows the distal end of the sample arm 10 to descend, and brings the aspiration port 310 of the reaction cuvette 3 into contact with the sample 130 in the sample container 11 held by the sample rack 5.

The controlling function 32 of the processing device 90 outputs, to the driving device 80, a fourth control signal for aspirating the sample 130 in the sample container 11 into the inner part of the cuvette main body 300 of the reaction cuvette 3. In this case, in accordance with the fourth control signal, the driving device 80 controls the flow channel control part 344 and the like of the reaction cuvette 3 from the distal end of the sample arm 10 as follows.

In the first configuration example, the driving device 80 controls the flow channel control part 344 of the reaction cuvette 3 to form the flow channel 343 from the aspiration port 310 of the reaction cuvette 3 to the aspirating device 330 via the reaction chamber 342, and drives the suction pump part 332 of the aspirating device 330 of the reaction cuvette 3 to allow the sample 130 in the sample container 11 held by the sample rack 5 to flow into the reaction chamber 342 of the reaction cuvette 3 by suction performed by the suction pump part 332. Thereafter, the driving device 80 controls the flow channel control part 344 so that the flow channel 343 is closed. At this point, the mixed liquid 150 of the sample 130 and the reagent 140 is housed in the reaction chamber 342.

In the second configuration example, the driving device 80 controls the flow channel control part 344 of the reaction cuvette 3 to form the flow channel 343 from the aspiration port 310 of the reaction cuvette 3 to the aspirating device 330 via the reaction chamber 342. At this point, the sample 130 in the sample container 11 held by the sample rack 5 flows into the reaction chamber 342 of the reaction cuvette 3 due to decompression by the decompression chamber 341 of the reaction cuvette 3. Thereafter, the driving device 80 controls the flow channel control part 344 so that the flow channel 343 is closed. At this point, the mixed liquid 150 of the sample 130 and the reagent 140 is housed in the reaction chamber 342.

In the third configuration example, the driving device 80 controls the flow channel control part 344 of the reaction cuvette 3 to form the flow channel 343A from the aspiration port 310 of the reaction cuvette 3 to the decompression chamber 341A via the reaction chamber 342A. At this point, the sample 130 in the sample container 11 held by the sample rack 5 flows into the reaction chamber 342A of the reaction cuvette 3 due to decompression by the decompression chamber 341A. Thereafter, the driving device 80 controls the flow channel control part 344 so that the flow channel 343A is closed. At this point, the mixed liquid 151 of the sample 130 and the reagent 141 is housed in the reaction chamber 342A. The driving device 80 controls the flow channel control part 344 to form the flow channel 343B from the aspiration port 310 to the decompression chamber 341B via the reaction chamber 342A and the reaction chamber 342B. At this point, the mixed liquid 151 in the reaction chamber 342A flows into the reaction chamber 342B due to decompression by the decompression chamber 341B. Thereafter, the driving device 80 controls the flow channel control part 344 so that the flow channel 343B is closed. At this point, the mixed liquid 152 of the mixed liquid 151 and the reagent 142 is housed in the reaction chamber 342B.

In the fourth configuration example, the driving device 80 controls the flow channel control part 344 of the reaction cuvette 3 to form the flow channel 343A from the aspiration port 310 of the reaction cuvette 3 to the decompression chamber 341 via the reaction chamber 342A. At this point, the sample 130 in the sample container 11 held by the sample rack 5 flows into the reaction chamber 342A of the reaction cuvette 3 due to decompression by the decompression chamber 341. Thereafter, the driving device 80 controls the flow channel control part 344 so that the flow channel 343A is closed. At this point, the mixed liquid 151 of the sample 130 and the reagent 141 is housed in the reaction chamber 342A. The driving device 80 then controls the flow channel control part 344 to form the flow channel 343B from the compression chamber 345 to the through hole 350 via the decompression chamber 341 after use, the reaction chamber

342A, and the reaction chamber 342B. At this point, the mixed liquid 151 in the reaction chamber 342A flows into the reaction chamber 342B due to compression by the compression chamber 345. Thereafter, the driving device 80 controls the flow channel control part 344 so that the flow channel 343B is closed. At this point, the mixed liquid 152 of the mixed liquid 151 and the reagent 142 is housed in the reaction chamber 342B.

Figure 17C:
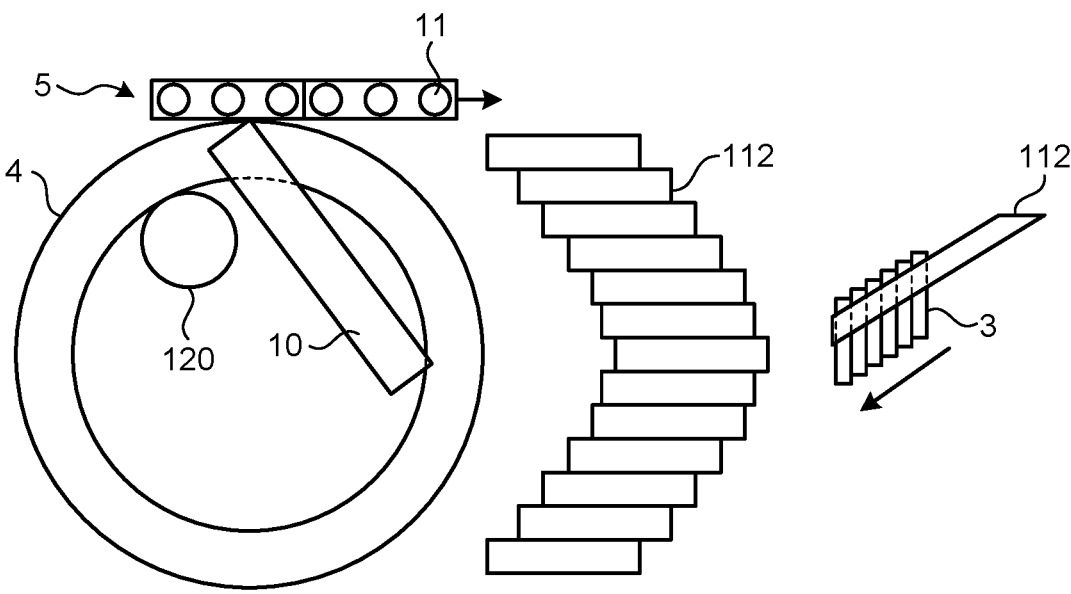

Next, in FIG. 17C, the controlling function 32 of the processing device 90 outputs, to the driving device 80, a fifth control signal for moving the reaction cuvette 3 containing the mixed liquid of the sample and the reagent to the reaction disk 4. In this case, by driving the sample arm 10 in accordance with the fifth control signal, the driving device 80 allows the distal end of the sample arm 10 to ascend, and moves the reaction cuvette 3 containing the sample 130 from the sample rack 5 to the reaction disk 4. The driving device 80 then allows the distal end of the sample arm 10 to descend, and allows the reaction cuvette 3 containing the mixed liquid of the sample and the reagent to be disengaged from the distal end of the sample arm 10.

Thereafter, the measuring part 13 measures the mixed liquid of the sample and the reagent in the reaction cuvette 3 by applying light to the reaction cuvette 3 at the measurement position. Alternatively, the measuring part 13 measures the mixed liquid by measuring electric potential of the mixed liquid in the reaction cuvette 3.

Figure 17D:
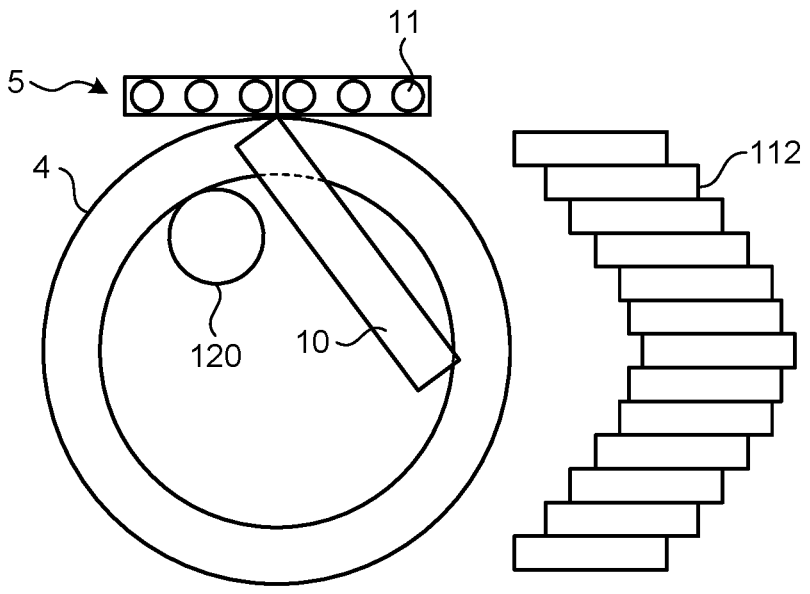

Next, in FIG. 17D, the controlling function 32 of the processing device 90 outputs, to the driving device 80, a sixth control signal for extracting the reaction cuvette 3 that has been completely measured from the reaction disk 4. In this case, by driving the sample arm 10 in accordance with the sixth control signal, the driving device 80 moves the distal end of the sample arm 10 to the reaction cuvette 3 that has been completely measured on the reaction disk 4. The driving device 80 then allows the distal end of the sample arm 10 to descend, and extracts the reaction cuvette 3 that has been completely measured.

Figure 17E:
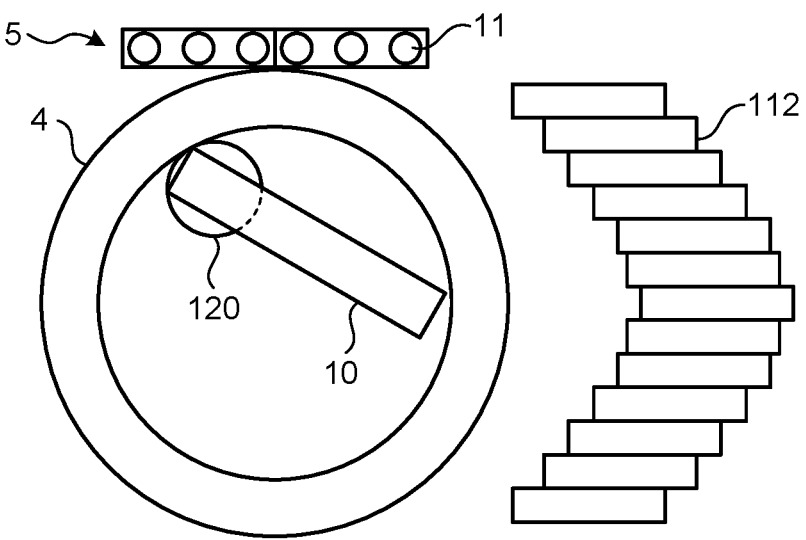

Next, in FIG. 17E, the controlling function 32 of the processing device 90 outputs, to the driving device 80, a seventh control signal for discarding the reaction cuvette 3 that has been completely measured. In this case, by driving the sample arm 10 in accordance with the seventh control signal, the driving device 80 moves the reaction cuvette 3 that has been completely measured from the reaction disk 4 to the discarding part 120, and allows the reaction cuvette 3 that has been completely measured to be disengaged from the distal end of the sample arm 10. That is, by housing the reaction cuvette 3 after the measurement in the discarding part 120, the reaction cuvette 3 after the measurement is discarded.

Figure 17F:
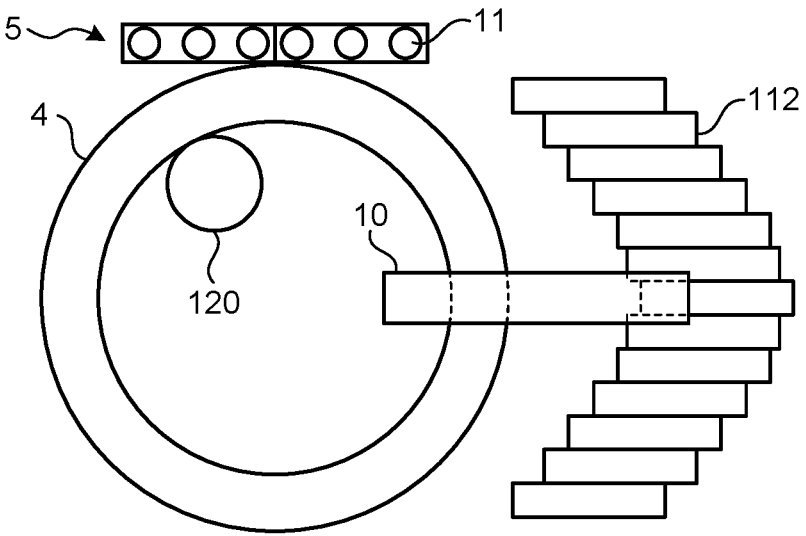

Thereafter, in FIG. 17F, the controlling function 32 of the processing device 90 outputs the first control signal to the driving device 80 again. In this case, similarly to the above description, by driving the sample arm 10 in accordance with the first control signal, the driving device 80 extracts the reaction cuvette 3 that has moved to the terminal end of the rail of the transferring part 112.

In this way, the reaction cuvette 3 according to the second embodiment includes the cuvette main body 300 and the aspiration port 310. The aspiration port 310 is disposed on the cuvette main body 300 to allow the aspirated sample 130 to flow into the inner part of the cuvette main body 300. Thus, similarly to the first embodiment, carry-over is not generated in the automatic analyzing device 100 according to the second embodiment, so that measurement efficiency can be improved.

The reaction cuvette 3 according to the second embodiment further includes the aspirating device that is disposed on the cuvette main body 300 for aspirating the sample 130 (the aspirating device 330 or the aspirating device 340), the reaction chamber 342 disposed inside the cuvette main body 300, and the flow channel control part 344. The reaction chamber 342 houses the reagent 140 that reacts with the sample 130. The flow channel control part 344 allows the sample 130 to flow into the reaction chamber 342 by forming the flow channel 343 from the aspiration port 310 to the aspirating device via the reaction chamber 342. Due to this, the second embodiment does not require a probe or a pump for dispensing the sample and the reagent, a mixer or a mixing arm for mixing the sample and the reagent, a cleaning tank for cleaning the probe, and the like. Thus, according to the second embodiment, the device scale can be reduced as compared with the first embodiment.

Third Embodiment

The first embodiment describes the case in which the sample 130 is allowed to flow into the inner part of the cuvette main body 300 from the bottom surface side of the cuvette main body 300 of the reaction cuvette 3. In a third embodiment, the sample 130 is allowed to flow into the inner part of the cuvette main body 300 from the bottom surface side of the cuvette main body 300 of the reaction cuvette 3, the mixed liquid 150 of the sample 130 and the reagent 140 is housed in the reaction cuvette 3, and the atmosphere is allowed to flow into the inner part of the cuvette main body 300 from the bottom surface side of the cuvette main body. Specifically, in the third embodiment, after the mixed liquid 150 of the sample 130 and the reagent 140 is housed in the reaction cuvette 3, air bubbles for mixing the mixed liquid 150 are generated in the reaction cuvette 3. In the third embodiment, the sample 130 and the atmosphere are examples of a fluid.

The following describes a configuration example of the automatic analyzing device 100 according to the third embodiment with reference to FIG. 18 to FIG. 23. In the third embodiment, the same description as that in the first embodiment will not be repeated.

Figure 18:
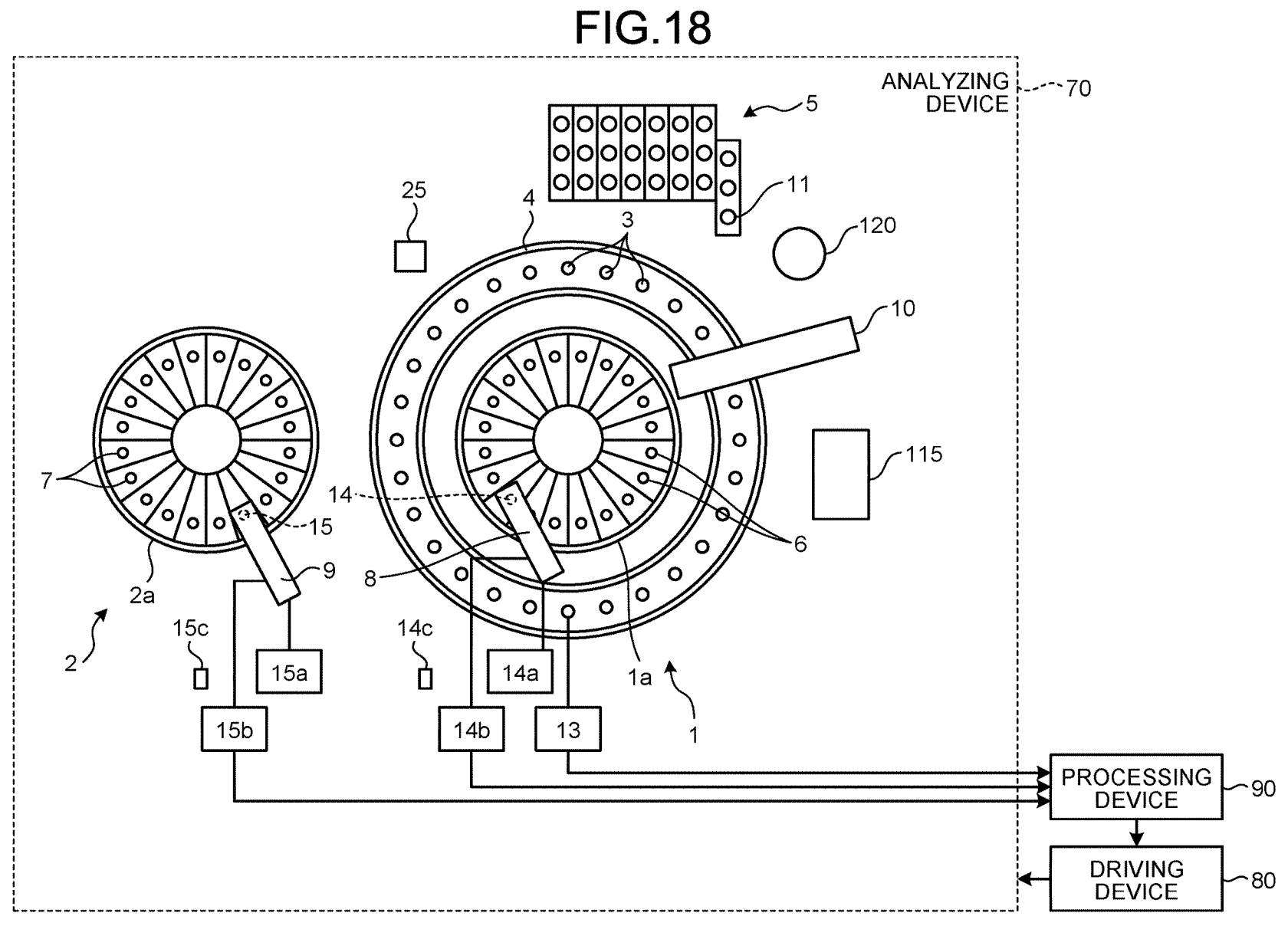

FIG. 18 is a diagram illustrating an example of a configuration of the analyzing device 70 in the automatic analyzing device 100 according to the third embodiment.

In the example illustrated in FIG. 18, the analyzing device 70 includes an accumulation unit 115 in place of the conveying device 110 in FIG. 2. The accumulation unit 115 accumulates the reaction cuvettes 3 put into the accumulation unit. For example, the sample arm 10 moves the reaction cuvette 3 accumulated in the accumulation unit 115 to the sample rack 5.

In the example illustrated in FIG. 18, the analyzing device 70 includes a mixing arm 25 in place of the mixers 17 and 19, the mixing arms 18 and 20, and the cleaning tanks 17a and 19a in FIG. 2. A mixing device (described later) is attached to a distal end of the mixing arm 25, and the mixed liquid of the sample and the reagent in the reaction cuvette 3 is stirred by the mixing device (described later).

In the automatic analyzing device, typically, the mixed liquid of the sample and the reagent in the reaction cuvette is stirred by the mixer, and the mixer is cleaned by the cleaning tank after the mixed liquid is stirred. However, with a scheme of mixing the mixed liquid in the reaction cuvette by the mixer and cleaning the mixer after the mixing, there may be a case in which the mixed liquid is not sufficiently removed from the mixer by cleaning and carry-over is generated. When carry-over is generated, for example, a phenomenon may be allowed such that a measurement result of the next measurement becomes an unusually high value.

Thus, the automatic analyzing device 100 according to the present embodiment is configured as follows so that measurement efficiency can be improved. The automatic analyzing device 100 according to the present embodiment includes the reaction cuvette 3 and the mixing device. The reaction cuvette 3 houses the mixed liquid of the sample and the reagent, and includes the aspiration port. The mixing device is a device detachable from the reaction cuvette 3, and aspirates the atmosphere into the reaction cuvette 3 through the aspiration port to generate air bubbles for mixing the mixed liquid in the reaction cuvette 3.

Figure 19A:
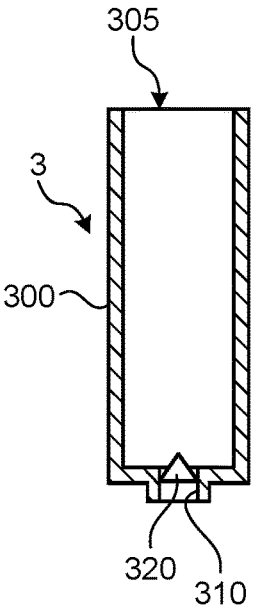
FIG. 19A is a cross-sectional view illustrating a configuration example of a reaction cuvette in the automatic analyzing device according to the third embodiment, and is an explanatory diagram of sample suction processing.

FIG. 19A is a cross-sectional view illustrating a configuration example of the reaction cuvette 3. As illustrated in FIG. 19A, the reaction cuvette 3 includes the cuvette main body 300 having the opening 305 formed on the upper surface thereof. The aspiration port 310 is disposed on the cuvette main body 300 for allowing the aspirated sample 130 to flow into the inner part of the cuvette main body 300. For example, the aspiration port 310 is disposed on the bottom part of the cuvette main body 300 opposite to the opening 305 of the reaction cuvette 3. The backflow prevention part 320 for preventing backflow in a direction from the inner part of the cuvette main body 300 to the outside is disposed on the aspiration port 310.

For example, the backflow prevention part 320 is a check valve for preventing backflow in a direction from the cuvette main body 300 to the aspiration port 310. The check valve is released when the air pressure inside the cuvette main body 300 is reduced, and the sample 130 can be aspirated into the inner part of the cuvette main body 300. The check valve is closed at the time when the air pressure inside the cuvette main body 300 becomes equal to the outside air pressure to prevent backflow of the sample 130.

As illustrated in FIG. 19B to FIG. 19E, in the automatic analyzing device 100, the analyzing device 70 further includes a aspirating device 400. FIG. 19B to FIG. 19E are cross-sectional views illustrating configurations of the reaction cuvette 3 and the aspirating device 400. The sample 130 housed in the sample container 11 is aspirated by the aspirating device 400 that is detachable from the cuvette main body 300 of the reaction cuvette 3. That is, the sample 130 is allowed to flow into the inner part of the cuvette main body 300 through the aspiration port 310 disposed on the bottom part of the cuvette main body 300 by suction performed by the aspirating device 400.

The aspirating device 400 includes a connection part 410 that is formed to be detachable from the reaction cuvette 3, and a pump part 420 for aspirating the sample 130 into the cuvette main body 300 of the reaction cuvette 3 through the aspiration port 310. An outer diameter of the connection part 410 is substantially the same as the inner diameter of the cuvette main body 300. The connection part 410 is connected to the reaction cuvette 3 when a front end side of the connection part 410 is inserted into the inner part of the cuvette main body 300 from the opening 305 of the cuvette main body 300. The aspirating device 400 is, for example, a mechanism held by the automatic analyzing device 100, and attached to the distal end of the sample arm 10. The pump part 420 is, for example, a cylinder made of metal, and connected to a mechanism for allowing the cylinder to operate upward and downward (not illustrated) at the distal end of the sample arm 10.

Figure 19B:
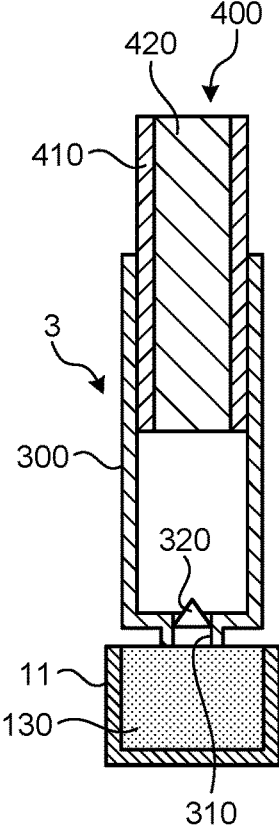
FIG. 19B to FIG. 19E are cross-sectional views illustrating configurations of the reaction cuvette and an aspirating device in the automatic analyzing device according to the third embodiment, and are explanatory diagrams of the sample suction processing.
Figure 19C:
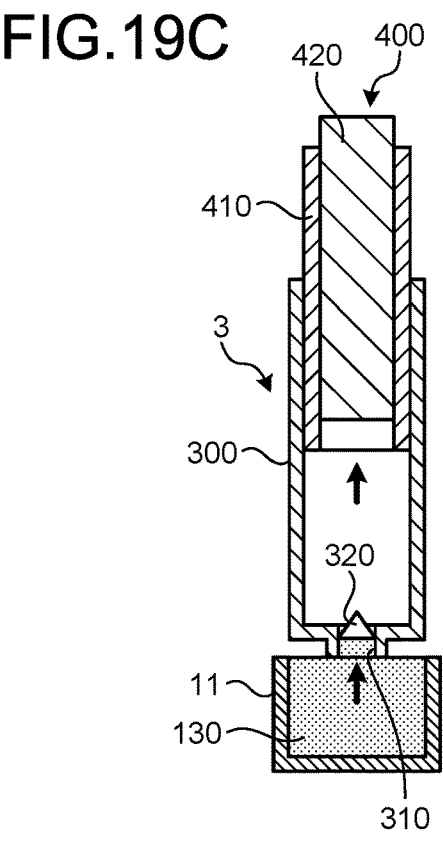
Figure 19D:
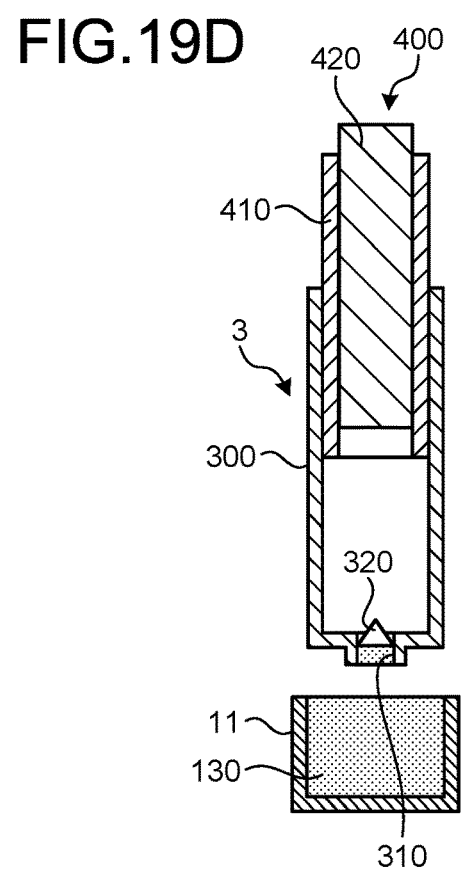
Figures 19E, 19F:
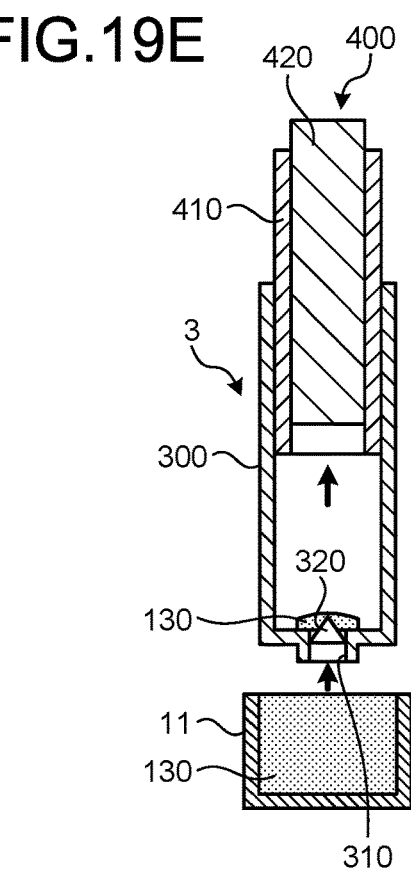
FIG. 19F and FIG. 19G are cross-sectional views illustrating configurations of the reaction cuvette and a reagent dispensing probe in the automatic analyzing device according to the third embodiment, and are explanatory diagrams of reagent dispensing processing.
Figure 19G:
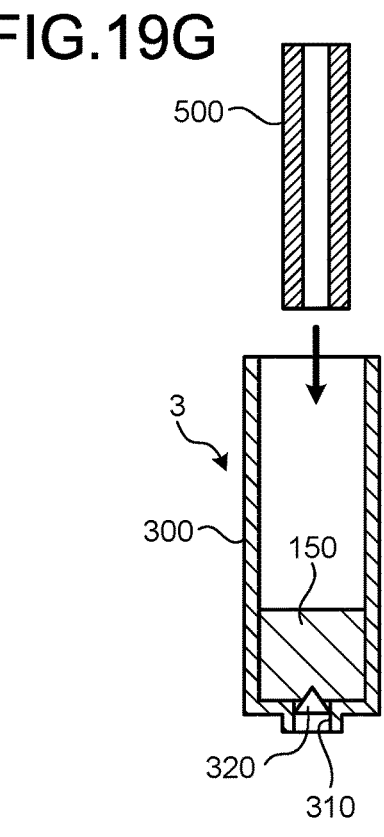

FIG. 19F and FIG. 19G are cross-sectional views illustrating configurations of the reaction cuvette 3 and a reagent dispensing probe 500. The reagent dispensing probe 500 corresponds to the reagent dispensing probes 14 and 15 in FIG. 18. The reagent 140 that reacts with the sample 130 is dispensed through the opening 305 of the cuvette main body 300 by the reagent dispensing probe 500.

Figure 19H:
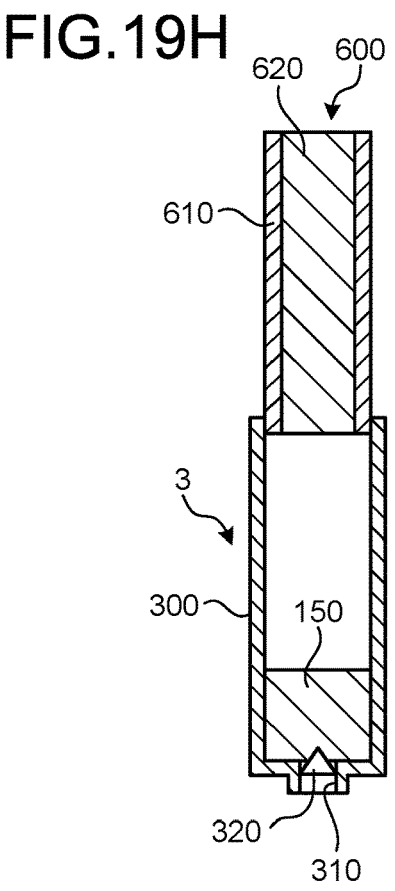
FIG. 19H and FIG. 19I are cross-sectional views illustrating configurations of the reaction cuvette and a mixing device in the automatic analyzing device according to the third embodiment, and are explanatory diagrams of mixing processing.
Figure 19I:
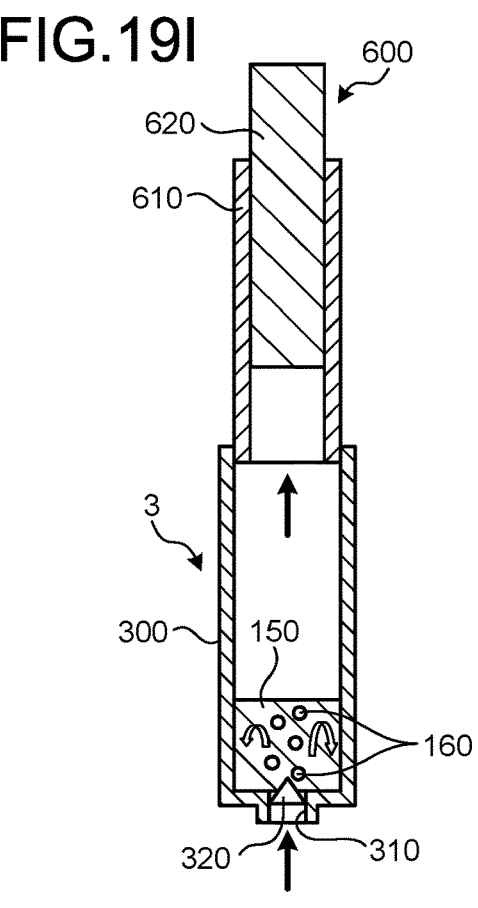

As illustrated in FIG. 19H and FIG. 19I, in the automatic analyzing device 100, the analyzing device 70 further includes a mixing device 600. FIG. 19H and FIG. 19I are cross-sectional views illustrating configurations of the reaction cuvette 3 and the mixing device 600. The mixed liquid 150 of the sample 130 and the reagent 140 in the reaction cuvette 3 is stirred by the mixing device 600 that is detachable from the cuvette main body 300. For example, air bubbles 160 are allowed to flow into the inner part of the cuvette main body 300 through the aspiration port 310 disposed on the bottom part of the cuvette main body 300 by suction performed by the mixing device 600.

The mixing device 600 includes a connection part 610 that is formed to be detachable from the reaction cuvette 3, and a pump part 620 that generates the air bubbles 160 for mixing the mixed liquid 150 in the cuvette main body 300 by aspirating the atmosphere and allowing the atmosphere to flow into the inner part of the cuvette main body 300 through the aspiration port 310 of the reaction cuvette 3. An outer diameter of the connection part 610 is substantially the same as the inner diameter of the cuvette main body 300, and the connection part 610 is connected to the reaction cuvette 3 when a front end side of the connection part 610 is inserted into the inner part of the cuvette main body 300 through the opening 305 of the cuvette main body 300.

In the automatic analyzing device 100, the analyzing device 70 includes the mixing arm 25 described above (refer to FIG. 18). The mixing device 600 is, for example, a mechanism held by the automatic analyzing device 100, and attached to the distal end of the mixing arm 25. The pump part 620 is, for example, a cylinder made of metal, and connected to a mechanism for allowing the cylinder to operate upward and downward (not illustrated) at the distal end of the mixing arm 25.

With reference to FIG. 1, FIG. 18, and FIG. 19A to FIG. 19I, the following describes a processing procedure of the automatic analyzing device 100 according to the third embodiment.

First, in FIG. 19A to FIG. 19E, sample suction processing is performed. As described above, the reaction cuvettes 3 are accumulated in the accumulation unit 115 in FIG. 18. For example, the reaction cuvettes 3 are disposed in a state of being properly aligned in the accumulation unit 115 so that the opening 305 of the cuvette main body 300 of the reaction cuvette 3 faces upward in FIG. 19A.

The controlling function 32 of the processing device 90 outputs, to the driving device 80, a control signal for extracting the reaction cuvette 3 from the accumulation unit 115. By driving the sample arm 10 in accordance with the control signal, the driving device 80 moves the distal end of the sample arm 10 to the accumulation unit 115. The driving device 80 then allows the distal end of the sample arm 10 to descend, and allows the connection part 410 of the aspirating device 400 to be connected to the opening 305 of the cuvette main body 300 of the reaction cuvette 3 in the accumulation unit 115.

Next, the controlling function 32 of the processing device 90 outputs, to the driving device 80, a control signal for moving the reaction cuvette 3 to the sample rack 5. By driving the sample arm 10 in accordance with the control signal, the driving device 80 allows the distal end of the sample arm 10 to ascend, and moves the reaction cuvette 3 connected to the aspirating device 400 from the accumulation unit 115 to the sample rack 5.

Thereafter, the controlling function 32 of the processing device 90 outputs, to the driving device 80, a control signal for bringing the aspiration port 310 of the reaction cuvette 3 into contact with the sample 130 in the sample container 11. In FIG. 19B, by driving the sample arm 10 in accordance with the control signal, the driving device 80 allows the distal end of the sample arm 10 to descend, and brings the aspiration port 310 of the reaction cuvette 3 connected to the aspirating device 400 into contact with the sample 130 in the sample container 11 held by the sample rack 5.

The controlling function 32 of the processing device 90 outputs, to the driving device 80, a control signal for aspirating the sample 130 in the sample container 11 into the inner part of the cuvette main body 300 of the reaction cuvette 3. In FIG. 19C, by moving the pump part 420 of the aspirating device 400 disposed at the distal end of the sample arm 10 upward in accordance with the control signal, the driving device 80 allows the sample 130 in the sample container 11 held by the sample rack 5 to flow into the aspiration port 310 of the reaction cuvette 3 by suction performed by the pump part 420. Specifically, as illustrated in FIG. 19D, the aspirated sample 130 is retained in the aspiration port 310 of the reaction cuvette 3. In FIG. 19E, by further moving the pump part 420 of the aspirating device 400 upward, the driving device 80 allows the sample 130 retained in the aspiration port 310 of the reaction cuvette 3 to flow into the inner part of the cuvette main body 300 of the reaction cuvette 3 by suction performed by the pump part 420.

Next, in FIG. 19F and FIG. 19G, reagent dispensing processing is performed. The controlling function 32 of the processing device 90 outputs, to the driving device 80, a control signal for moving the reaction cuvette 3 containing the sample 130 to the reaction disk 4. By driving the sample arm 10 in accordance with the control signal, the driving device 80 allows the reaction cuvette 3 connected to the aspirating device 400 at the distal end of the sample arm 10 to ascend, and moves the reaction cuvette 3 containing the sample 130 from the sample rack 5 to the reaction disk 4. The driving device 80 then allows the distal end of the sample arm 10 to descend, and allows the connection part 410 of the aspirating device 400 to be disengaged from the reaction cuvette 3 containing the sample 130.

Next, the controlling function 32 of the processing device 90 outputs, to the driving device 80, a control signal for aspirating the reagent 140 in the reagent container. By driving the reagent dispensing arm in accordance with the control signal, the driving device 80 moves the reagent dispensing probe 500 to the reagent container held by the reagent rack, and allows the reagent dispensing probe 500 to aspirate the reagent 140 in the reagent container by driving the reagent dispensing pump.

Thereafter, the controlling function 32 of the processing device 90 outputs, to the driving device 80, a control signal for dispensing the reagent 140 to the inner part of the cuvette main body 300 of the reaction cuvette 3. In FIG. 19F, by driving the reagent dispensing arm in accordance with the control signal, the driving device 80 moves the reagent dispensing probe 500 that has aspirated the reagent 140 to an upper side of the opening 305 of the cuvette main body 300 of the reaction cuvette 3. In FIG. 19G, by driving the reagent dispensing pump, the driving device 80 allows the reagent dispensing probe 500 to dispense the reagent 140 into the cuvette main body 300 of the reaction cuvette 3. That is, the reagent 140 is dispensed through the opening 305 of the cuvette main body 300 by the reagent dispensing probe 500.

Next, in FIG. 19H and FIG. 19I, mixing processing is performed. The controlling function 32 of the processing device 90 outputs, to the driving device 80, a control signal for connecting the mixing device 600 to the reaction cuvette 3. By driving the mixing arm 25 in accordance with the control signal, the driving device 80 moves the distal end of the mixing arm 25 to an upper side of the reaction cuvette 3 housing the mixed liquid 150 of the sample 130 and the reagent 140. In FIG. 19H, the driving device 80 allows the distal end of the mixing arm 25 to descend, and allows the connection part 610 of the mixing device 600 to be connected to the opening 305 of the cuvette main body 300 of the reaction cuvette 3 housing the mixed liquid 150 of the sample 130 and the reagent 140.

Next, the controlling function 32 of the processing device 90 outputs, to the driving device 80, a control signal for mixing the mixed liquid 150 in the cuvette main body 300 of the reaction cuvette 3. In FIG. 19I, by moving the pump part 620 of the mixing device 600 at the distal end of the mixing arm 25 upward in accordance with the control signal, the driving device 80 aspirates the atmosphere through the aspiration port 310 of the reaction cuvette 3 by suction performed by the pump part 620, and allows the atmosphere aspirated through the aspiration port 310 to flow into the inner part of the cuvette main body 300 of the reaction cuvette 3 to generate the air bubbles 160 for mixing the mixed liquid 150 in the cuvette main body 300 of the reaction cuvette 3.

The mixing device 600 generates each of the air bubbles 160 under a mixing condition including at least one of a size of the air bubble 160, a generation time of the air bubble 160, and a generation amount of the air bubble 160. The mixing condition may be set in advance for each reagent or each examination item, or may be set by a user. The mixing condition includes a moving speed of the pump part 620 of the mixing device 600 and an operating time of the pump part 620. That is, the mixing device 600 adjusts the size of the air bubble 160, the generation time of the air bubble 160, and the generation amount of the air bubble 160 based on the moving speed of the pump part 620 and the operating time of the pump part 620.

Next, the controlling function 32 of the processing device 90 outputs, to the driving device 80, a control signal for allowing the mixing device 600 to be disengaged from the reaction cuvette 3. By driving the mixing arm 25 in accordance with the control signal, the driving device 80 allows the connection part 610 of the mixing device 600 at the distal end of the mixing arm 25 to be disengaged from the reaction cuvette 3.

Thereafter, the measurement processing described above is performed, and discarding processing is performed.

Figure 20:
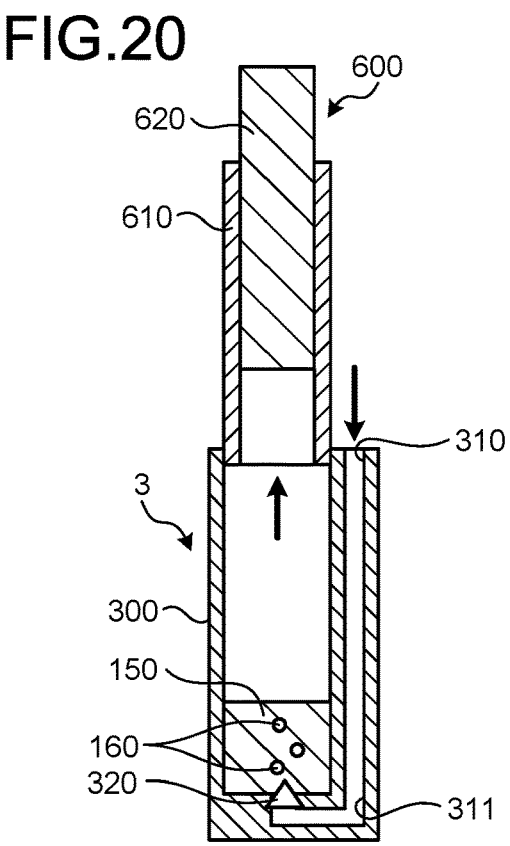
FIG. 20 is a cross-sectional view illustrating configurations of a reaction cuvette and a mixing device in an automatic analyzing device according to a first modification of the third embodiment, and is an explanatory diagram of mixing processing.

FIG. 20 is a cross-sectional view illustrating configurations of the reaction cuvette 3 and the mixing device 600 in the automatic analyzing device 100 according to a first modification of the third embodiment, and is an explanatory diagram of the mixing processing. As illustrated in FIG. 20, the reaction cuvette 3 further includes a flow channel 311 formed on the outside of the cuvette main body 300. An inlet of the flow channel 311 is the aspiration port 310 for the atmosphere, which is disposed on an upper part of the cuvette main body 300. In FIG. 20, the flow channel 311 is formed to guide the atmosphere aspirated through the aspiration port 310 disposed on the upper part of the cuvette main body 300 to the inner part of the cuvette main body 300. In the example illustrated in FIG. 20, the atmosphere is aspirated through the aspiration port 310 disposed on the upper part of the cuvette main body 300, so that, under an environment in which dirt is accumulated on the bottom part side of the cuvette main body 300, for example, the cuvette main body 300 can be prevented from aspirating the dirt from the bottom part side.

In the example illustrated in FIG. 20, the sample 130 is dispensed through the opening 305 of the cuvette main body 300 of the reaction cuvette 3. In this case, in the automatic analyzing device 100, the analyzing device 70 further includes a sample dispensing probe, a sample dispensing arm that supports the sample dispensing probe to be capable of rotating and moving upward or downward, a sample dispensing pump that allows the sample dispensing probe to aspirate and dispense the sample, and a cleaning tank that cleans the sample dispensing probe every time dispensing of the sample ends.

Figures 21, 22:
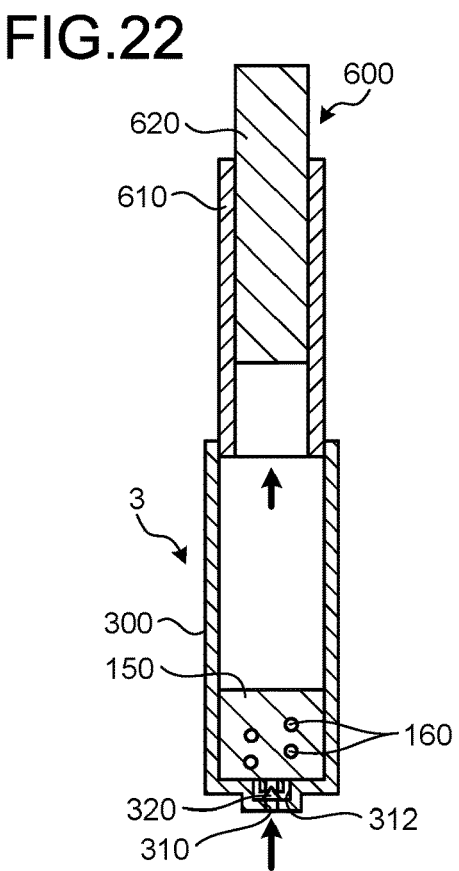
FIG. 21 is a cross-sectional view illustrating configurations of a reaction cuvette and a mixing device in an automatic analyzing device according to a second modification of the third embodiment, and is an explanatory diagram of mixing processing.
FIG. 22 is a cross-sectional view illustrating configurations of a reaction cuvette and a mixing device in an automatic analyzing device according to a third modification of the third embodiment, and is an explanatory diagram of mixing processing.

FIG. 21 is a cross-sectional view illustrating configurations of the reaction cuvette 3 and the mixing device 600 in the automatic analyzing device 100 according to a second modification of the third embodiment, and is an explanatory diagram of mixing processing. As illustrated in FIG. 21, a plurality of the aspiration ports 310 are disposed on the bottom part of the cuvette main body 300 in the reaction cuvette 3, and a plurality of the backflow prevention parts 320 are respectively disposed on the aspiration ports 310. In the example illustrated in FIG. 21, the two aspiration ports 310 are disposed, and the two backflow prevention parts 320 are respectively disposed on the two aspiration ports 310. In the example illustrated in FIG. 21, the atmosphere is allowed to flow into the inner part of the cuvette main body 300 via the aspiration ports 310, so that the air bubbles 160 can be uniformly generated in the cuvette main body 300.

FIG. 22 is a cross-sectional view illustrating configurations of the reaction cuvette 3 and the mixing device 600 in the automatic analyzing device 100 according to a third modification of the third embodiment, and is an explanatory diagram of mixing processing. As illustrated in FIG. 22, in the reaction cuvette 3, a plurality of flow channels 312 are formed between the cuvette main body 300 and the aspiration port 310 disposed on the bottom part of the cuvette main body 300. In the example illustrated in FIG. 22, the atmosphere is allowed to flow into the inner part of the cuvette main body 300 via the flow channels 312 through the aspiration port 310, so that the air bubbles 160 can be uniformly generated in the cuvette main body 300.

Figure 23:
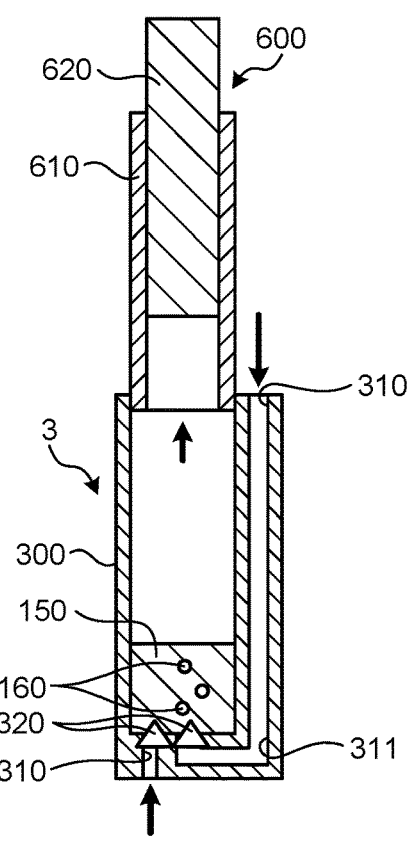
FIG. 23 is a cross-sectional view illustrating configurations of a reaction cuvette and a mixing device in an automatic analyzing device according to a fourth modification of the third embodiment, and is an explanatory diagram of mixing processing.

FIG. 23 is a cross-sectional view illustrating configurations of the reaction cuvette 3 and the mixing device 600 in the automatic analyzing device 100 according to a fourth modification of the third embodiment, and is an explanatory diagram of mixing processing. In the example illustrated in FIG. 23, the two aspiration ports 310 are disposed, and the two backflow prevention parts 320 are respectively disposed on the two aspiration ports 310. In the example illustrated in FIG. 23, the reaction cuvette 3 includes the flow channel 311 formed on the outside of the cuvette main body 300. Thus, as illustrated in FIG. 23, for example, one of the two aspiration ports 310 is used for aspirating the sample 130, and the other one of the aspiration ports 310 is used for aspirating the atmosphere. Specifically, an inlet of the flow channel 311 is the aspiration port 310 for the atmosphere, which is disposed on the upper part of the cuvette main body 300. In FIG. 23, the flow channel 311 is formed to guide the atmosphere aspirated through the aspiration port 310, which is disposed on the upper part of the cuvette main body 300, to the inner part of the cuvette main body 300. In the example illustrated in FIG. 23, the atmosphere is aspirated through the aspiration port 310 disposed on the upper part of the cuvette main body 300, so that, similarly to the first modification described above with reference to FIG. 20, for example, the cuvette main body 300 can be prevented from aspirating dirt from the bottom part side under an environment in which the dirt is accumulated on the bottom part side of the cuvette main body 300. Unlike the first modification described above with reference to FIG. 20, the example illustrated in FIG. 23 does not require the sample dispensing probe, the sample dispensing pump that allows the sample dispensing probe to aspirate and dispense the sample, and the cleaning tank that cleans the sample dispensing probe every time dispensing of the sample ends. In a case in which the inlet of the flow channel 311 is in a released state at the time of aspirating the sample 130, there is the possibility that the sample 130 is not aspirated. Thus, a mechanism for closing the inlet of the flow channel 311 with a plug and the like is required so that the atmosphere is not aspirated through the flow channel 311 at the time of aspirating the sample 130.

As described above, the automatic analyzing device 100 according to the third embodiment includes the reaction cuvette 3 that houses the mixed liquid 150 of the sample 130 and the reagent 140 and has the aspiration port 310, and the mixing device 600 that is detachable from the reaction cuvette 3. The mixing device 600 aspirates the atmosphere into the reaction cuvette 3 through the aspiration port 310 to generate the air bubbles 160 for mixing the mixed liquid 150 in the reaction cuvette 3. Due to this, the third embodiment does not require the mixer, and the cleaning tank for cleaning the mixer every time the mixed liquid is stirred. For example, with a scheme of mixing the mixed liquid in the reaction cuvette with the mixer and cleaning the mixer after the mixing, in a case in which the mixed liquid is not sufficiently removed by cleaning when the mixer that has stirred the mixed liquid of the sample and the reagent in the reaction cuvette is cleaned, carry-over may be generated due to influence of the mixed liquid. On the other hand, the third embodiment employs a scheme of generating the air bubbles 160 for mixing the mixed liquid 150 in the reaction cuvette 3 by allowing the aspirated atmosphere to flow into the inner part of the cuvette main body 300, so that the mixer and the cleaning tank for cleaning the mixer are not required. As a result, carry-over is not generated. Carry-over is not generated in the automatic analyzing device 100, so that measurement efficiency can be improved.

In a case of allowing the sample 130 aspirated through the aspiration port 310 of the reaction cuvette 3 to flow into the inner part of the cuvette main body 300, the third embodiment does not require the sample dispensing probe, the sample dispensing pump that allows the sample dispensing probe to aspirate and dispense the sample, and the cleaning tank that cleans the sample dispensing probe every time dispensing of the sample ends. For example, with a scheme in which the sample dispensing probe aspirates the sample and dispenses the sample to the reaction cuvette, in a case in which the sample is not sufficiently removed by cleaning when the sample dispensing probe that has dispensed the sample is cleaned, carry-over may be generated due to influence of the sample. On the other hand, the third embodiment employs the scheme of allowing the aspirated sample 130 to flow into the inner part of the cuvette main body 300, so that the sample dispensing probe, the sample dispensing pump, and the cleaning tank are not required. As a result, carry-over is not generated. Carry-over is not generated in the automatic analyzing device 100, so that measurement efficiency can be improved.

Fourth Embodiment

Regarding the automatic analyzing device 100 according to the third embodiment, described is a case in which the mixing device 600 allows the atmosphere aspirated through the aspiration port 310 of the reaction cuvette 3 to flow into the inner part of the reaction cuvette 3 to generate the air bubbles 160 for mixing the mixed liquid 150 in the reaction cuvette 3. In the automatic analyzing device 100 according to a fourth embodiment, the mixing device generates the air bubbles 160 for mixing the mixed liquid 150 in the reaction cuvette 3 with the atmosphere flowing into the inner part of the reaction cuvette 3 by reducing a space connected to the reaction cuvette 3 via the aspiration port 310. In the fourth embodiment, the same description as that in the third embodiment will not be repeated.

Figure 24:
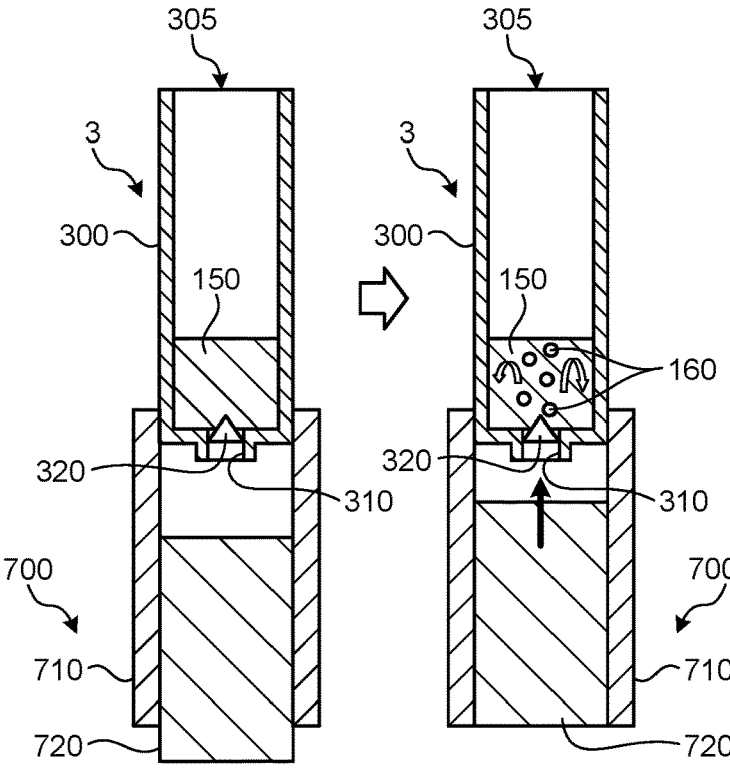
FIG. 24 is a cross-sectional view illustrating configurations of a reaction cuvette and a mixing device in an automatic analyzing device according to a fourth embodiment, and is an explanatory diagram of mixing processing.

FIG. 24 is a cross-sectional view illustrating configurations of the reaction cuvette 3 and a mixing device 700 in the automatic analyzing device 100 according to the fourth embodiment, and is an explanatory diagram of mixing processing. As illustrated in FIG. 24, in the automatic analyzing device 100, the analyzing device 70 includes the mixing device 700 in place of the mixing device 600 in the third embodiment.

The mixing device 700 includes a connection part 710 that is formed to be detachable from the reaction cuvette 3, and a pump part 720 that allows the atmosphere to flow into the inner part of the cuvette main body 300 through the aspiration port 310 of the reaction cuvette 3 to generate the air bubbles 160 for mixing the mixed liquid 150 in the cuvette main body 300. An inner diameter of the connection part 710 is substantially the same as the outer diameter of the cuvette main body 300, and the connection part 710 is connected to the reaction cuvette 3 when a front end side of the connection part 710 covers the aspiration port 310 of the cuvette main body 300. The mixing device 700 is, for example, a mechanism held by the automatic analyzing device 100, and attached to the distal end of the mixing arm 25. The pump part 720 is, for example, a cylinder made of metal, and connected to a mechanism for allowing the cylinder to operate upward and downward (not illustrated) at the distal end of the mixing arm 25.

The following describes mixing processing according to the fourth embodiment with reference to FIG. 1, FIG. 18, and FIG. 24.

The controlling function 32 of the processing device 90 outputs, to the driving device 80, a control signal for connecting the mixing device 700 to the reaction cuvette 3. By driving the mixing arm 25 in accordance with the control signal, the driving device 80 moves the distal end of the mixing arm 25 to the upper side of the reaction cuvette 3 housing the mixed liquid 150 of the sample 130 and the reagent 140. On the left side of FIG. 24, the driving device 80 allows the distal end of the mixing arm 25 to ascend, and allows the connection part 710 of the mixing device 700 to be connected to the aspiration port 310 of the reaction cuvette 3 housing the mixed liquid 150 of the sample 130 and the reagent 140. At this point, in the connection part 710 of the mixing device 700, a space is formed between the pump part 720 of the mixing device 700 and the aspiration port 310 of the cuvette main body 300 of the reaction cuvette 3.

Next, the controlling function 32 of the processing device 90 outputs, to the driving device 80, a control signal for mixing the mixed liquid 150 in the cuvette main body 300 of the reaction cuvette 3. On the right side of FIG. 24, by moving the pump part 720 of the mixing device 700 at the distal end of the mixing arm 25 upward in accordance with the control signal, the driving device 80 reduces the space formed between the pump part 720 and the aspiration port 310 of the cuvette main body 300 of the reaction cuvette 3, and allows the atmosphere obtained at the time of reducing the space to flow into the inner part of the cuvette main body 300 of the reaction cuvette 3 to generate the air bubbles 160 for mixing the mixed liquid 150 in the cuvette main body 300 of the reaction cuvette 3.

The mixing device 700 generates the air bubbles 160 under a mixing condition including at least one of the size of the air bubble 160, the generation time of the air bubble 160, and the generation amount of the air bubble 160. The mixing condition may be set in advance for each reagent or each examination item, or may be set by the user. The mixing condition includes a moving speed of the pump part 720 of the mixing device 700 and an operating time of the pump part 720. That is, the mixing device 700 adjusts the size of the air bubble 160, the generation time of the air bubble 160, and the generation amount of the air bubble 160 based on the moving speed of the pump part 720 and the operating time of the pump part 720.

Next, the controlling function 32 of the processing device 90 outputs, to the driving device 80, a control signal for allowing the mixing device 700 to be disengaged from the reaction cuvette 3. By driving the mixing arm 25 in accordance with the control signal, the driving device 80 allows the connection part 710 of the mixing device 700 at the distal end of the mixing arm 25 to be disengaged from the reaction cuvette 3.

Figure 25:
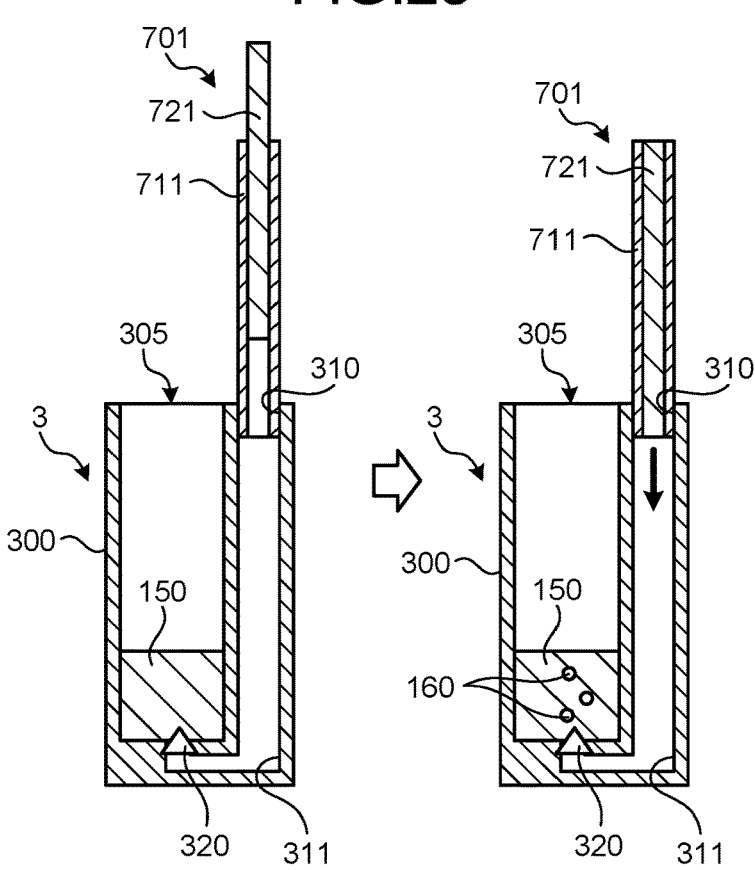
FIG. 25 is a cross-sectional view illustrating configurations of a reaction cuvette and a mixing device in an automatic analyzing device according to a first modification of the fourth embodiment, and is an explanatory diagram of mixing processing.

FIG. 25 is a cross-sectional view illustrating configurations of the reaction cuvette 3 and a mixing device 701 in the automatic analyzing device 100 according to a first modification of the fourth embodiment, and is an explanatory diagram of mixing processing. As illustrated in FIG. 25, the reaction cuvette 3 further includes the flow channel 311 formed on the outside of the cuvette main body 300. The inlet of the flow channel 311 is the aspiration port 310 for the atmosphere, which is disposed on the upper part of the cuvette main body 300. In FIG. 25, the flow channel 311 is formed to guide the atmosphere, which is aspirated through the aspiration port 310 disposed on the upper part of the cuvette main body 300, to the inner part of the cuvette main body 300. In this case, as illustrated in FIG. 25, in the automatic analyzing device 100, the analyzing device 70 includes the mixing device 701 in place of the mixing device 700.

The mixing device 701 includes a connection part 711 that is formed to be detachable from the reaction cuvette 3, and a pump part 721 that allows the atmosphere to flow into the inner part of the cuvette main body 300 through the aspiration port 310 of the reaction cuvette 3 to generate the air bubbles 160 for mixing the mixed liquid 150 in the cuvette main body 300. An outer diameter of the connection part 711 is substantially the same as the inner diameter of the flow channel 311, and the connection part 711 is connected to the reaction cuvette 3 when a front end side of the connection part 711 is inserted into the inner part of the flow channel 311 through the inlet of the flow channel 311. The mixing device 701 is, for example, a mechanism held by the automatic analyzing device 100, and attached to the distal end of the mixing arm 25. The pump part 721 is, for example, a cylinder made of metal, and connected to a mechanism for allowing the cylinder to operate upward and downward (not illustrated) at the distal end of the mixing arm 25.

The following describes mixing processing according to the fourth embodiment with reference to FIG. 1, FIG. 18, and FIG. 25.

The controlling function 32 of the processing device 90 outputs, to the driving device 80, a control signal for connecting the mixing device 700 to the reaction cuvette 3. By driving the mixing arm 25 in accordance with the control signal, the driving device 80 moves the distal end of the mixing arm 25 to the upper side of the reaction cuvette 3 housing the mixed liquid 150 of the sample 130 and the reagent 140. On the left side of FIG. 25, the driving device 80 allows the distal end of the mixing arm 25 to descend, and allows the connection part 711 of the mixing device 701 to be connected to the inlet of the flow channel 311 formed on the outside of the reaction cuvette 3. At this point, in the connection part 711 of the mixing device 701, a space is formed between the pump part 721 of the mixing device 701 and the flow channel 311 formed on the outside of the reaction cuvette 3.

Next, the controlling function 32 of the processing device 90 outputs, to the driving device 80, a control signal for mixing the mixed liquid 150 in the cuvette main body 300 of the reaction cuvette 3. On the right side of FIG. 25, by moving the pump part 721 of the mixing device 701 at the distal end of the mixing arm 25 downward in accordance with the control signal, the driving device 80 reduces the space formed between the pump part 721 and the flow channel 311 formed on the outside of the reaction cuvette 3, and allows the atmosphere obtained at the time of reducing the space to flow into the inner part of the cuvette main body 300 via the aspiration port 310 of the reaction cuvette 3 to generate the air bubbles 160 for mixing the mixed liquid 150 in the cuvette main body 300 of the reaction cuvette 3.

Next, the controlling function 32 of the processing device 90 outputs, to the driving device 80, a control signal for allowing the mixing device 701 to be disengaged from the reaction cuvette 3. By driving the mixing arm 25 in accordance with the control signal, the driving device 80 allows the connection part 711 of the mixing device 701 at the distal end of the mixing arm 25 to be disengaged from the reaction cuvette 3.

In the example illustrated in FIG. 25, the atmosphere is aspirated into the reaction cuvette 3 through the aspiration port 310 disposed on the upper part of the cuvette main body 300, so that the mixing arm 25 can be driven on the upper side of the reaction cuvette 3 similarly to the third embodiment, for example. In the example illustrated in FIG. 25, similarly to the first modification of the third embodiment, the sample 130 is dispensed through the opening 305 of the cuvette main body 300 of the reaction cuvette 3.

Figure 26:
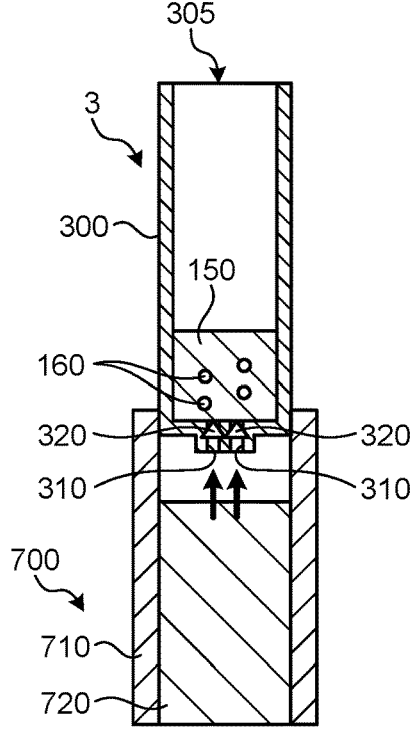
FIG. 26 is a cross-sectional view illustrating configurations of a reaction cuvette and a mixing device in an automatic analyzing device according to a second modification of the fourth embodiment, and is an explanatory diagram of mixing processing.

FIG. 26 is a cross-sectional view illustrating configurations of the reaction cuvette 3 and the mixing device 700 in the automatic analyzing device 100 according to a second modification of the fourth embodiment, and is an explanatory diagram of mixing processing. As illustrated in FIG. 26, in the reaction cuvette 3, the aspiration ports 310 are disposed on the bottom part of the cuvette main body 300, and the backflow prevention parts 320 are respectively disposed on the aspiration ports 310. In the example illustrated in FIG. 26, the two aspiration ports 310 are disposed, and the two backflow prevention parts 320 are respectively disposed on the two aspiration ports 310. In the example illustrated in FIG. 26, the atmosphere is allowed to flow into the inner part of the cuvette main body 300 via the aspiration ports 310, so that the air bubbles 160 can be uniformly generated in the cuvette main body 300.

Figure 27:
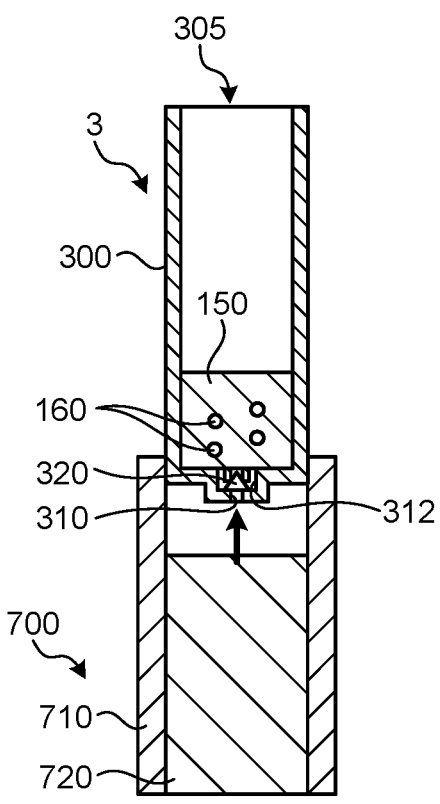
FIG. 27 is a cross-sectional view illustrating configurations of a reaction cuvette and a mixing device in an automatic analyzing device according to a third modification of the fourth embodiment, and is an explanatory diagram of mixing processing.

FIG. 27 is a cross-sectional view illustrating configurations of the reaction cuvette 3 and the mixing device 700 in the automatic analyzing device 100 according to a third modification of the fourth embodiment, and is an explanatory diagram of mixing processing. As illustrated in FIG. 27, in the reaction cuvette 3, the flow channels 312 are formed between the cuvette main body 300 and the aspiration port 310 disposed on the bottom part of the cuvette main body 300. In the example illustrated in FIG. 27, the atmosphere is allowed to flow into the inner part of the cuvette main body 300 via the flow channels 312 from the aspiration port 310, so that the air bubbles 160 can be uniformly generated in the cuvette main body 300.

Figure 28:
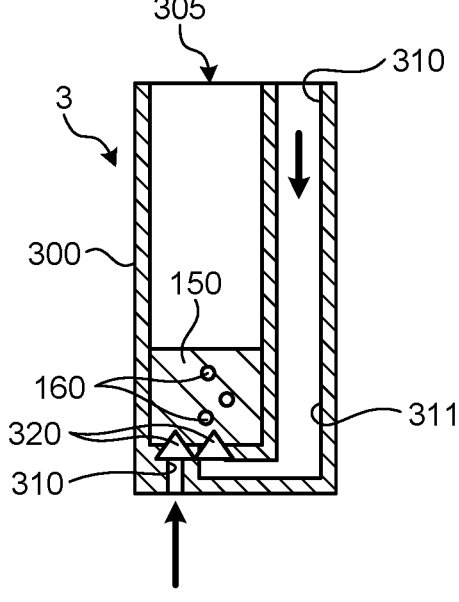
FIG. 28 is a cross-sectional view illustrating a configuration of a reaction cuvette in an automatic analyzing device according to a fourth modification of the fourth embodiment, and is an explanatory diagram of mixing processing.

FIG. 28 is a cross-sectional view illustrating a configuration of the reaction cuvette 3 in the automatic analyzing device 100 according to a fourth modification of the fourth embodiment, and is an explanatory diagram of mixing processing. In the example illustrated in FIG. 28, the two aspiration ports 310 are disposed, and the two backflow prevention parts 320 are respectively disposed on the two aspiration ports 310. In the example illustrated in FIG. 28, the reaction cuvette 3 includes the flow channel 311 formed on the outside of the cuvette main body 300. Thus, as illustrated in FIG. 28, for example, one of the two aspiration ports 310 is used for aspirating the sample 130, and the other one of the aspiration ports 310 is used for aspirating the atmosphere. Specifically, the inlet of the flow channel 311 is the aspiration port 310 for the atmosphere, and disposed on the upper part of the cuvette main body 300. In FIG. 28, the flow channel 311 is formed to guide the atmosphere that is aspirated through the aspiration port 310 disposed on the upper part of the cuvette main body 300 to the inner part of the cuvette main body 300. In the example illustrated in FIG. 28, the atmosphere is aspirated into the reaction cuvette 3 through the aspiration port 310 disposed on the upper part of the cuvette main body 300, so that the mixing arm 25 can be driven on the upper side of the reaction cuvette 3 similarly to the first modification described above with reference to FIG. 25, for example, similarly to the third embodiment. Unlike the first modification described above with reference to FIG. 25, the example illustrated in FIG. 28 does not require the sample dispensing probe, the sample dispensing pump that allows the sample dispensing probe to aspirate and dispense the sample, and the cleaning tank that cleans the sample dispensing probe every time dispensing of the sample ends. In a case in which the inlet of the flow channel 311 is in a released state at the time of aspirating the sample 130, there is the possibility that the sample 130 is not aspirated. Thus, a mechanism for closing the inlet of the flow channel 311 with a plug and the like is required so that the atmosphere is not aspirated through the flow channel 311 at the time of aspirating the sample 130.

As described above, the automatic analyzing device 100 according to the fourth embodiment includes the reaction cuvette 3 that houses the mixed liquid 150 of the sample 130 and the reagent 140 and includes the aspiration port 310, and the mixing device 700 that is detachable from the reaction cuvette 3. The mixing device 700 aspirates the atmosphere into the reaction cuvette 3 through the aspiration port 310 to generate the air bubbles 160 for mixing the mixed liquid 150 in the reaction cuvette 3. Due to this, similarly to the third embodiment, the fourth embodiment does not require the mixer, and the cleaning tank for cleaning the mixer every time the mixed liquid is stirred. Similarly to the third embodiment, the fourth embodiment employs a scheme of generating the air bubbles 160 for mixing the mixed liquid 150 in the reaction cuvette 3, so that the mixer and the cleaning tank for cleaning the mixer are not required. As a result, carry-over is not generated. Carry-over is not generated in the automatic analyzing device 100, so that measurement efficiency can be improved.

Fifth Embodiment

Regarding the automatic analyzing device 100 according to the third embodiment and the fourth embodiment, described is a case in which the mixing device adjusts the size of the air bubble 160, the generation time of the air bubble 160, and the generation amount of the air bubble 160 based on the moving speed of the pump part and the operating time of the pump part. In the automatic analyzing device 100 according to a fifth embodiment, furthermore, the size of the air bubble 160, the generation time of the air bubble 160, and the generation amount of the air bubble 160 can be adjusted by changing a shape and the like. In the fifth embodiment, the same description as that in the third embodiment and the fourth embodiment will not be repeated.

Figure 29:
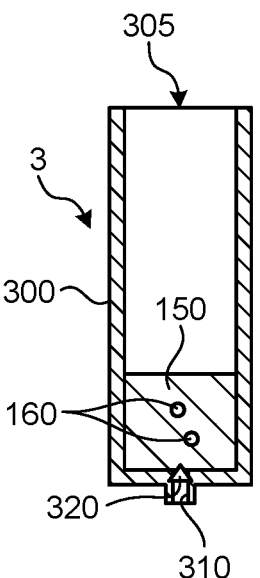
FIG. 29 is a cross-sectional view illustrating a configuration of a reaction cuvette in an automatic analyzing device according to a fifth embodiment, and is an explanatory diagram of mixing processing.

FIG. 29 is a cross-sectional view illustrating a configuration of the reaction cuvette 3 in the automatic analyzing device 100 according to the fifth embodiment. In the example illustrated in FIG. 29, a diameter of the aspiration port 310 of the reaction cuvette 3 is smaller than the diameter of the aspiration port 310 in the third embodiment and the fourth embodiment. In this case, the size of the air bubble 160 is reduced by reducing the diameter of the aspiration port 310. In this way, the size of the air bubble 160 can be adjusted by reducing the diameter of the aspiration port 310.

Figure 30:
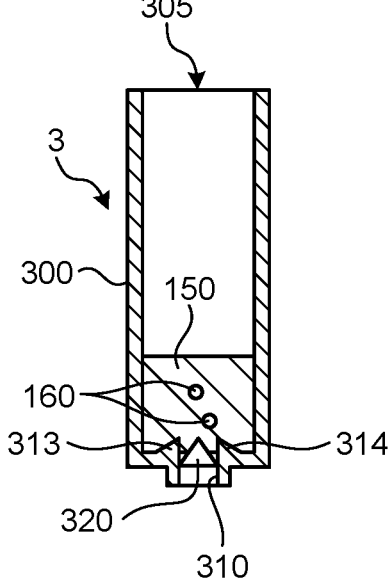
FIG. 30 is a cross-sectional view illustrating the configuration of the reaction cuvette in the automatic analyzing device according to the fifth embodiment, and is an explanatory diagram of mixing processing.

FIG. 30 is a cross-sectional view illustrating a configuration of the reaction cuvette 3 in the automatic analyzing device 100 according to a first modification of the fifth embodiment. In the example illustrated in FIG. 30, projection parts 313 and 314 extending from the aspiration port 310 are formed in the cuvette main body 300 of the reaction cuvette 3 so that the air bubbles 160 are easily generated. In this way, the size of the air bubble 160, the generation time of the air bubble 160, and the generation amount of the air bubble 160 can be adjusted by changing the shape of the inside of the cuvette main body 300.

Figure 31:
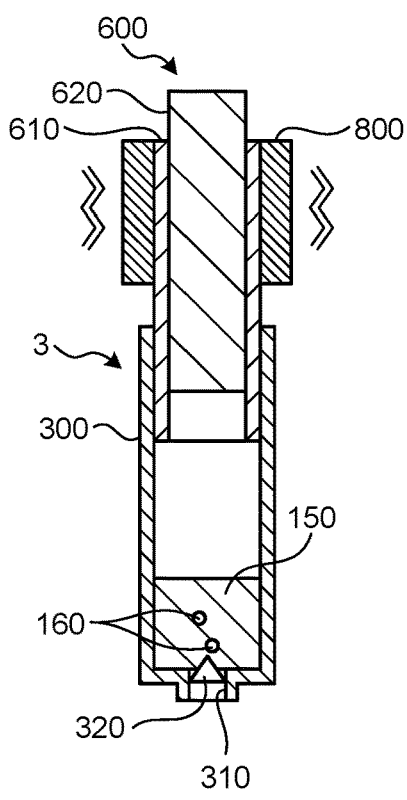
FIG. 31 is a cross-sectional view illustrating configurations of a reaction cuvette, a mixing device, and a vibration device in an automatic analyzing device according to a modification of the fifth embodiment.

FIG. 31 is a cross-sectional view illustrating configurations of the reaction cuvette 3, the mixing device 600, and a vibration device 800 in the automatic analyzing device 100 according to a second modification of the fifth embodiment. As illustrated in FIG. 31, in the automatic analyzing device 100, the analyzing device 70 further includes a vibration device 800. The vibration device 800 includes a member that presses a side surface part of the connection part 610 of the mixing device 600 from a first direction, and a member that presses the connection part 610 from a second direction reverse to the first direction. The vibration device 800 vibrates the mixing device 600 by being driven by the driving device 80.

For example, in mixing processing, the driving device 80 moves the pump part 620 of the mixing device 600 at the distal end of the mixing arm 25 upward to aspirate the atmosphere through the aspiration port 310 of the reaction cuvette 3 by suction performed by the pump part 620. At the same time, the driving device 80 drives the vibration device 800 to vibrate a side surface part of the connection part 610 of the mixing device 600. Due to this, the size of the air bubble 160, the generation time of the air bubble 160, and the generation amount of the air bubble 160 can be adjusted by vibrating the mixing device 600.

Figure 32:
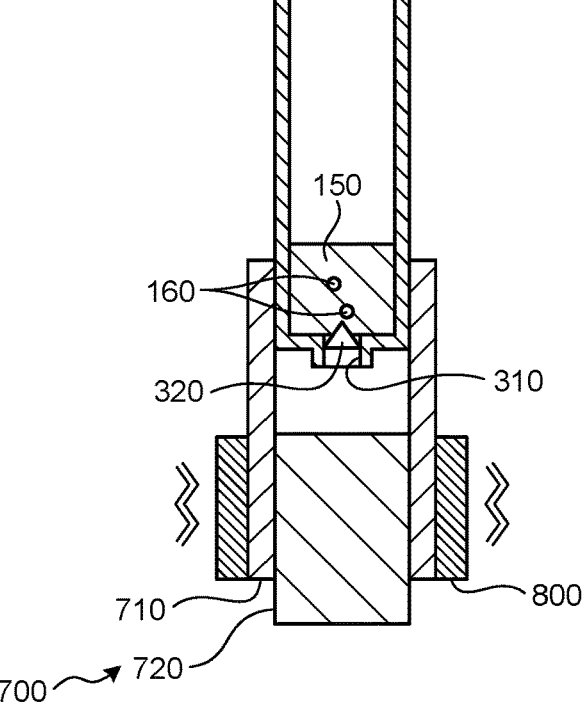
FIG. 32 is a cross-sectional view illustrating configurations of the reaction cuvette, the mixing device, and the vibration device in the automatic analyzing device according to the modification of the fifth embodiment.

FIG. 32 is a cross-sectional view illustrating configurations of the reaction cuvette 3, the mixing device 700, and the vibration device 800 in the automatic analyzing device 100 according to a third modification of the fifth embodiment. The vibration device 800 includes a member that presses a side surface part of the connection part 710 of the mixing device 700 from a first direction, and a member that presses the connection part 710 from a second direction reverse to the first direction. The vibration device 800 vibrates the mixing device 700 by being driven by the driving device 80.

For example, in the mixing processing, the driving device 80 reduces a space formed between the pump part 720 and the aspiration port 310 of the cuvette main body 300 of the reaction cuvette 3 by moving the pump part 720 of the mixing device 700 at the distal end of the mixing arm 25 upward, and allows the atmosphere obtained at the time of reducing the space to flow into the inner part of the cuvette main body 300 of the reaction cuvette 3. At the same time, the driving device 80 drives the vibration device 800 to vibrate the side surface part of the connection part 710 of the mixing device 700. Due to this, the size of the air bubble 160, the generation time of the air bubble 160, and the generation amount of the air bubble 160 can be adjusted by vibrating the mixing device 700.

Figure 33:
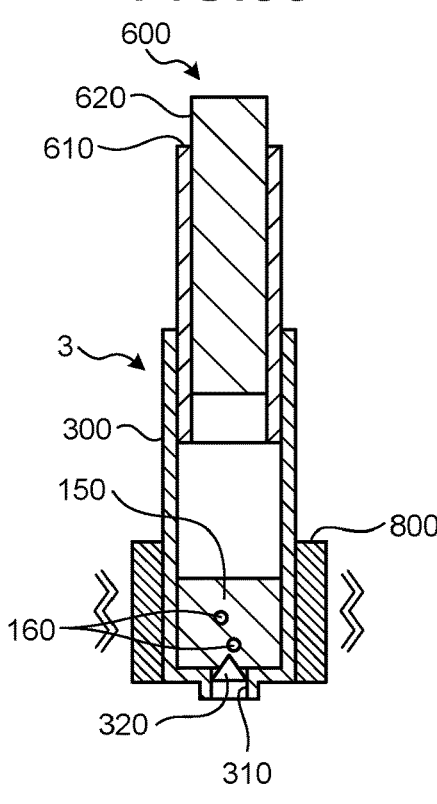
FIG. 33 is a cross-sectional view illustrating configurations of the reaction cuvette and the vibration device in the automatic analyzing device according to the modification of the fifth embodiment.

FIG. 33 is a cross-sectional view illustrating configurations of the reaction cuvette 3 and the vibration device 800 in the automatic analyzing device 100 according to a fourth modification of the fifth embodiment. The vibration device 800 includes a member that presses a side surface part of the reaction cuvette 3 from a first direction, and a member that presses the side surface part from a second direction reverse to the first direction. The vibration device 800 vibrates the reaction cuvette 3 by being driven by the driving device 80.

For example, in the mixing processing, the driving device 80 moves the pump part 620 of the mixing device 600 at the distal end of the mixing arm 25 upward to aspirate the atmosphere through the aspiration port 310 of the reaction cuvette 3 by suction performed by the pump part 620. At the same time, the driving device 80 drives the vibration device 800 to vibrate the side surface part of the reaction cuvette 3. Due to this, the size of the air bubble 160, the generation time of the air bubble 160, and the generation amount of the air bubble 160 can be adjusted by vibrating the reaction cuvette 3.

Sixth Embodiment

The automatic analyzing device 100 according to a sixth embodiment also monitors a pressure at the time when the mixing device generates the air bubbles 160, and the number of the air bubbles 160. In the sixth embodiment, the same description as that in the third embodiment to the fifth embodiment will not be repeated.

Figure 34:
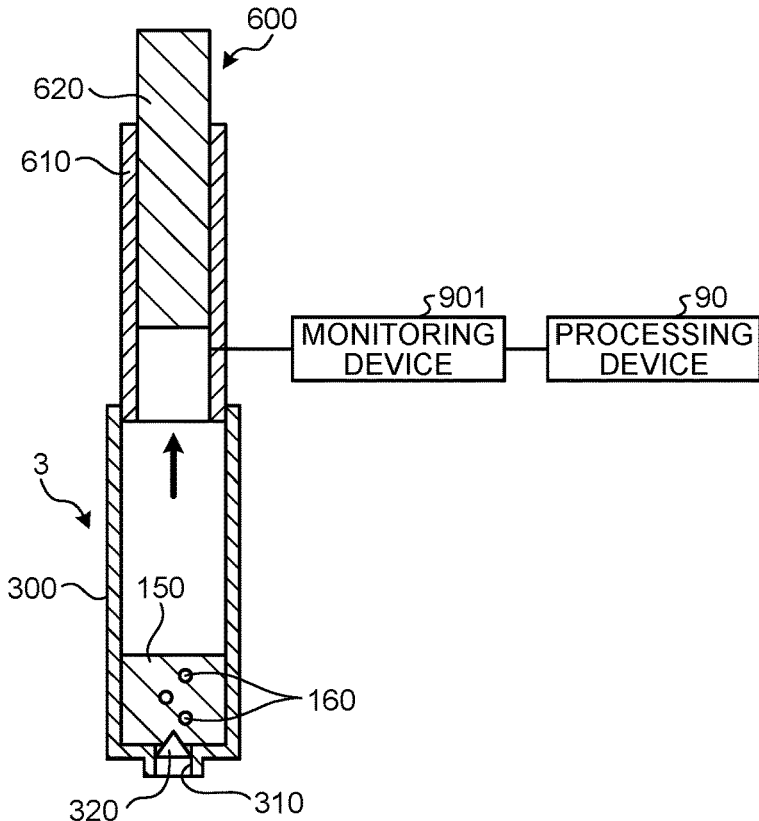
FIG. 34 is an explanatory diagram of monitoring processing performed by an automatic analyzing device according to a modification of a sixth embodiment.
Figure 35:
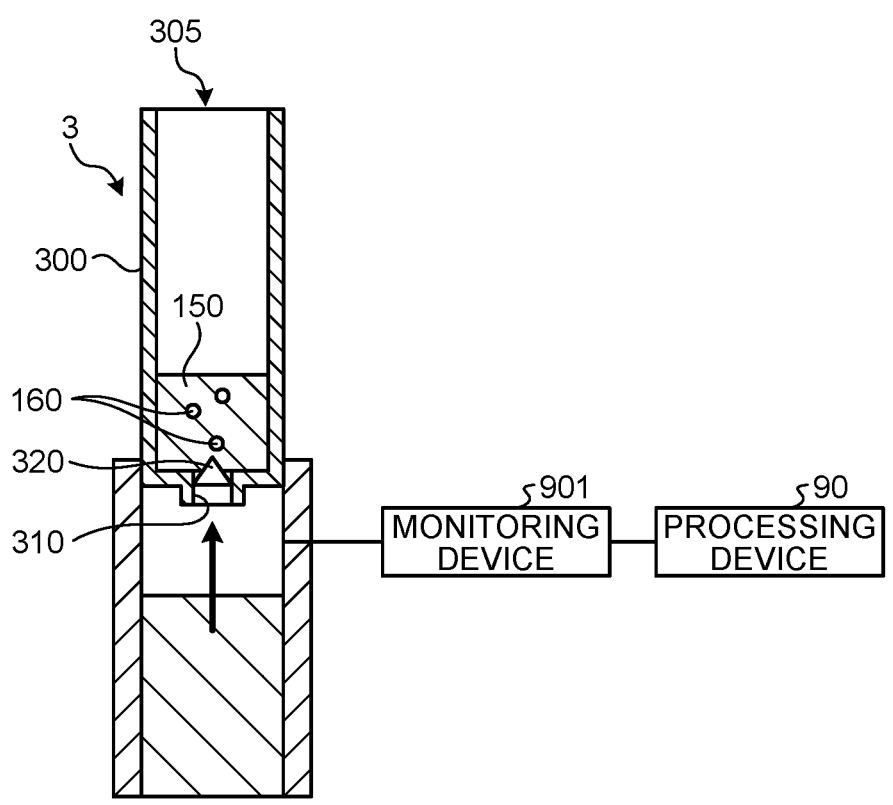
FIG. 35 is an explanatory diagram of monitoring processing performed by the automatic analyzing device according to the modification of the sixth embodiment.
Figure 36:
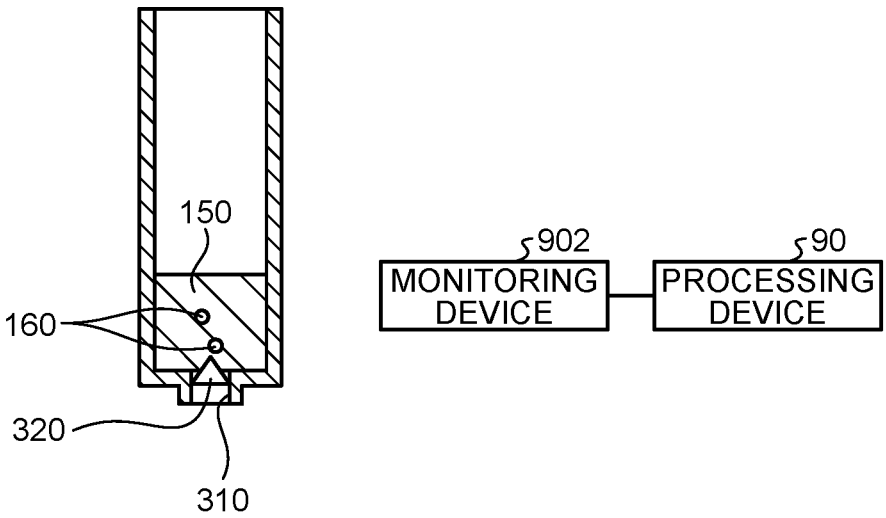
FIG. 36 is an explanatory diagram of monitoring processing performed by the automatic analyzing device according to the modification of the sixth embodiment.

FIG. 34 to FIG. 36 are explanatory diagrams of monitoring processing performed by the automatic analyzing device 100 according to the sixth embodiment.

For example, as illustrated in FIG. 34 and FIG. 35, in the automatic analyzing device 100, the analyzing device 70 further includes a monitoring device 901. The monitoring device 901 is, for example, a pressure sensor. In FIG. 34, the monitoring device 901 monitors a pressure at the time when the mixing device 600 generates the air bubbles 160. Alternatively, in FIG. 35, the monitoring device 901 monitors a pressure at the time when the mixing device 700 generates the air bubbles 160. The controlling function 32 of the processing device 90 determines whether the pressure monitored by the monitoring device 901 deviates from a set range. If the pressure deviates from the set range, the controlling function 32 of the processing device 90 outputs anomaly information indicating an anomaly to the output device 40 to be reported to the user.

For example, as illustrated in FIG. 36, in the automatic analyzing device 100, the analyzing device 70 further includes a monitoring device 902. The monitoring device 902 is, for example, a camera. The monitoring device 902 monitors the number of the air bubbles 160 at the time when the mixing device s 600 and 700 generate the air bubbles 160. The controlling function 32 of the processing device 90 determines whether the number of the air bubbles 160 monitored by the monitoring device 902 deviates from a set range. If the number of the air bubbles 160 deviates from the set range, the controlling function 32 of the processing device 90 outputs anomaly information indicating an anomaly to the output device 40 to be reported to the user.

With the automatic analyzing device 100 according to the sixth embodiment, in addition to the effects of the third embodiment to the fifth embodiment, the user can reconsider the mixing condition and the like by checking the anomaly information output to the output device 40.

According to at least one of the embodiments described above, measurement efficiency can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reaction cuvette configured to be used for measurement performed by an automatic analyzing device, and to house a mixed liquid of a reagent and a sample to be measured, the reaction cuvette comprising:
   a cuvette main body; and
   an aspiration port that is disposed on the cuvette main body, and configured to allow a fluid to flow into an inner part of the cuvette main body from a bottom surface side of the cuvette main body, wherein
   the fluid is the sample,
   the reaction cuvette further comprises
      an aspirating device that is disposed on the cuvette main body to aspirate the sample;
      a reaction chamber that is disposed inside the cuvette main body, and configured to house a reagent that reacts with the sample; and
      a flow channel control part configured to allow the sample to flow into the reaction chamber by forming a flow channel from the aspiration port to the aspirating device via the reaction chamber,
   a decompression chamber and a compression chamber are disposed in the cuvette main body,
   the reaction chamber includes a first reaction chamber housing a first reagent, and a second reaction chamber housing a second reagent, and
   the flow channel control part
      allows the sample to flow into the first reaction chamber by forming a first flow channel as the flow channel from the aspiration port to the decompression chamber via the first reaction chamber, and allows a mixed liquid of the sample and the first reagent to flow into the second reaction chamber by forming a second flow channel from the compression chamber to the second reaction chamber via the first reaction chamber after forming the first flow channel.

2. The reaction cuvette according to claim 1, wherein a valve configured to prevent backflow in a direction from the inner part of the cuvette main body to the outside is disposed on the aspiration port.

3. An automatic analyzing device comprising:

a reaction cuvette configured to house a mixed liquid of a reagent and a sample to be measured, the reaction cuvette including a cuvette main body and a aspiration port that is disposed on the cuvette main body for allowing a fluid to flow into an inner part of the cuvette main body from a bottom surface side of the cuvette main body; and a measuring part configured to measure the mixed liquid in the reaction cuvette, wherein the fluid is the sample, the automatic analyzing device further comprises an aspirating device configured to aspirate the sample into the cuvette main body through the aspiration port, the reaction cuvette further comprises a reaction chamber that is disposed inside the cuvette main body, and configured to house a reagent that reacts with the sample; and a flow channel control part configured to allow the sample to flow into the reaction chamber by forming a flow channel from the aspiration port to the aspirating device via the reaction chamber, a decompression chamber and a compression chamber are disposed in the cuvette main body, the reaction chamber includes a first reaction chamber housing a first reagent, and a second reaction chamber housing a second reagent, and the flow channel control part allows the sample to flow into the first reaction chamber by forming a first flow channel as the flow channel from the aspiration port to the decompression chamber via the first reaction chamber, and allows a mixed liquid of the sample and the first reagent to flow into the second reaction chamber by forming a second flow channel from the compression chamber to the second reaction chamber via the first reaction chamber after forming the first flow channel.

* * * * *